US011686948B2

(12) United States Patent
Law et al.

(10) Patent No.: US 11,686,948 B2
(45) Date of Patent: Jun. 27, 2023

(54) POSITIONING, STABILISING, AND INTERFACING STRUCTURES AND SYSTEM INCORPORATING SAME

(71) Applicant: ResMed Pty Ltd, Bella Vista (AU)

(72) Inventors: Ian Andrew Law, Sydney (AU); Aaron Samuel Davidson, Sydney (AU); Stewart Joseph Wagner, Sydney (AU)

(73) Assignee: ResMed Pty Ltd, Bella Vista (AU)

(*) Notice: Subject to any disclaimer, the term of this patent is extended or adjusted under 35 U.S.C. 154(b) by 0 days.

(21) Appl. No.: 17/498,808

(22) Filed: Oct. 12, 2021

(65) Prior Publication Data

US 2022/0026724 A1   Jan. 27, 2022

Related U.S. Application Data

(63) Continuation of application No. 17/082,071, filed on Oct. 28, 2020, now Pat. No. 11,169,384, which is a
(Continued)

(30) Foreign Application Priority Data

Mar. 27, 2020  (AU) ................ 2020900953
May 5, 2020   (AU) ................ 2020901432
(Continued)

(51) Int. Cl.
  *G02B 27/01*   (2006.01)
  *G06F 3/01*    (2006.01)
  *G06F 1/16*    (2006.01)

(52) U.S. Cl.
  CPC ..... *G02B 27/0176* (2013.01); *G02B 27/0172* (2013.01); *G06F 3/011* (2013.01); *G06F 1/163* (2013.01)

(58) Field of Classification Search
  CPC ........ G02B 27/0176; G02B 2027/0154; B29C 44/12; G06F 1/163
  See application file for complete search history.

(56) References Cited

U.S. PATENT DOCUMENTS

5,671,037 A * 9/1997 Ogasawara ........ G02B 27/0176
                                                345/905
5,793,835 A    8/1998 Blanck
(Continued)

FOREIGN PATENT DOCUMENTS

CN    201826192 U    5/2011
CN    105148374 A    12/2015
(Continued)

OTHER PUBLICATIONS

Law et al., U.S. Appl. No. 17/082,071, filed Oct. 28, 2020, entitled "Positioning and Stabilising Structure and System Incorporating Same," (parent application).
(Continued)

*Primary Examiner* — William Lu
(74) *Attorney, Agent, or Firm* — Nixon & Vanderhye P.C.

(57) ABSTRACT

A head-mounted display system includes a positioning and stabilising structure structured and arranged to hold a display unit in an operational position over a user's face in use and an interfacing structure for the display unit constructed and arranged to be in opposing relation with the user's face. The interfacing structure comprises a substantially continuous face engaging surface adapted to contact the user's face around a periphery of the user's eyes. The interfacing structure comprises silicone. The interfacing structure is configured and arranged such that force applied to the user's face is distributed around the periphery thereof. The interfacing structure comprises a first compliance at a first region and a second compliance at a second region, wherein the first region and the second region are configured around the
(Continued)

periphery of the interfacing structure to allow selective distribution of the force onto the user's face.

41 Claims, 50 Drawing Sheets

Related U.S. Application Data continuation-in-part of application No. 16/865,526, filed on May 4, 2020, now Pat. No. 11,262,589, and a continuation-in-part of application No. 16/865,480, filed on May 4, 2020, now Pat. No. 11,243,405.

(30) Foreign Application Priority Data

| | | |
|---|---|---|
| May 6, 2020 | (AU) | 2020901437 |
| Jul. 20, 2020 | (AU) | 2020902514 |

(56) References Cited

U.S. PATENT DOCUMENTS

| | | | |
|---|---|---|---|
| 5,832,926 | A | 11/1998 | Towlen |
| 9,901,132 | B2* | 2/2018 | Hairston ............... A42B 1/041 |
| 9,989,998 | B1* | 6/2018 | Yee ........................ G06F 1/163 |
| 10,078,349 | B1 | 9/2018 | Morris et al. |
| 10,095,275 | B2* | 10/2018 | Byun ................ G02B 27/0176 |
| 10,133,305 | B1 | 11/2018 | Sulllivan et al. |
| 10,261,555 | B1 | 4/2019 | Cooper et al. |
| 10,470,512 | B1 | 11/2019 | Yee |
| 10,496,130 | B1* | 12/2019 | Yee ........................ G06F 3/011 |
| 10,739,600 | B1* | 8/2020 | Yee .................. G02B 27/0176 |
| 10,761,567 | B2* | 9/2020 | Ellis .................. G02B 27/0172 |
| 10,860,100 | B2* | 12/2020 | Osterhout ............. G06F 3/0346 |
| 2009/0173343 | A1* | 7/2009 | Omura ............... A44B 11/2553 |
| | | | 128/205.25 |
| 2009/0180194 | A1* | 7/2009 | Yamaguchi ........ G02B 27/0176 |
| | | | 359/15 |
| 2014/0026890 | A1 | 1/2014 | Haskard |
| 2016/0044981 | A1* | 2/2016 | Frank ................ G02B 27/0176 |
| | | | 2/422 |
| 2016/0054570 | A1* | 2/2016 | Bosveld ................. A41D 20/00 |
| | | | 2/209.3 |
| 2016/0063767 | A1* | 3/2016 | Lee ....................... G06T 19/006 |
| | | | 345/419 |
| 2016/0077345 | A1* | 3/2016 | Bohan .................... G02C 7/101 |
| | | | 359/275 |
| 2016/0140887 | A1* | 5/2016 | Kim ...................... G09G 3/003 |
| | | | 345/690 |
| 2016/0216512 | A1 | 7/2016 | Miller et al. |
| 2016/0261300 | A1 | 9/2016 | Fei et al. |
| 2017/0017085 | A1 | 1/2017 | Araki |
| 2017/0168303 | A1* | 6/2017 | Petrov ..................... G02C 11/08 |
| 2017/0242262 | A1 | 8/2017 | Fuchs et al. |
| 2017/0261656 | A1* | 9/2017 | Kim .......................... G02B 1/04 |
| 2017/0337737 | A1* | 11/2017 | Edwards ................ F16M 13/04 |
| 2018/0095497 | A1 | 4/2018 | Hsu et al. |
| 2018/0095498 | A1 | 4/2018 | Raffle et al. |
| 2018/0151036 | A1* | 5/2018 | Cha ..................... H04R 29/001 |
| 2018/0239430 | A1 | 8/2018 | Tadi |
| 2018/0335632 | A1 | 11/2018 | Cho et al. |
| 2018/0364491 | A1* | 12/2018 | Park ......................... G06F 1/163 |
| 2019/0041899 | A1* | 2/2019 | Ellis ......................... G06F 1/163 |
| 2019/0075689 | A1 | 3/2019 | Selvakumar et al. |
| 2019/0243145 | A1 | 8/2019 | Ellis et al. |
| 2019/0243414 | A1 | 8/2019 | Bae et al. |
| 2019/0258061 | A1 | 8/2019 | Solomon |
| 2019/0258065 | A1* | 8/2019 | Yun ......................... G06F 1/182 |
| 2019/0333480 | A1 | 10/2019 | Lang |
| 2019/0339736 | A1 | 11/2019 | Chang |
| 2020/0008687 | A1* | 1/2020 | Friedlander .............. A61B 3/16 |
| 2020/0033601 | A1 | 1/2020 | Magrath et al. |
| 2020/0042035 | A1* | 2/2020 | Chen ....................... G06F 1/163 |
| 2020/0089007 | A1* | 3/2020 | Maric ...................... G02B 7/08 |
| 2020/0159040 | A1* | 5/2020 | Kiritz ................. G02B 27/0176 |
| 2020/0233453 | A1 | 7/2020 | Hatfield |
| 2021/0041706 | A1* | 2/2021 | Hatfield ............. G02B 27/0176 |
| 2021/0080996 | A1 | 3/2021 | Hudman |
| 2021/0263323 | A1* | 8/2021 | Ellis ....................... G02C 11/08 |
| 2021/0302748 | A1 | 9/2021 | Law |
| 2021/0302749 | A1 | 9/2021 | Law |
| 2021/0302750 | A1 | 9/2021 | Law et al. |

FOREIGN PATENT DOCUMENTS

| | | |
|---|---|---|
| CN | 205720878 U | 11/2016 |
| CN | 106802484 A | 6/2017 |
| CN | 106842577 A | 6/2017 |
| CN | 206657145 U | 11/2017 |
| CN | 107995957 A | 5/2018 |
| CN | 209417425 U | 9/2019 |
| EP | 3 287 865 A2 | 2/2018 |
| JP | 2014-142654 A | 8/2014 |
| JP | 2019-129484 A | 8/2019 |
| KR | WO 2013/049248 A2 | 4/2013 |
| KR | 10-2014-0066258 A | 5/2014 |
| KR | 10-2017-0037355 A | 4/2017 |
| KR | 10-2018-0136222 A | 12/2018 |
| WO | WO 2018/053509 A1 | 3/2018 |
| WO | WO 2018/067421 A1 | 4/2018 |
| WO | WO 2019/190448 A1 | 10/2019 |
| WO | WO 2019/212591 A1 | 11/2019 |
| WO | WO-2022221907 A1 * | 10/2022 |

OTHER PUBLICATIONS

Notification of Transmittal of the International Search Report and the Written Opinion of the International Search Authority dated Feb. 4, 2021 in International Application No. PCT/AU2020/051081, 7 pages.
Written Opinion of the International Search Authority dated Feb. 4, 2021 in International Application No. PCT/AU2020/051081, 8 pages.
Notification of Transmittal of the International Search Report and the Written Opinion of the International Search Authority dated Dec. 24, 2020 in International Application No. PCT/AU2020/051158, 9 pages.
Written Opinion of the International Search Authority dated Dec. 24, 2020 in International Application No. PCT/AU2020/051158, 10 pages.
Notification of Transmittal of the International Search Report and the Written Opinion of the International Searching Authority dated Apr. 6, 2021 in International Application No. PCT/SG2020/050793, 19 pages.
U.S. Office Action dated May 14, 2021 in U.S. Appl. No. 16/865,526, 23 pages.
U.S. Office Action dated Jun. 17, 2021 in U.S. Appl. No. 16/865,480, 28 pages.
Notice Requesting Submission of Opinion dated May 2, 2022 in Korean Application No. 10-2022-7001969, with English Translation, 34 pages.
First Office Action dated May 31, 2022 in Chinese Application No. 202080038956.4, with English translation, 8 pages.
Substantive Examination Adverse Report (Section 30(1)) with Search Report dated Jan. 31, 2023 in Malaysian Application No. PI2022005337, 3 pages.

* cited by examiner

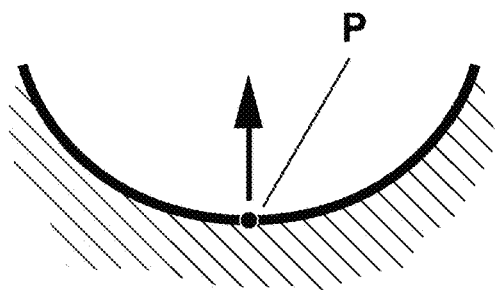
FIG. 2a — Relatively Large Positive Curvature
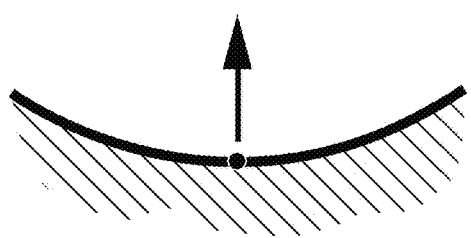
FIG. 2b — Relatively Small Positive Curvature
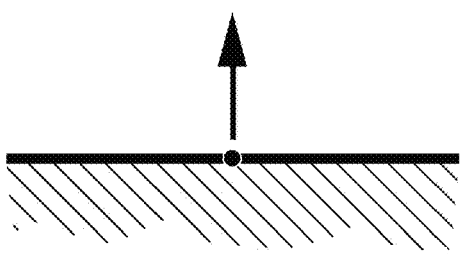
FIG. 2c — Zero Curvature
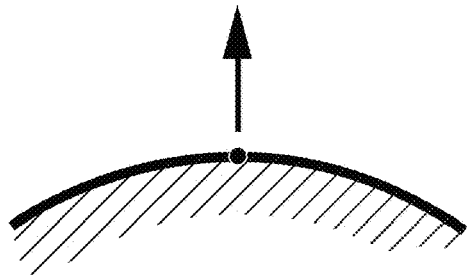
FIG. 2d — Relatively Small Negative Curvature
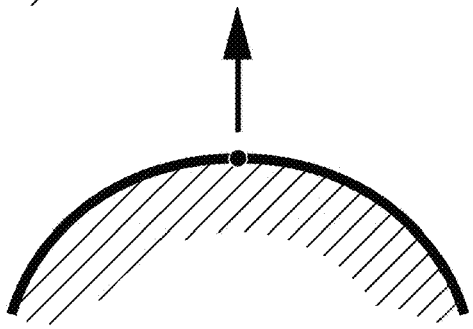
FIG. 2e — Relatively Large Negative Curvature

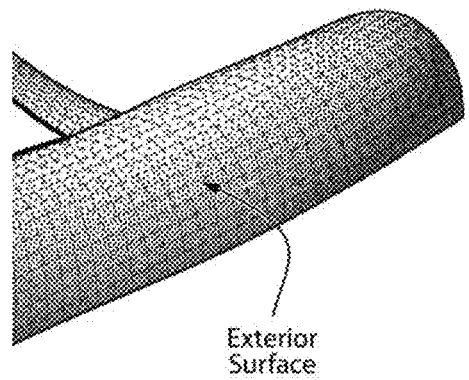
FIG. 2f
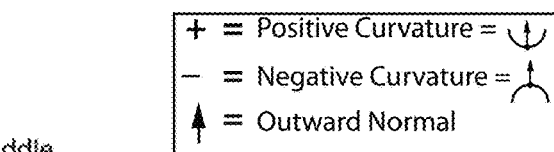
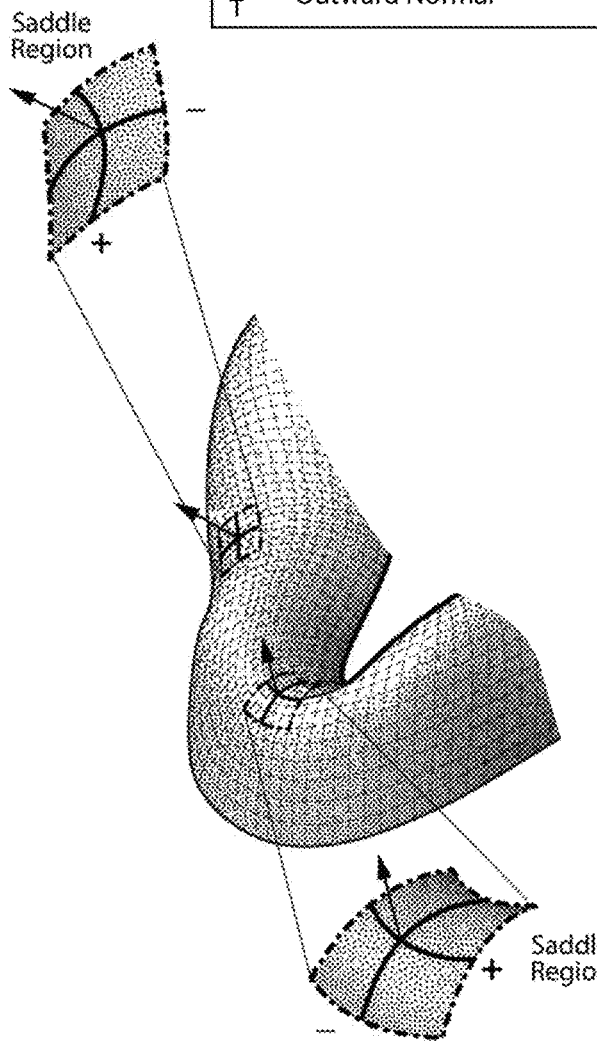
FIG. 2h
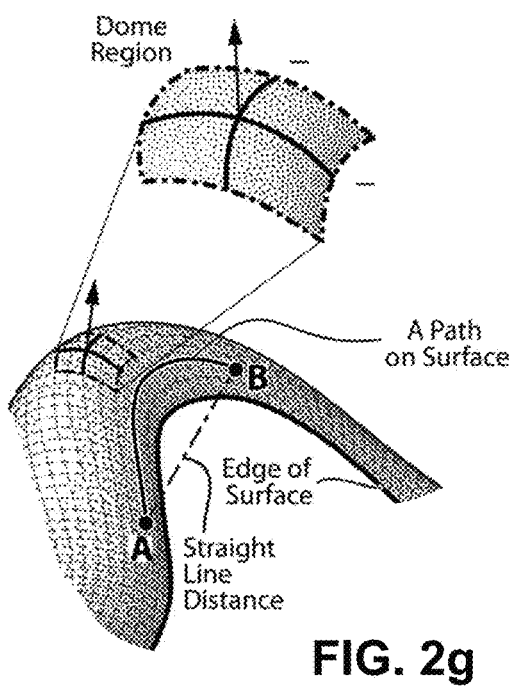
FIG. 2g

Left ear helix

Right-hand helix
Right-hand positive

Right ear helix

Left-hand rule

Right-hand rule

Copyright 2020 ResMed

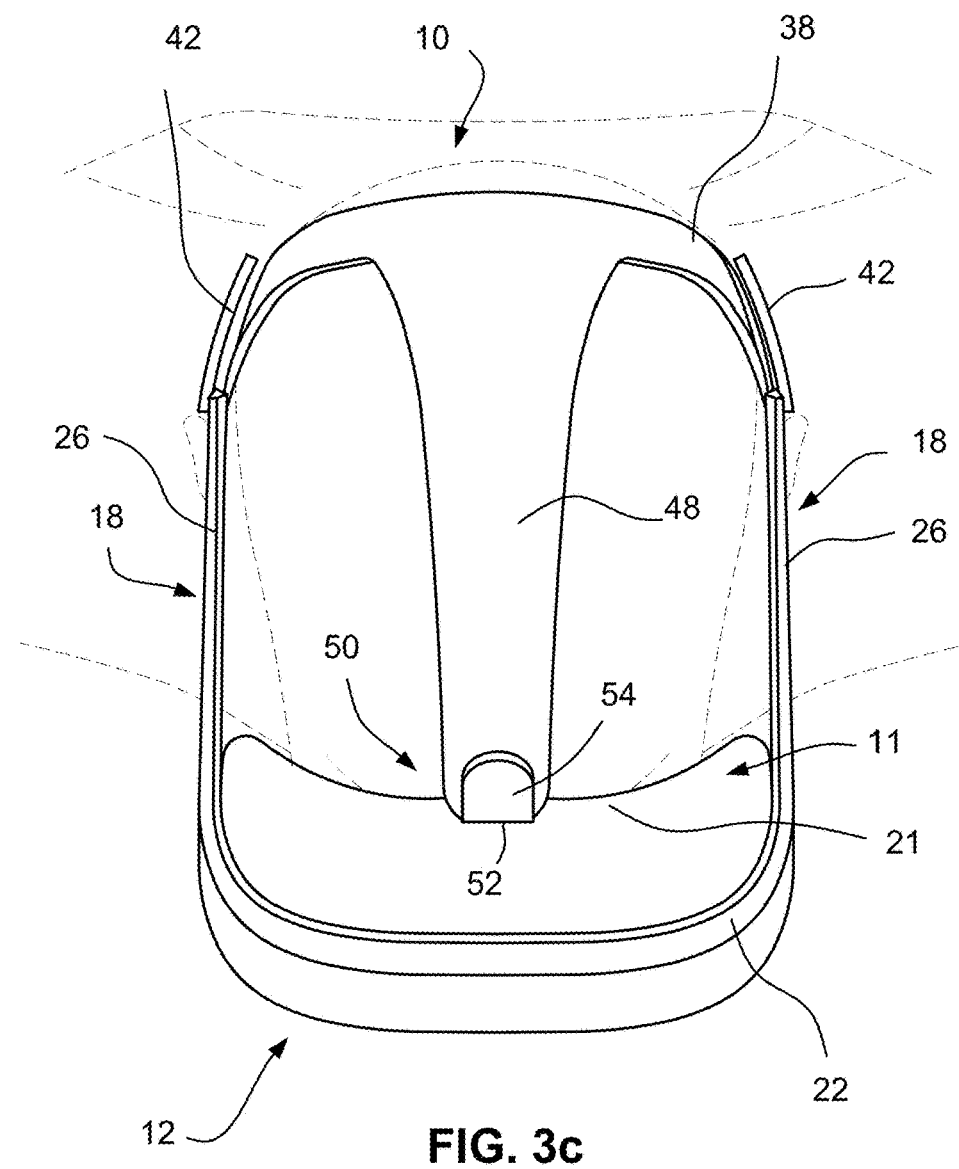
FIG. 3c
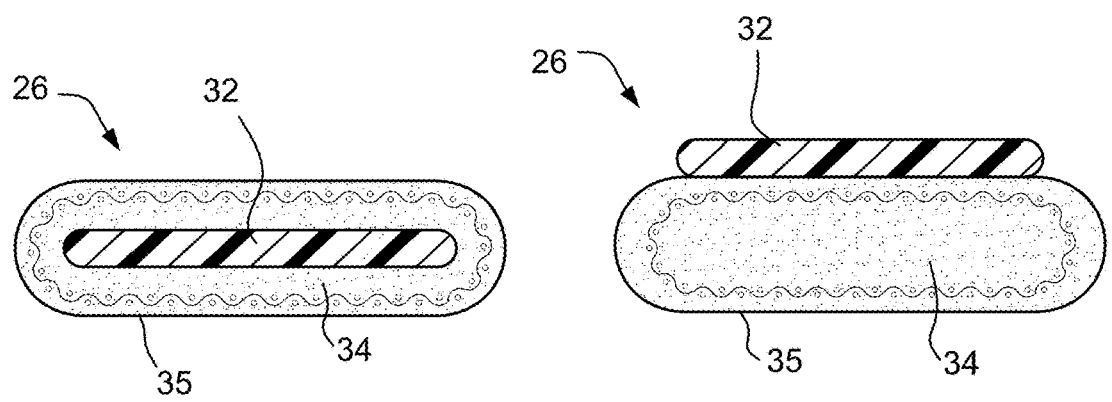
FIG. 3d
FIG. 3e

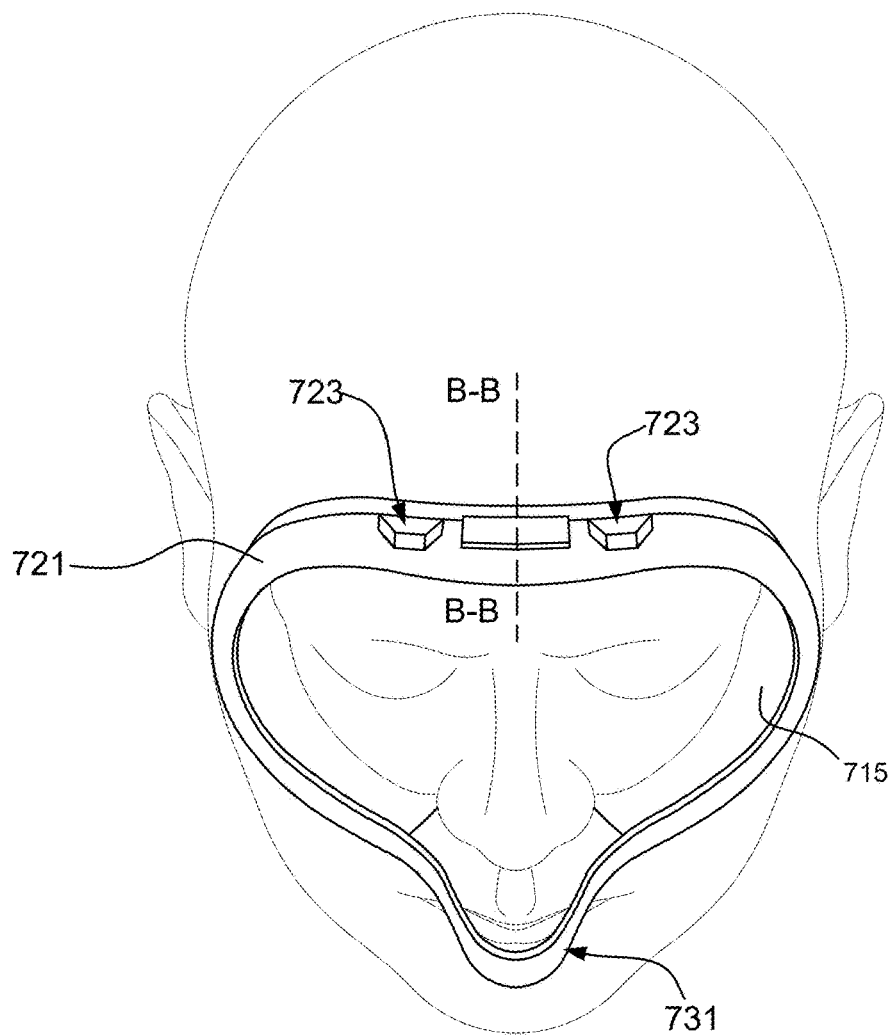
FIG. 16c
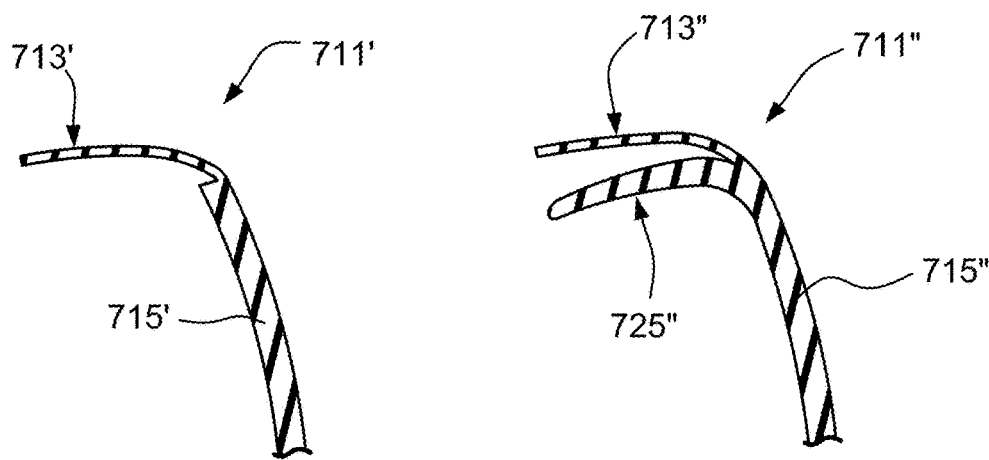
FIG. 17a    FIG. 17b

POSITIONING, STABILISING, AND INTERFACING STRUCTURES AND SYSTEM INCORPORATING SAME

1 CROSS-REFERENCE TO RELATED APPLICATIONS

This application is a continuation of U.S. application Ser. No. 17/082,071, filed Oct. 28, 2020, which is a continuation-in-part of U.S. application Ser. No. 16/865,480, filed May 4, 2020, and is a continuation-in-part of U.S. application Ser. No. 16/865,526, filed May 4, 2020, each of which claims the benefit of Australian Provisional Application No. 2020900953, filed Mar. 27, 2020. This application also claims the benefit of Australian Provisional Application No. 2020901432, filed May 5, 2020, Australian Provisional Application No. 2020901437, filed May 6, 2020, and Australian Provisional Application No. 2020902514, filed Jul. 20, 2020. Each of the above-identified applications is incorporated herein by reference in its entirety.

2 BACKGROUND OF THE TECHNOLOGY

2.1 Field of the Technology

The present technology relates generally to head mounted displays, positioning and stabilising structures, user interfacing structures, and other components for use in head mounted displays, associated head-mounted display assemblies and systems including a display unit and positioning and stabilising structure, interfacing structures and or components, and methods. The present technology finds particular application in the use of virtual reality head mounted displays and is herein described in that context. However, it is to be appreciated that the present technology may have broader application and may be used in other head-mounted display arrangements including augmented reality displays.

2.2 DESCRIPTION OF THE RELATED ART

2.2.1 Head Mounted Display

It is to be understood that, if any prior art is referred to herein, such reference does not constitute an admission that the prior art forms a part of the common general knowledge in the art, in Australia or any other country.

Virtual reality (or VR) head-mounted displays enable a user to have a fully immersive experience of a virtual environment and have broad application in fields such as communications, training, medical and surgical practice, engineering and video gaming.

Virtual reality head mounted displays typically are provided as a system or assembly that includes a display unit which is arranged to be held in an operational position in front of a user's face. The display unit typically includes a housing containing a display and a user interfacing structure constructed and arranged to be in opposing relation with the user's face, i.e., the user interfacing structure is facing or placed opposite the user's face. The user interfacing structure may extend about the display and define in conjunction with the housing, a viewing opening to the display. The user interfacing structure may engage with the user's face and include a cushion for user comfort and/or be light sealing to cut ambient light from the display. The head-mounted display system further comprises a positioning and stabilising structure that is disposed on the user's head to maintain the display unit in position.

2.2.1.1 Interfacing Structure

The head-mounted displays may include a user interfacing structure. Since it is in direct contact with the user's face, the shape and configuration of the interfacing structure can have a direct impact on the effectiveness and comfort of the display unit.

The design of a user interfacing structure presents a number of challenges. The face has a complex three-dimensional shape. The size and shape of noses and heads varies considerably between individuals. Since the head includes bone, cartilage and soft tissue, different regions of the face respond differently to mechanical forces.

One type of interfacing structure extends around the periphery of the display unit and is intended to seal against the user's face when force is applied to the display unit with the interfacing structure in confronting engagement with the user's face. The interfacing structure may include a pad made of a polyurethane (PU). With this type of interfacing structure, there are often gaps between the interfacing structure and the face, and additional force will be required to force the display unit against the face in order to achieve the desired contact.

The regions not engaged at all by the display unit may allow gaps to form between the facial interface and the user's face through which undesirable light pollution may ingress into the display unit. The light pollution may decrease the efficacy and enjoyment of the overall virtual reality experience for the user. In addition, previous systems may be difficult to adjust to enable application for a wide variety of head sizes. Further still, the display unit and associated positioning and stabilising structure may often be relatively heavy and may be difficult to clean which may thus further limit the comfort and usability of the system.

Another type of interfacing structure incorporates a flap seal of thin material positioned about a portion of the periphery of the display unit so as to provide a sealing action against the face of the user. Like the previous type of interfacing structure, if the match between the face and the interfacing structure is not good, additional force may be required to achieve a seal, or light may leak into the display unit in-use. Furthermore, if the shape of the interfacing structure does not match that of the user, it may crease or buckle in-use, giving rise to undesirable light penetration.

2.2.1.2 Positioning and Stabilising Structure

To hold the display unit in its correct operational position, the head-mounted display system further comprises a positioning and stabilising structure that is disposed on the user's head. In the past, these positioning and stabilising structures have been formed from expandable rigid structures that are typically applied to the user's head under tension to maintain the display unit in its operational position. Such systems have been prone to exert a clamping pressure on the user's face which can result in user discomfort at localised stress points. Also, previous systems may be difficult to adjust to allow wide application of head sizes. Further, the display unit and associated positioning and stabilising structure are often heavy and difficult to clean, which further limit the comfort and usability of the system.

Certain other head mounted display systems may be functionally unsuitable for the present technology. For example, positioning and stabilising structures designed for ornamental and visual aesthetics may not have the structural capabilities to maintain a suitable pressure around the face. For example, an excess of clamping pressure may cause discomfort to the user, or alternatively, insufficient clamping pressure on the user's face may not effectively seal the display from ambient light.

Certain other head mounted display systems may be uncomfortable or impractical for the present technology. For example, if the system is used for prolonged time periods.

As a consequence of these challenges, some head mounted display systems suffer from being one or more of obtrusive, aesthetically undesirable, costly, poorly fitting, difficult to use, and uncomfortable especially when worn for long periods of time or when a user is unfamiliar with a system. Wrongly sized positioning and stabilising structures can give rise to reduced comfort and in turn, shortened periods of use.

Therefore, an interfacing portion of a user interface used for the fully immersive experience of a virtual environment are subject to forces corresponding to the movement of a user during the experience.

2.2.1.3 Materials

Materials used in head mounted display assemblies have included dense foams for contacting portions in the interfacing structures, rigid shells for the housings, and positioning and stabilising structures formed from rigid plastic clamping structures. These materials have various drawbacks including not permitting the skin covered by the material to breathe, being inflexible, difficult to clean and prone to trapping bacteria. As a result, products made with such material may be uncomfortable to wear for extended periods of time, causes skin irritation in some individuals and limit the application of the products.

Thus, there is a need for an improved system that does not suffer from the above-mentioned drawbacks.

3 BRIEF SUMMARY OF THE TECHNOLOGY

An aspect of the present technology relates to a positioning and stabilising structure for a head-mounted display system (or user interface), the positioning and stabilising structure including a rear support structure arranged, in use, to contact a posterior region of the user's head. In some forms, the rear support structure includes a hoop having an occipital portion and a parietal portion.

The hoop or at least one of the occipital and parietal portions thereof may be resiliently extensible along at least a portion of its length. In some forms, the hoop is flexible along at least a portion of its length. In some forms, where the rear support structure is a hoop, the occipital portion may extend to a lower portion of the user's head such that it resists upward movement (as a result of its location, it is in contact with the occipital region of the head) and as such provides an anchor for the system. In some forms, the hoop is orientated in a generally upright plane (such upright plane including, as an example, the coronal plane).

In some forms, the rear support structure is disposed posterior of the otobasion superior of the user.

Another aspect of the present technology relates to a positioning and stabilising structure for a head-mounted display system, the positioning and stabilising structure including a back support portion that is arranged in use to contact a posterior region of the user's head and a front support portion that is arranged in use to contact an anterior region of the user's head, the back and front support portions extending transverse to the sagittal plane. In some forms, the positioning and stabilising structure further comprises an adjustment mechanism to allow adjustment between the back and front support portions.

In some forms, the adjustment mechanism allows lateral adjustment between the back and front support portions. In some forms, the adjustment mechanism allows angular adjustment between the back and front support portions.

Another aspect of the present technology relates to a positioning and stabilising structure for a head-mounted display system, the positioning and stabilising structure including a back support portion that is arranged in use to contact a posterior region of the user's head and a front support portion that is arranged in use to contact an anterior region of the user's head, the back and front support portions extending transverse to the sagittal plane and being laterally offset from one another.

In some forms, the back or occipital support portion is biased into contact with the occipital region of the user.

Another aspect of the present technology relates to a positioning and stabilising structure for a head-mounted display system including a support portion arranged in use to accommodate the weight of the display unit of the head mounted display system, and one or more adjustment mechanisms that allow adjustment of the position of the display unit relative to the support portion.

In some forms, the adjustment of the display unit relative to the support portion may be angular and/or in an anterior-posterior direction relative to the user's head.

Another aspect of the present technology relates to a positioning and stabilising structure for a head-mounted display system that includes resilient components that are extensible and rigidisiers that are substantially inextensible and resilient.

In some forms, the positioning and stabilising structure further comprises opposing connectors that are disposed on opposing sides of, and extending along the temporal regions of, the user's head in use to interconnect the rear support structure or support portion to the display unit.

In some forms, the connectors are rigid along at least a portion of their length. In some forms, the connectors each comprise an arm having an anterior end connected to the display unit and a posterior end connected to the rear support structure or one of the support portions. In some forms, the arm is rigid. In some forms, the posterior end of the arm is disposed at or posterior to the otobasion superior of the user.

In some forms, at least one of the connectors further comprises an adjustment mechanism for adjustment of the positioning and stabilising structure to fit different size heads. In some forms, the adjustment mechanism is disposed at the connection between the posterior end of the temporal arm and the rear support structure.

In some forms, the positioning and stabilising structure includes one or more connection tabs that connects to the arm of the connector (i.e., connector arm), and the adjustment mechanism allows for adjustment of the effective length of the connection tab. In some forms, a posterior end of the connector arm incorporates an eyelet that is arranged to receive the connection tab, the adjustment mechanism comprising a releasable fastening arrangement to fasten the connection tab to the temporal arm. In some forms, the releasable fastening arrangement may be arranged to secure a free end of the connection tab back onto a proximal portion of the connection tab. The releasable fastening arrangement may take other forms, such as clips or retainers that allow a friction, interference, snap or other mechanical fixing arrangement.

In some forms, the positioning and stabilising structure may further include a forehead support connector. In some forms, the forehead support connector may extend generally in the direction of the sagittal plane and connects the rear support structure, or front support portion, to a superior edge region of the display unit. In some forms, the forehead support connector may comprise a strap. In some forms, the strap of the forehead support connector may be resiliently extensible along at least a portion of its length. In some forms, the strap of the forehead support connector may be flexible along at least a portion of its length.

In some forms, the forehead support connector may further include an adjustment mechanism for adjustment of the positioning and stabilising structure to fit different size heads. In some forms, the adjustment mechanism may adjust the effective length of the strap of the forehead support connector when the forehead support connector is in that form.

In some forms, the forehead support connector further comprises a forehead support rigidiser that provides rigidification to a portion of the forehead support connector. In some forms, the forehead support rigidiser provides rigidification to a portion of the forehead support connector located along the frontal region of the user's head. The extent and positioning of the forehead support rigidiser may assist in correct positioning of the display unit and relieve pressure being applied to the zygomatic bone of the user. In some forms, the forehead support rigidiser may be adjustable (angularly or translational) on other components of the forehead support connector (or adapted to be adjustable (angularly or translational) with respect to other components of the forehead support connector), such as the strap of the forehead support connector, to allow fine positioning of the head mounted display unit and assist in improving user comfort and fit.

In some forms, the positioning and stabilising structure further includes additional rigidisers which may bridge other portions of the structure, such as the rear support structure, front or back support portions and/or connector arms. In some forms, these additional rigidisers may assist in controlling the movement of the display unit about the rear support structure to further stabilise and support the system. In some forms, these additional rigidisers may limit hinging movement at the connection of the temporal connectors to the rear support structure. In some forms, these additional rigidisers may also extend along the occipital region of the rear support structure to further anchor the display unit in its correct operational position. In some forms, these additional rigidisiers may be adjustable (angularly or translational) on other components of the forehead support connector (or adapted to be adjustable (angularly or translational) with respect to other components of the forehead support connector) to further assist in comfort, adjustability, and fit.

In some forms, the positioning and stabilising structure may allow for upward, e.g., superior, pivoting movement of the display unit to allow for movement of the display unit to a nonoperational position without removal of the positioning and stabilising structure (e.g., flip-up version). In some forms, the pivoting movement of the display unit involves a pivoting arrangement which includes the positioning and stabilising structure. In some forms, this pivoting arrangement may provide a release mechanism at the forehead support connector and/or provide limited hinging regions at the temporal connectors.

The positioning and stabilising structure in any form described above may be incorporated in a hood or other head wear either integrated therein or releasably connected thereto. The positioning and stabilising structure may also include other components integrated therein such as audio, tactile (haptic) stimulation or feedback.

Another aspect of the present technology relates to an interfacing structure of the head mounted display system constructed and arranged to be in opposing relation with the user's face.

In some forms, the interfacing structure comprises a face engaging surface including one or more regions of silicone, or one or more layers of a textile material or foam.

In some forms, the interfacing structure may have varying compliance to allow more selective distribution of force onto a user's face. In some forms, one or more regions of the face engaging surface may be formed to have varying thicknesses and/or varying surface finishes, whereby the resultant face engaging surface can have a variable compliance therealong when compressed against a user's face in use.

In some forms, the interfacing structure comprises a face engaging portion, a support structure to support the face engaging portion in position, and a chassis, which may be rigid (i.e., a rigid chassis).

Another aspect of the present technology relates to an interfacing structure for a head mounted display system that extends about the display and defines a viewing opening to the display. In some forms, the interfacing structure may include a plurality of adjustable face engaging portions being located at a respective one of the left and right hand sides of the interfacing structure. The adjustable face engaging portions may be movable relative to each other.

In some forms, the adjustable face engaging portions may be movable relative to a chassis of the interfacing structure. The interfacing structure may include an adjustment mechanism, such as a sliding tab (or a slidable tab) or rack-and-pinion style adjustment mechanism, to allow a user to selectively adjust the spacing of the face engaging portions.

In some forms, the interfacing structure includes components and/or regions that are removably mountable to a housing of the display unit.

An aspect of the present technology relates to a head-mounted display system including a positioning and stabilising structure structured and arranged to hold a display unit in an operational position over a user's face. The positioning and stabilising structure includes a support hoop including a posterior support portion adapted to contact a posterior region of the user's head and an anterior support portion adapted to contact an anterior region of the user's head. The posterior support portion of the support hoop is adapted to extend in a first plane and the anterior support portion of the support hoop is adapted to extend in a second plane, and each of the first plane of the posterior support portion and the second plane of the anterior support portion is adapted to extend transverse to the sagittal plane. The support hoop comprises an offset configuration in which the posterior support portion is offset from the anterior support portion so that the first plane of the posterior support portion is arranged in a different plane to the second plane of the anterior support portion. In an example, the head-mounted display system may further comprise the display unit.

An aspect of the present technology relates to a positioning and stabilising structure to hold a display unit in an operational position over a user's face. The positioning and stabilising structure includes a support hoop including a posterior support portion adapted to contact a posterior region of the user's head and an anterior support portion adapted to contact an anterior region of the user's head. The posterior support portion of the support hoop is adapted to extend in a first plane and the anterior support portion of the support hoop is adapted to extend in a second plane, and each of the first plane of the posterior support portion and the second plane of the anterior support portion is adapted to extend transverse to the sagittal plane. The support hoop comprises an offset configuration in which the posterior support portion is offset from the anterior support portion so that the first plane of the posterior support portion is arranged in a different plane to the second plane of the anterior support portion.

An aspect of the present technology relates to a head-mounted display system including a positioning and stabilising structure structured and arranged to hold a display unit in an operational position over a user's face. The positioning and stabilising structure includes a support hoop including a posterior support portion adapted to contact a posterior region of the user's head and an anterior support portion adapted to contact an anterior region of the user's head. The posterior support portion of the support hoop is adapted to extend in a first plane and the anterior support portion of the support hoop is adapted to extend in a second plane. Each of the first plane of the posterior support portion and the second plane of the anterior support portion is adapted to extend transverse to the sagittal plane. The posterior support portion and the anterior support portion are moveable relative to each other into at least one offset configuration in which the posterior support portion is offset from the anterior support portion so that the first plane of the posterior support portion is arranged in a different plane to the second plane of the anterior support portion. In an example, the head-mounted display system may further comprise the display unit.

In an example, the head-mounted display system may further comprise an adjustment mechanism structured and arranged to allow selectable adjustment of the posterior support portion relative to the anterior support portion. In an example, the adjustment mechanism may be structured and arranged to allow selectable adjustment between (1) an in-line configuration in which the first plane of the posterior support portion is arranged co-planar to the second plane of the anterior support portion, and (2) the at least one offset configuration. In an example, the at least one offset configuration may form a spacing or displacement between the first plane and the second plane, and the adjustment mechanism allows selectable adjustment of the spacing or displacement. In an example, the adjustment mechanism may allow angular adjustment of an angle formed between the first plane of the posterior support portion and the second plane of the anterior support portion. In an example, the posterior support portion may comprise an elastic strap that is biased into contact with an occipital region of the user. In an example, the posterior support portion may be configured and arranged engage the user's head along a portion of the occipital bone. In an example, the anterior support portion may be configured and arranged to engage the user's head along an upper portion of the frontal bone. In an example, the head-mounted display system may further comprise at least one connector structured and arranged to interconnect the posterior support portion and the anterior support portion to the display unit. In an example, the posterior support portion and the anterior support portion in the offset configuration may create a moment configured to counter-act or resist a moment induced by the display unit. In an example, the posterior support portion may comprise an elastic strap that is biased into contact with a portion of the occipital bone which creates an additional moment to counter-act or resist the moment induced by the display unit. In an example, the display unit may comprise a housing containing a display that is visible to the user when the display unit is in the operational position, and an interfacing structure constructed and arranged to be in opposing relation with the user's face, the interfacing structure extending about the display and defining a viewing opening to the display. In an example, the positioning and stabilising structure may further comprise a pair of central support structures, each of the pair of central support structures adapted to be positioned around a respective one of the user's ears, and wherein the display unit is rotatably connected to the pair of central support structures to enable the display unit to rotate relative to Frankfort horizontal. In an example, at least one of the anterior support portion and the posterior support portion may be rotatable relative to the pair of central support structures.

An aspect of the present technology relates to a positioning and stabilising structure to hold a display unit in an operational position over a user's face. The positioning and stabilising structure includes a support hoop including a posterior support portion adapted to contact a posterior region of the user's head and an anterior support portion adapted to contact an anterior region of the user's head. The posterior support portion of the support hoop is adapted to extend in a first plane and the anterior support portion of the support hoop is adapted to extend in a second plane, and each of the first plane of the posterior support portion and the second plane of the anterior support portion is adapted to extend transverse to the sagittal plane. The posterior support portion and the anterior support portion are moveable relative to each other into at least one offset configuration in which the posterior support portion is offset from the anterior support portion so that the first plane of the posterior support portion is arranged in a different plane to the second plane of the anterior support portion.

In an example, the positioning and stabilising structure may further comprise an adjustment mechanism structured and arranged to allow selectable adjustment of the posterior support portion relative to the anterior support portion. In an example, the adjustment mechanism may be structured and arranged to allow selectable adjustment between (1) an in-line configuration in which the first plane of the posterior support portion is arranged co-planar to the second plane of the anterior support portion, and (2) the at least one offset configuration. In an example, the at least one offset configuration may form a spacing or displacement between the first plane and the second plane, and the adjustment mechanism allows selectable adjustment of the spacing or displacement. In an example, the adjustment mechanism may allow angular adjustment of an angle formed between the first plane of the posterior support portion and the second plane of the anterior support portion. In an example, the posterior support portion may comprise an elastic strap that is biased into contact with an occipital region of the user. In an example, the posterior support portion may be configured and arranged engage the user's head along a portion of the occipital bone. In an example, the anterior support portion may be configured and arranged engage the user's head along an upper portion of the frontal bone. In an example, the positioning and stabilising structure may further comprise at least one at connector structured and arranged to interconnect the posterior support portion and the anterior support portion to the display unit. In an example, the posterior support portion and the anterior support portion in the offset configuration may create a moment configured to counter-act or resist a moment induced by the display unit. In an example, a portion of the posterior support portion may comprise an elastic strap that is biased into contact with a portion of the occipital bone which creates an additional moment to counter-act or resist the moment induced by the display unit. In an example, the positioning and stabilising structure may further comprise a pair of central support structures, each of the pair of central support structures adapted to be positioned around a respective one of the user's ears, and wherein the display unit is rotatably connectable to the pair of central support structures to enable the display unit to rotate relative to Frankfort horizontal. In an example, at least one of the anterior support portion and the posterior support portion may be rotatable relative to the pair of central support structures.

An aspect of the present technology relates to a head-mounted display system including a positioning and stabilising structure structured and arranged to hold a display unit in an operational position over a user's face in use. The positioning and stabilising structure includes a support portion configured and arranged to accommodate a weight of the head-mounted display unit. The support portion comprises a pair of central support structures, each of the pair of central support structures adapted to be positioned around a respective one of the user's ears. In an example, the display unit may be rotatably connected to the pair of central support structures to enable the display unit to rotate relative to Frankfort horizontal. In an example, the head-mounted display system may further comprise the display unit.

An aspect of the present technology relates to a positioning and stabilising structure to hold a display unit in an operational position over a user's face. The positioning and stabilising structure includes a support portion configured and arranged to accommodate a weight of the display unit. The support portion comprises a pair of central support structures, each of the pair of central support structures adapted to be positioned around a respective one of the user's ears. The display unit is rotatably connected to the pair of central support structures to enable the display unit to rotate relative to Frankfort horizontal.

An aspect of the present technology relates to a head-mounted display system including a positioning and stabilising structure structured and arranged to hold a display unit in an operational position over a user's face in use. The positioning and stabilising structure includes a posterior support portion adapted to contact a posterior region of the user's head and an anterior support portion adapted to contact an anterior region of the user's head. The posterior support portion comprises a rigidiser that is substantially inextensible and substantially resilient. The rigidiser comprises a plurality of slots on at least one side of the rigidiser, and the plurality of slots form a plurality of hinges. In an example, the head-mounted display system may further comprise the display unit.

An aspect of the present technology relates to a positioning and stabilising structure to hold a display unit in an operational position over a user's face. The positioning and stabilising structure includes a posterior support portion adapted to contact a posterior region of the user's head and an anterior support portion adapted to contact an anterior region of the user's head. The posterior support portion comprises a rigidiser that is substantially inextensible and substantially resilient. The rigidiser comprises a plurality of slots on at least one side of the rigidiser, and the plurality of slots form a plurality of hinges.

An aspect of the present technology relates to a head-mounted display system including a positioning and stabilising structure structured and arranged to hold the display unit in an operational position over a user's face in use and an interfacing structure for the display unit constructed and arranged to be in opposing relation with the user's face. The interfacing structure comprises a substantially continuous face engaging surface adapted to contact the user's face around a periphery of the user's eyes. The interfacing structure comprises silicone. The interfacing structure is configured and arranged such that force applied to the user's face is distributed around the periphery thereof. The interfacing structure comprises a first compliance at a first region and a second compliance at a second region, wherein the first region and the second region are configured around the periphery of the interfacing structure to allow selective distribution of the force onto the user's face. In an example, the head-mounted display system may further comprise the display unit.

An aspect of the present technology relates to an interfacing structure for a display unit constructed and arranged to be in opposing relation with a user's face. The interfacing structure comprises a substantially continuous face engaging surface adapted to contact the user's face around a periphery of the user's eyes. The interfacing structure comprises silicone. The interfacing structure is configured and arranged such that force applied to the user's face is distributed around the periphery thereof. The interfacing structure includes a first compliance at a first region and a second compliance at a second region, wherein the first region and the second region are configured around the periphery of the interfacing structure to allow selective distribution of the force onto the user's face.

An aspect of the present technology relates to a head-mounted display system including a positioning and stabilising structure structured and arranged to hold a display unit in an operational position over a user's face in use and an interfacing structure for the display unit constructed and arranged to be in opposing relation with the user's face, the interfacing structure extending about a display that is visible to the user when the display unit is in the operational position and defining (or forming) a viewing opening to the display. The interfacing structure comprises face engaging portions located at a respective one of left and right hand sides of the viewing opening, the face engaging portions structured and arranged to be slidably movable relative to each other. In an example, the head-mounted display system may further comprise the display unit.

An aspect of the present technology relates to an interfacing structure for a display unit constructed and arranged to be in opposing relation with a user's face. The interfacing structure extends about a display that is visible to the user when the display unit is in an operational position and defines a viewing opening to the display. The interfacing structure includes moveable face engaging portions located at a respective one of left and right hand sides of the viewing opening, the moveable face engaging portions structured and arranged to be slidably movable relative to each other.

Another aspect of the present technology relates to a head mounted-display system or assembly including a positioning and stabilising structure and/or an interfacing structure in any form described above, and a display unit connected thereto.

Another aspect of the present technology comprises a virtual reality display interface or apparatus comprising examples of the aspects of the head-mounted display system described above.

In examples of the aspects of the head-mounted display system described above, the display unit comprises a display configured to selectively output computer generated images that are visible to the user in an operational position.

In examples of the aspects of the head-mounted display system described above, the display unit comprises a housing.

In some forms, the housing supports a display.

In examples of the aspects of the head-mounted display system described above, the display unit comprises an interfacing structure coupled to the housing and arranged to be in opposing relation with the user's face in the operational position.

In some forms, the interfacing structure at least partially forms a viewing opening configured to at least partially receive the user's face in the operational position.

In some forms, the interfacing structure being constructed at least partially from an opaque material configured to at least partially block ambient light from reaching the viewing opening in the operational position.

In examples of the aspects of the head-mounted display system described above, the display unit comprises at least one lens coupled to the housing and disposed within the viewing opening and aligned with the display so that in the operational position.

In some forms, the user can view the display through the at least one lens.

In examples of the aspects of the head-mounted display system described above, a control system having at least one sensor in communication with a processor.

In some forms, the at least one sensor configured to measure a parameter and communicate a measured value to the processor.

In some forms, the processor configured to change the computer generated images output by the display based on the measured value.

Another aspect of the present technology comprises an augmented reality display interface or apparatus comprising examples of the aspects of the head-mounted display system described above.

In examples of the aspects of the head-mounted display system described above, the display unit comprises a display constructed from a transparent or translucent material and configured to selectively provide computer generated images viewable by the user.

In examples of the aspects of the head-mounted display system described above, the display unit comprises a housing.

In some forms, the housing supports a display.

In examples of the aspects of the head-mounted display system described above, the display unit comprises an interfacing structure coupled to the housing and arranged to be in opposing relation with the user's face in the operational position.

In examples of the aspects of the head-mounted display system described above, in an operational position, the positioning and stabilizing structure configured to support the display unit.

In examples of the aspects of the head-mounted display system described above, the display configured to be aligned with the user's eyes in an operation position such that the user may at least partially view a physical environment through the display regardless of the computer generated images output by the display.

In examples of the aspects of the head-mounted display system described above, the head-mounted display system further comprising a control system having at least one sensor in communication with a processor.

In some forms, the at least one sensor configured to measure a parameter and communicate a measured value to the processor.

In some forms, the processor configured to change the computer generated images output by the display based on the measured value.

In some forms, the at least one lens includes a first lens configured to be aligned with the user's left eye in the operational position and a second lens configured to be aligned with the user's right eye in the operational position.

In some forms, the first lens and the second lens are Fresnel lenses.

In some forms, the display comprises a binocular display partitioned into a first section and a second section, the first section aligned with the first lens and the second section aligned with the second lens.

In some forms, a controller having at least one button selectively engageable by a user's finger, the controller being in communication with the processor and configured to send a signal to the processor when the at least one button is engaged, the processor configured to change the computer generated images output by the display based on the signal.

In some forms, the at least one lens includes a first lens configured to be aligned with the user's left eye in the operational position and a second lens configured to be aligned with the user's right eye in the operational position.

Of course, portions of the aspects may form sub-aspects of the present technology. Also, various ones of the sub-aspects and/or aspects may be combined in various manners and also constitute additional aspects or sub-aspects of the present technology.

Other features of the technology will be apparent from consideration of the information contained in the following detailed description, abstract, drawings and claims.

4 BRIEF DESCRIPTION OF THE DRAWINGS

The present technology is illustrated by way of example, and not by way of limitation, in the figures of the accompanying drawings, in which like reference numerals refer to similar elements including:

4.1 FACIAL ANATOMY

Figure 1A:
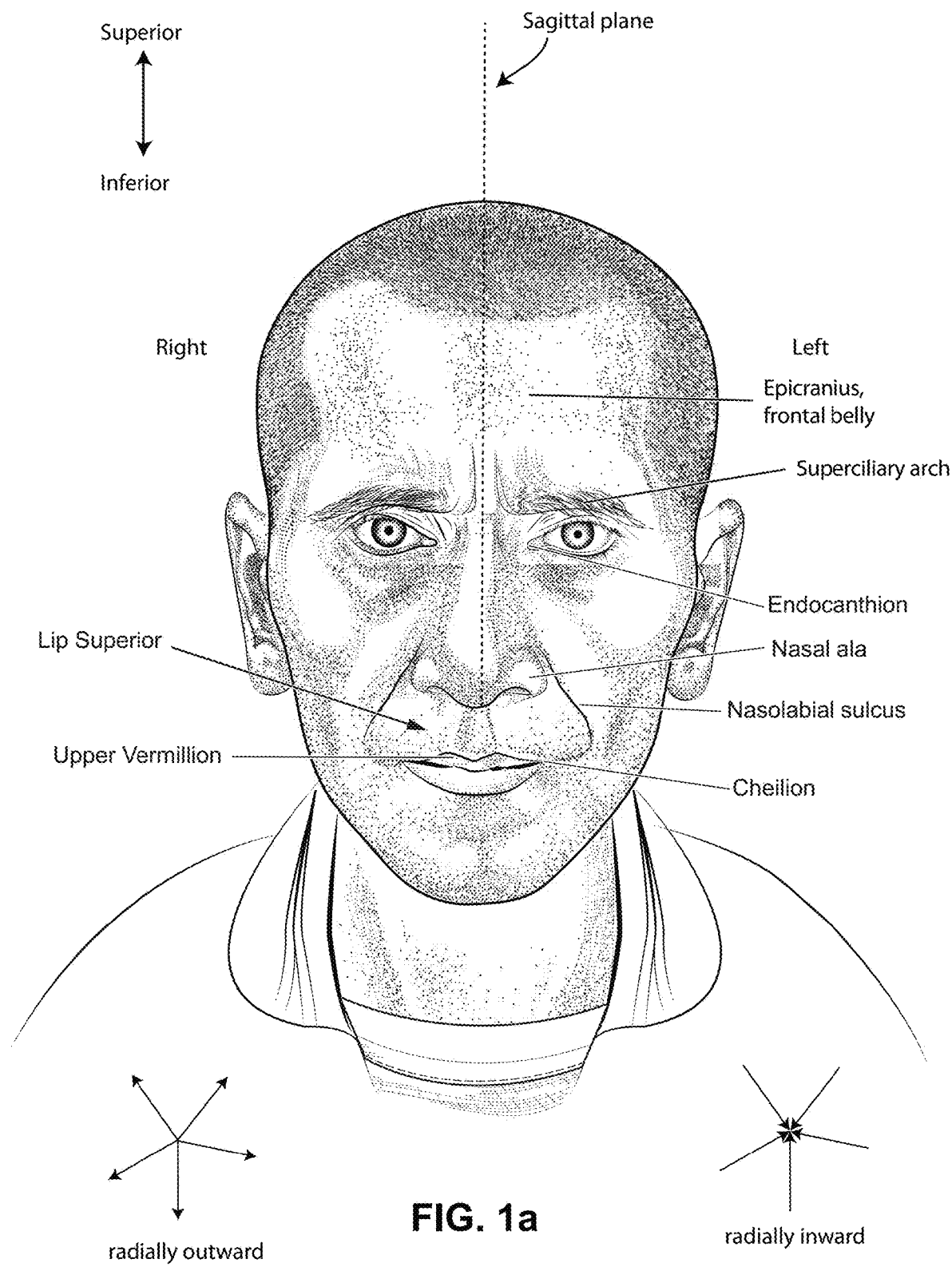
FIG. 1a is a front view of a face with several features of surface anatomy identified including the endocanthion, superciliary arch and epicranius, lip superior, upper vermilion, nasal ala, nasolabial sulcus and cheilion. Also indicated is the left and right side of the sagittal plane and the directions superior, inferior, radially inward and radially outward.
Figure 1B:
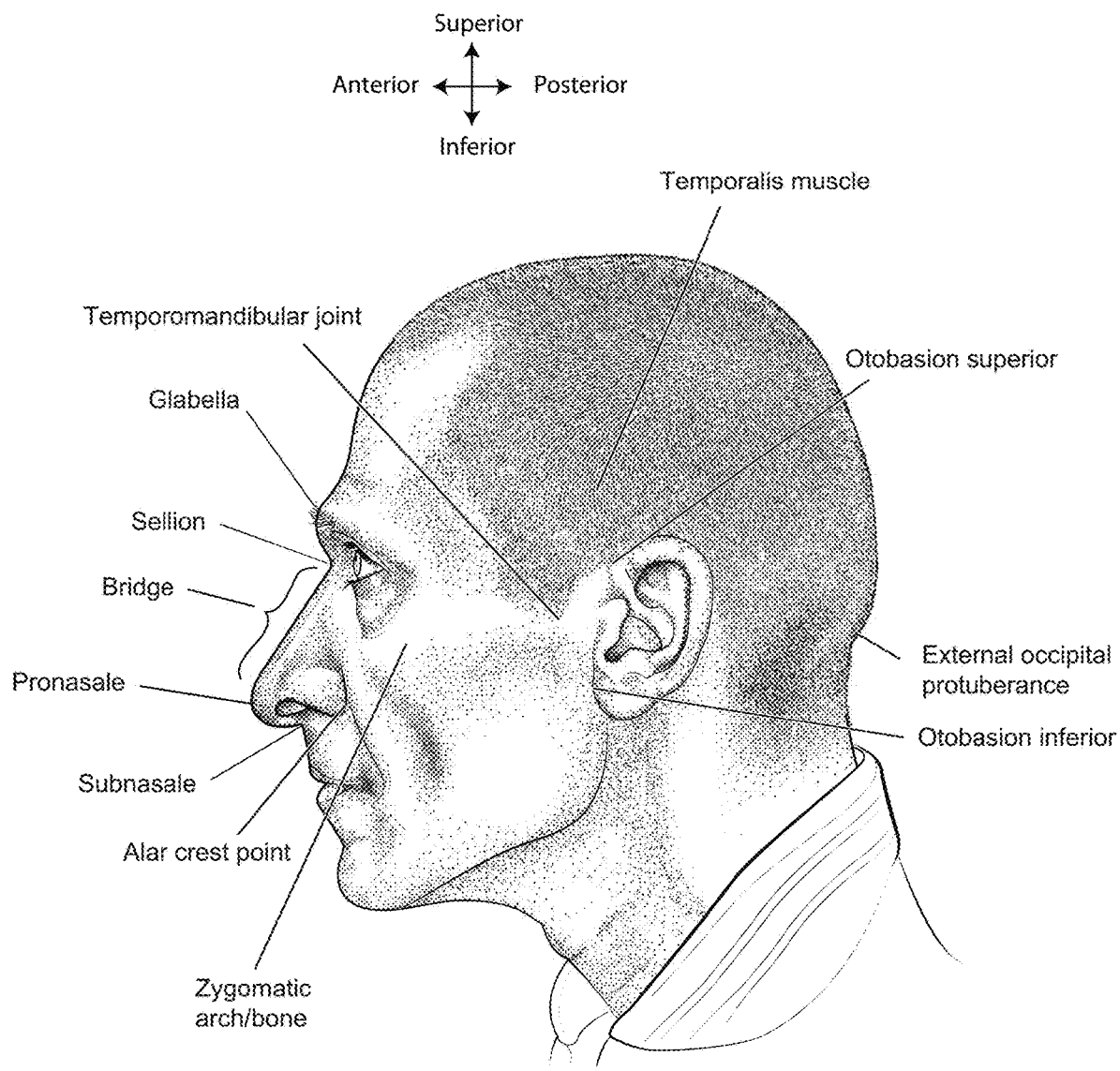
FIG. 1b is a side view of a head with several features of surface anatomy identified including the temporomandibular joint, glabella, sellion, nasal bridge, zygomatic arch/bone, otobasion superior, external occipital protuberance, otobasion inferior, pronasale, subnasale, alar crest point and the temporalis muscle. Also indicated are the directions superior & inferior, and anterior & posterior.
Figure 1C:
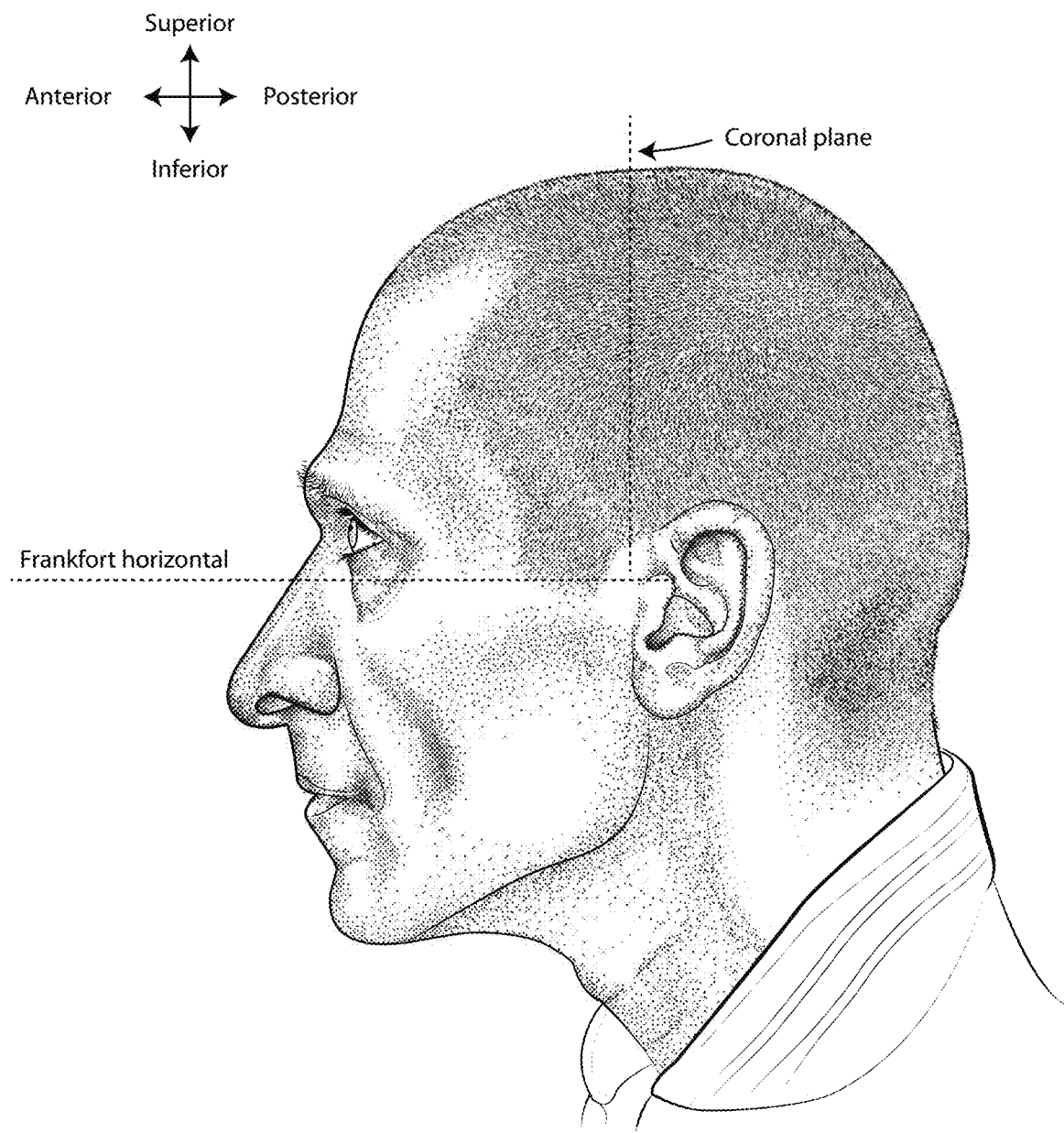

FIG. 1c is a further side view of a head. The approximate location of the Frankfort horizontal is indicated. The coronal plane is also indicated.

Figure 1D:
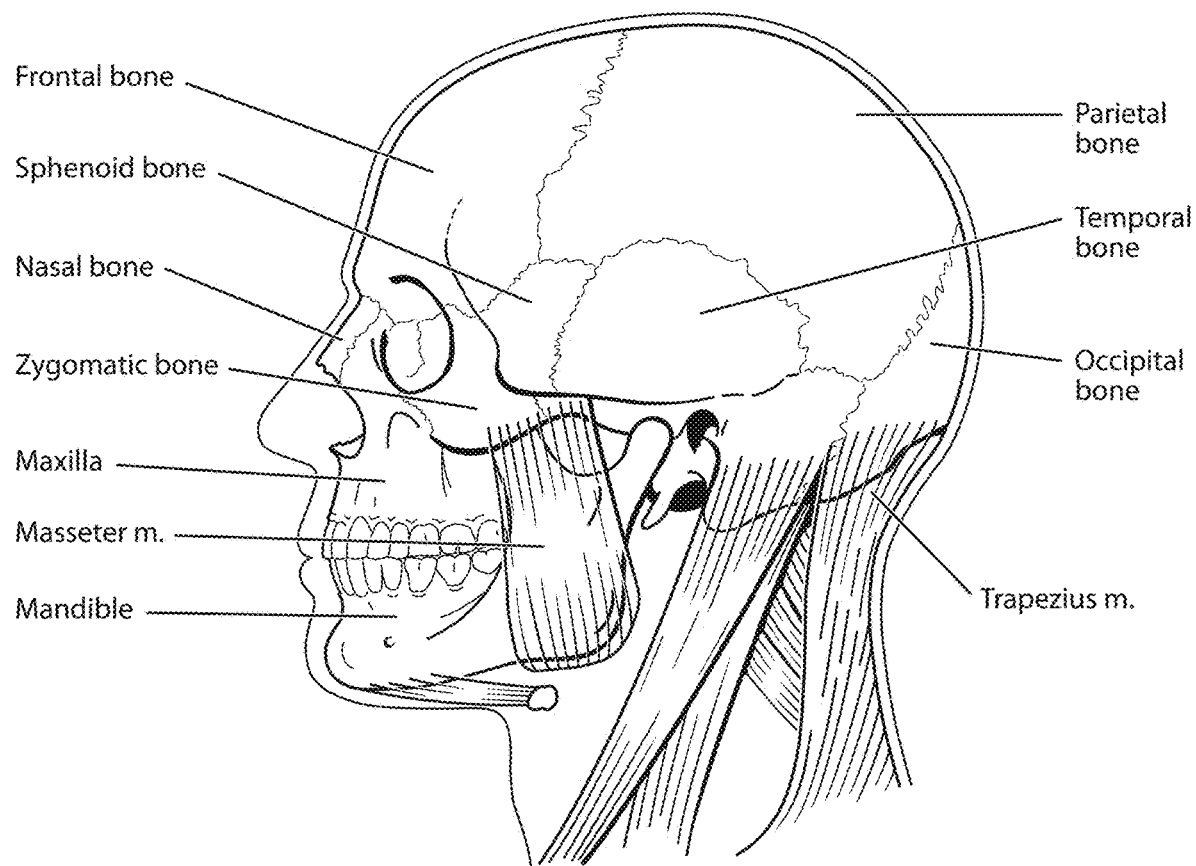

FIG. 1d shows a lateral view of a skull with the outline of the surface of a head, as well as several muscles. The following bones are shown: frontal, sphenoid, nasal, zygomatic, maxilla, mandible, parietal, temporal and occipital. The following muscles are shown: masseter minor and trapezius.

Figure 1E:
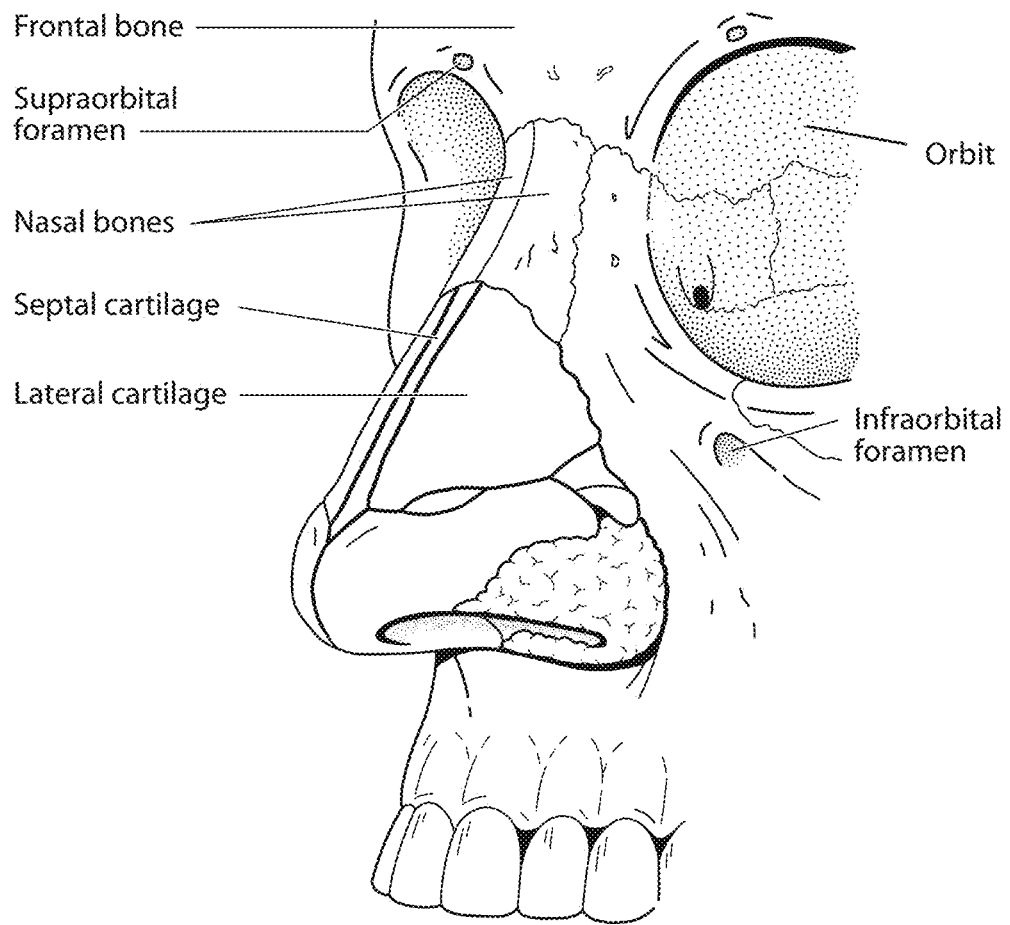

FIG. 1e shows an anterolateral view of a nose. The following bones are shown: frontal, supraorbital foramen, nasal, septal cartilage, lateral cartilage, orbit and infraorbital foramen.

4.2 SHAPE OF STRUCTURES

FIG. 2a shows a schematic of a cross-section through a structure at a point P. An outward normal at the point P is indicated. The curvature at the point P has a positive sign, and a relatively large magnitude when compared to the magnitude of the curvature shown in FIG. 2b.

FIG. 2b shows a schematic of a cross-section through a structure at a point. An outward normal at the point is indicated. The curvature at the point has a positive sign, and a relatively small magnitude when compared to the magnitude of the curvature shown in FIG. 2a.

FIG. 2c shows a schematic of a cross-section through a structure at a point. An outward normal at the point is indicated. The curvature at the point has a value of zero.

FIG. 2d shows a schematic of a cross-section through a structure at a point. An outward normal at the point is indicated. The curvature at the point has a negative sign, and a relatively small magnitude when compared to the magnitude of the curvature shown in FIG. 2e.

FIG. 2e shows a schematic of a cross-section through a structure at a point. An outward normal at the point is indicated. The curvature at the point has a negative sign, and a relatively large magnitude when compared to the magnitude of the curvature shown in FIG. 2d.

FIGS. 2f, 2g and 2h show a seal forming structure. An exterior surface of the cushion is indicated in FIG. 2f. An edge of the surface is indicated in FIG. 2g. A path on the surface between points A and B is indicated in FIG. 2g. A straight-line distance between A and B is indicated in FIG. 2g. Two saddle regions and a dome region are indicated in FIG. 2h.

Figure 2I:
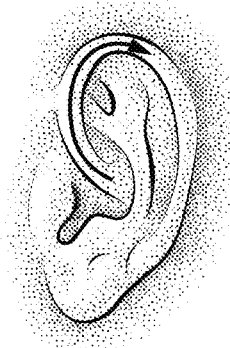

FIG. 2i shows a left ear, including the left ear helix.

Figure 2J:
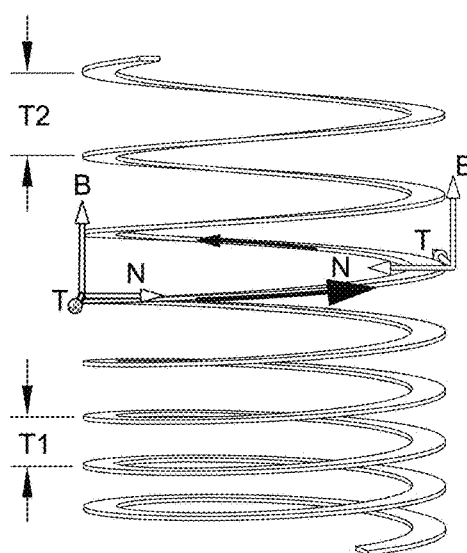

FIG. 2j shows a right-hand helix.

Figure 2K:
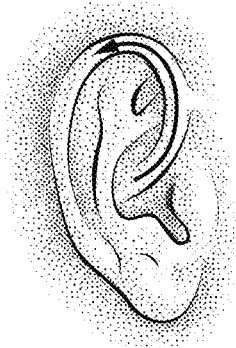

FIG. 2k shows a right ear, including the right ear helix.

Figure 2L:
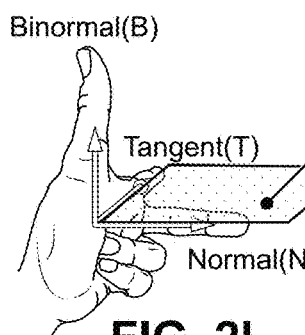

FIG. 2l illustrates a left-hand rule.

Figure 2M:
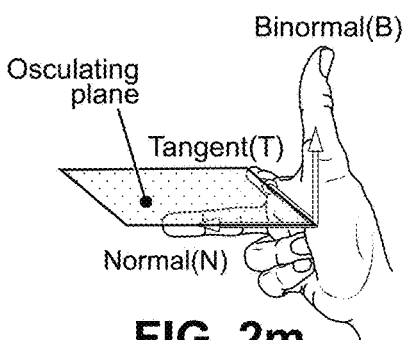

FIG. 2m illustrates a right-hand rule.

Figure 2N:
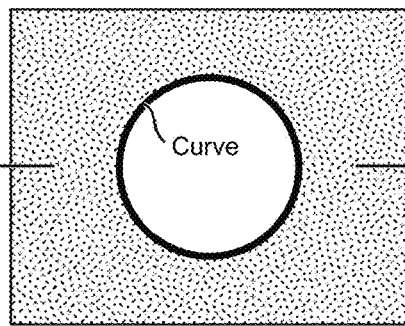

FIG. 2n shows the surface of a structure, with a one-dimensional hole in the surface. The illustrated plane curve forms the boundary of a one-dimensional hole.

Figure 2P:
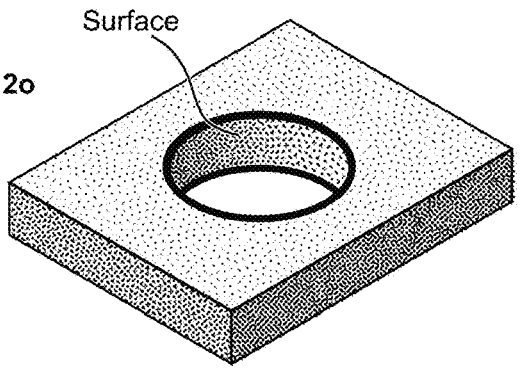
Figure 2O:
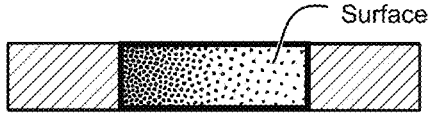

FIG. 2o shows a cross-section through the structure of FIG. 2n. The illustrated surface bounds a two-dimensional hole in the structure of FIG. 2n.

FIG. 2p shows a perspective view of the structure of FIG. 2n, including the two-dimensional hole and the one-dimensional hole. Also shown is the surface that bounds a two-dimensional hole in the structure of FIG. 2n.

4.3 HEAD MOUNTED DISPLAY

4.3.1 Positioning and Stabilising Structure

Figure 3A:
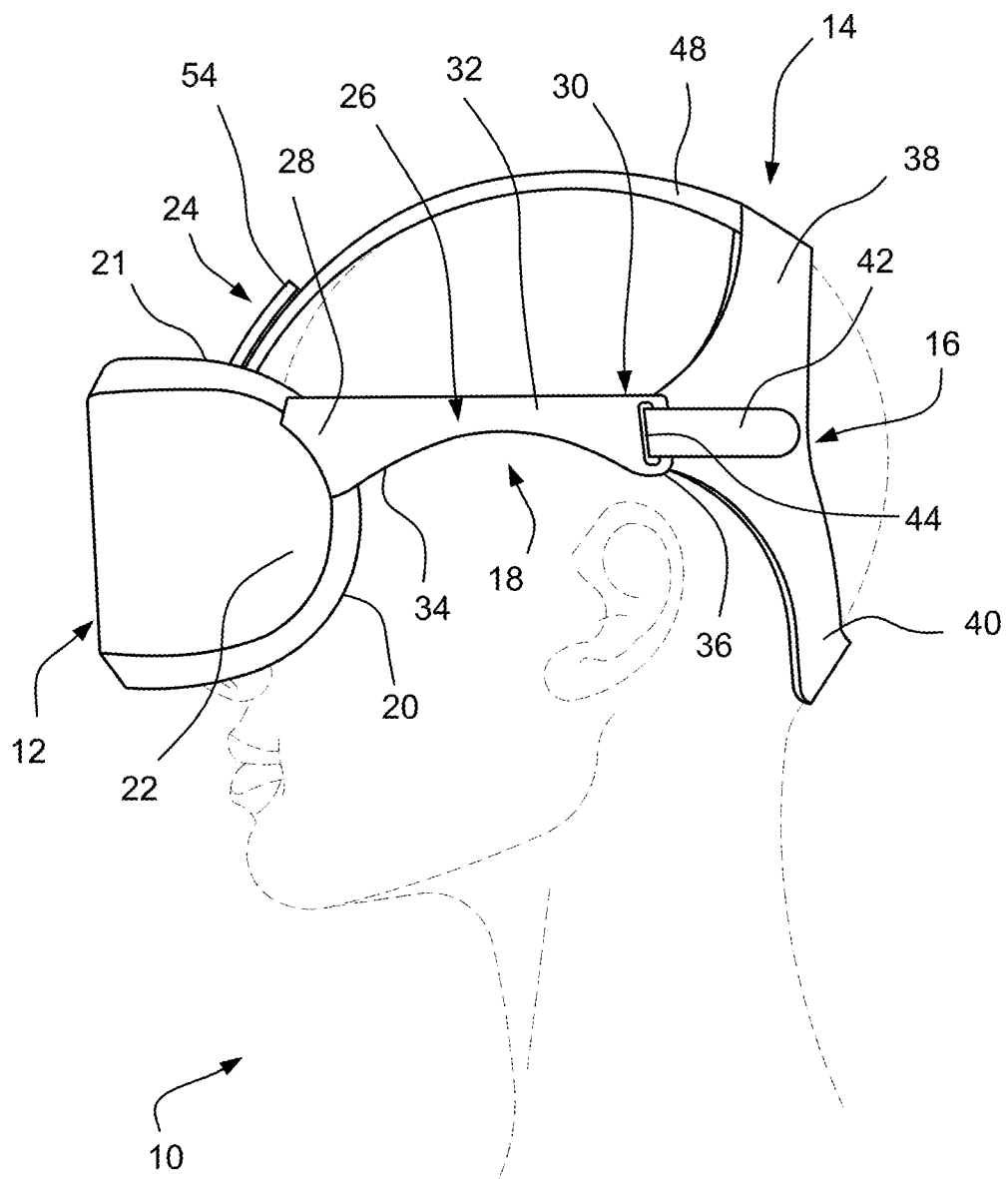
Figure 3B:
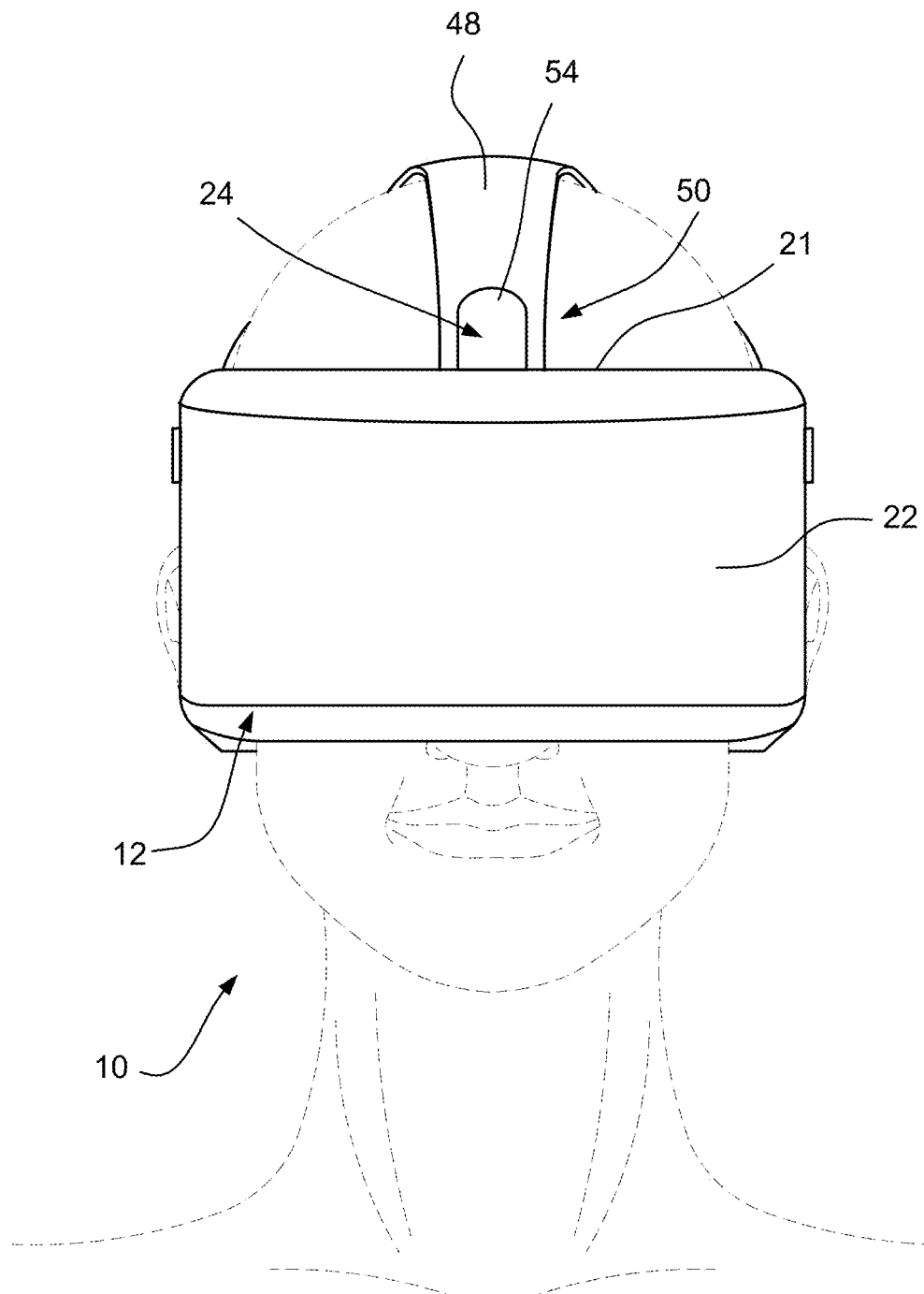

FIGS. 3a to 3c are respective side, front and top views of a positioning and stabilising structure of a head-mounted display system according to a first example of the present technology.

FIG. 3d is a cross-sectional view of a temporal arm of the head-mounted display assembly of FIGS. 3a to 3c according to an example of the present technology.

FIG. 3e is a cross-sectional view of a temporal arm of the head-mounted display assembly of FIGS. 3a to 3c according to another example of the present technology.

Figure 4A:
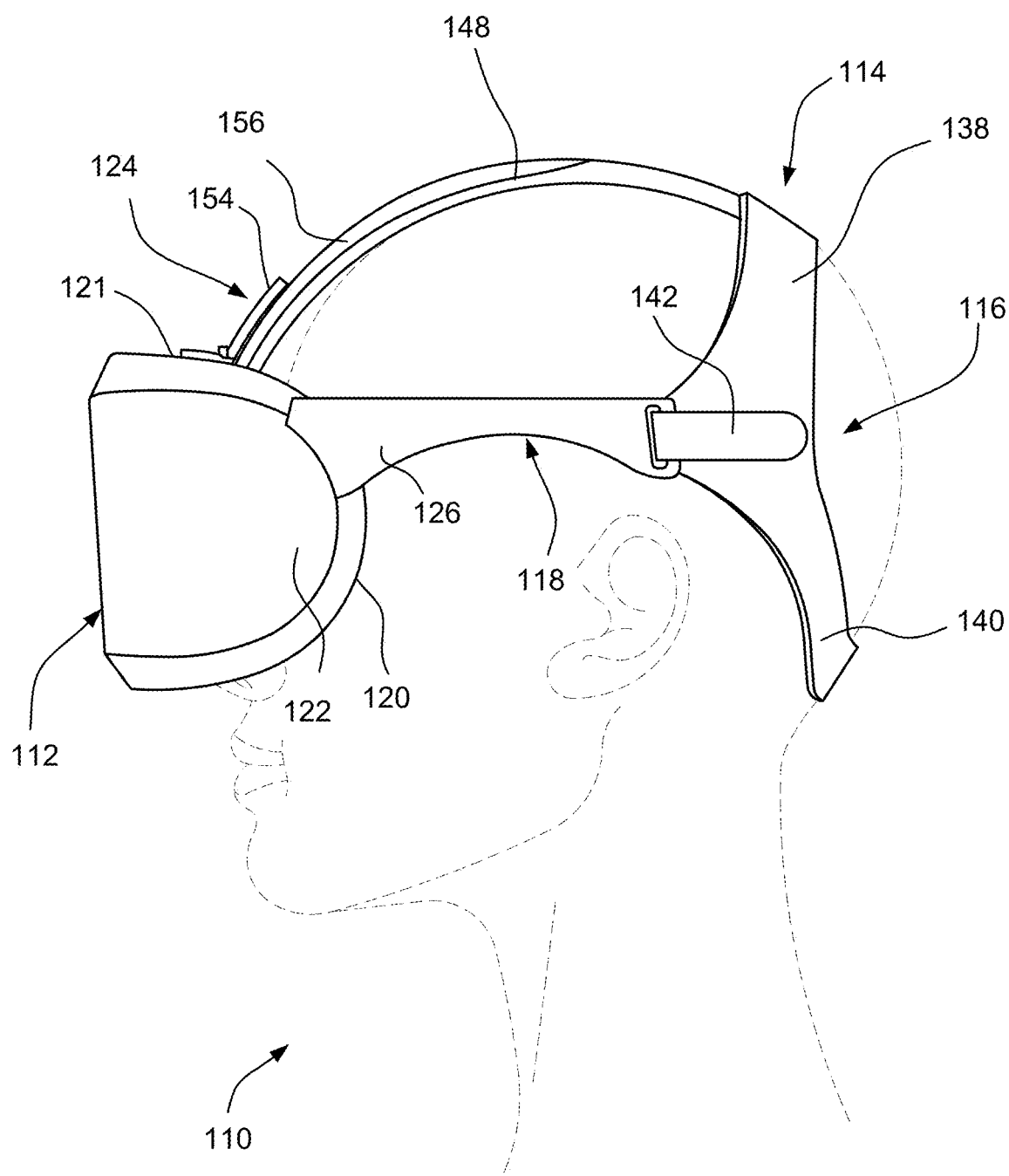
Figure 4B:
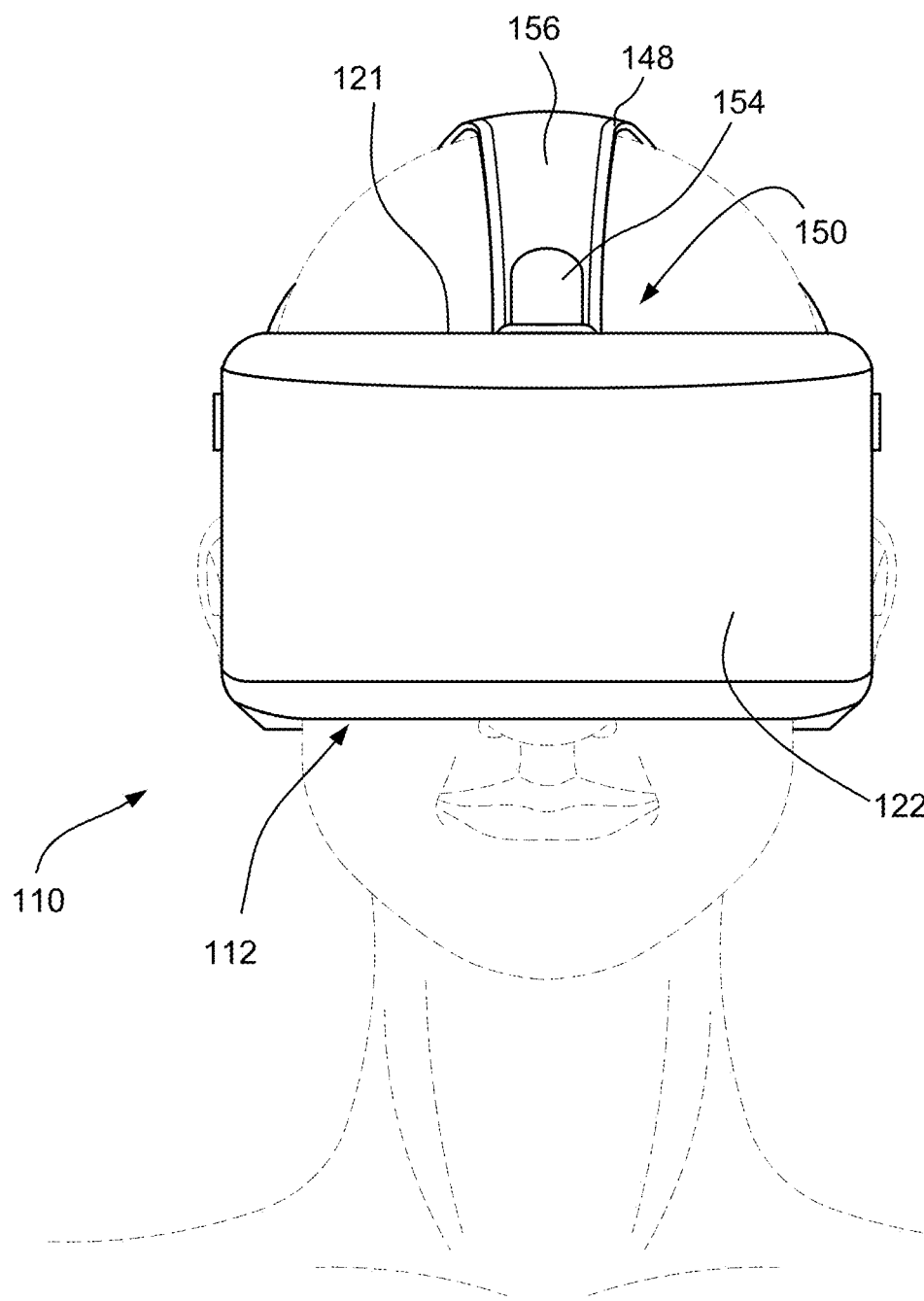
Figure 4C:
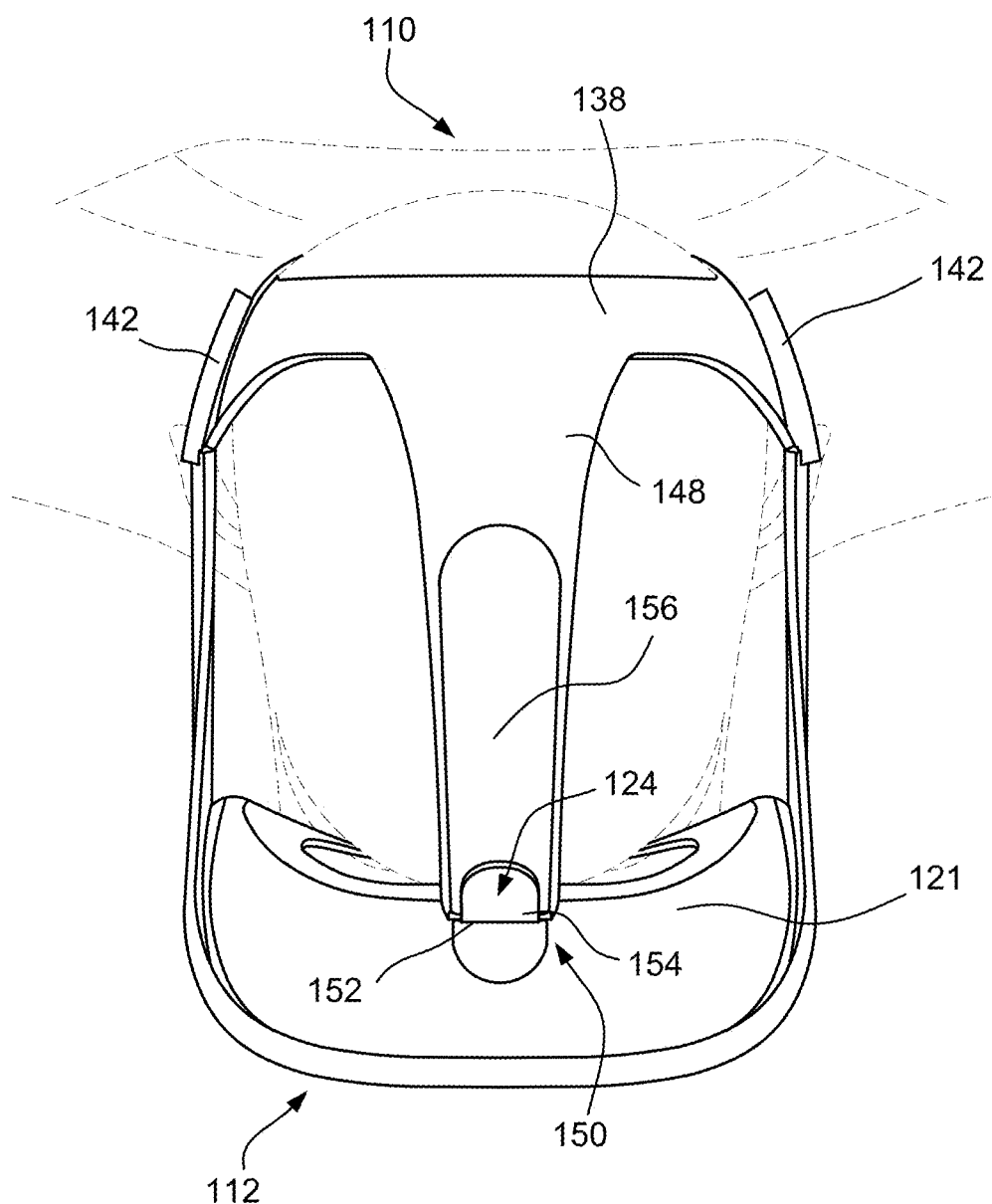

FIGS. 4a to 4c are respective side, front and top views of a positioning and stabilising structure of a head mounted display system according to a second example of the present technology.

Figure 5A:
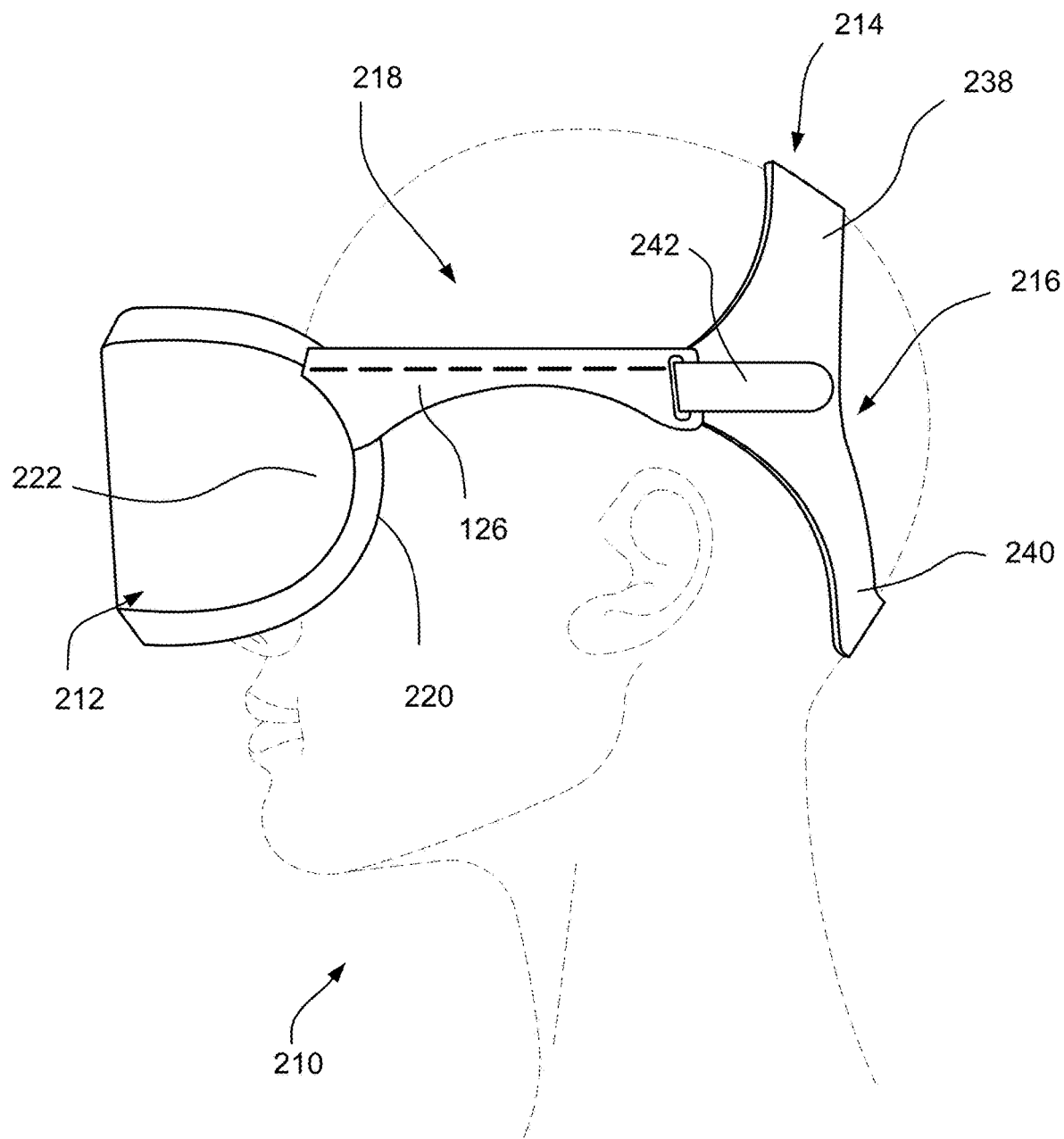
Figure 5B:
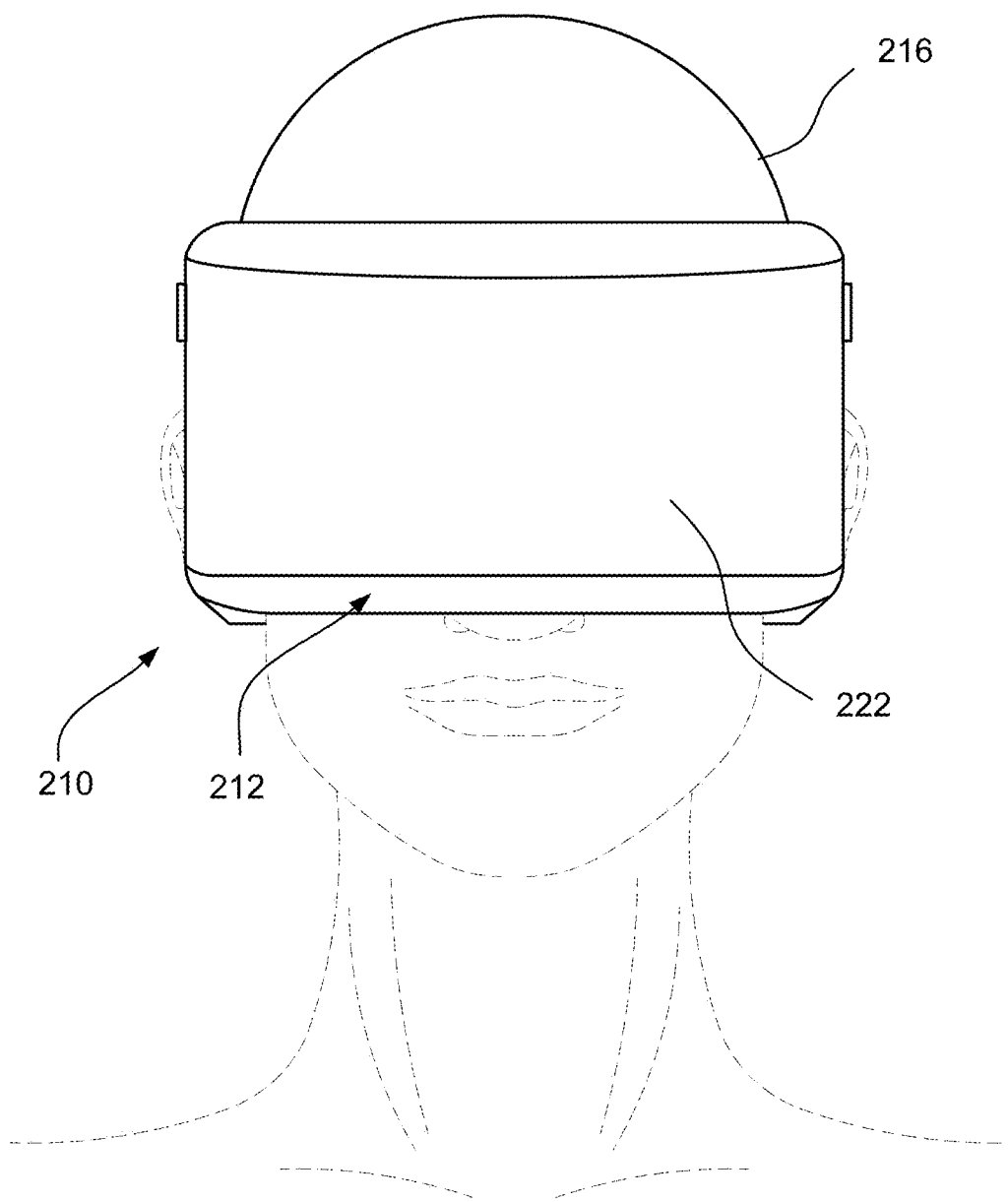
Figure 5C:
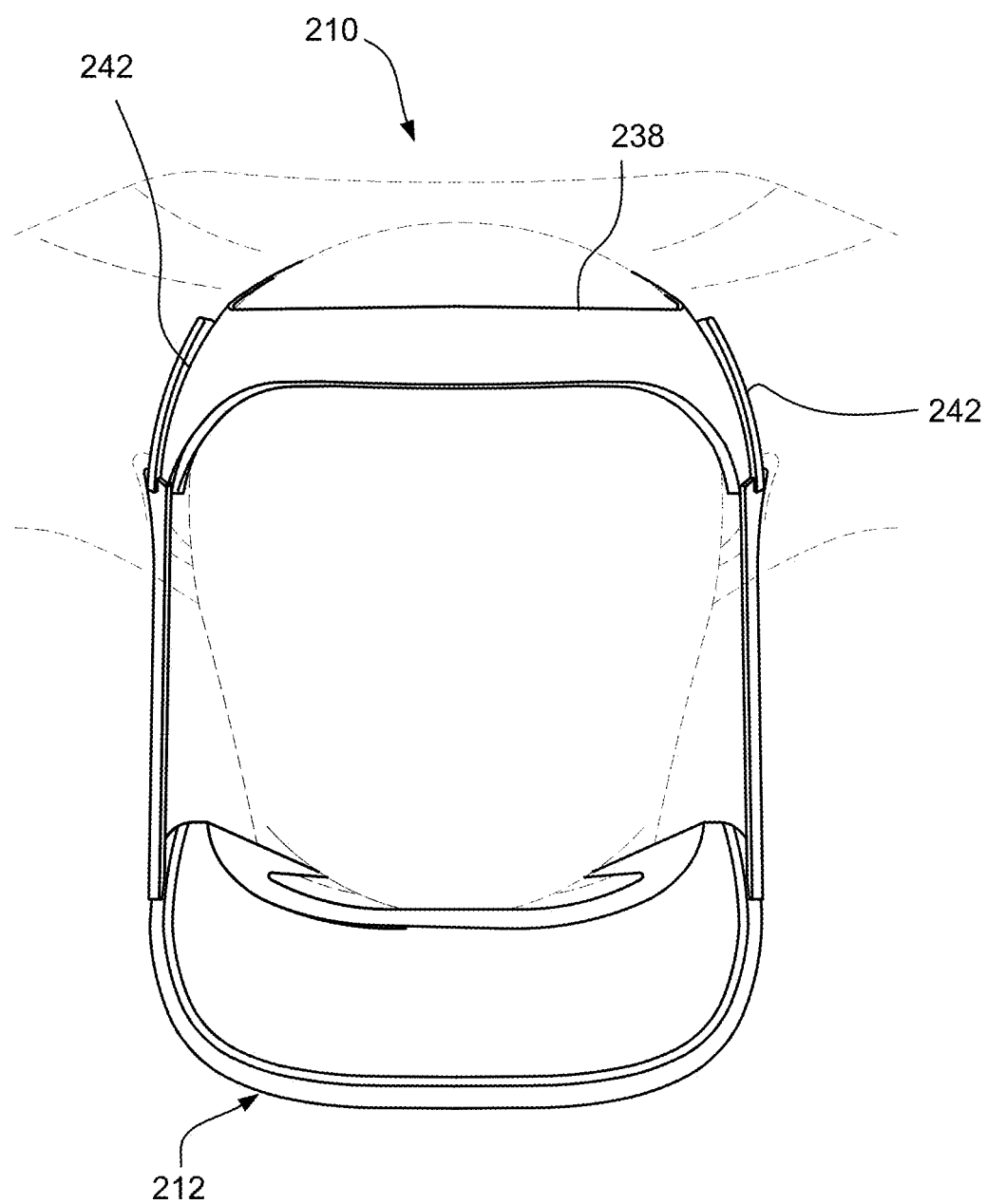

FIGS. 5a to 5c are respective side, front and top views of a positioning and stabilising structure of a head-mounted display system according to a third example of the present technology.

Figure 6:
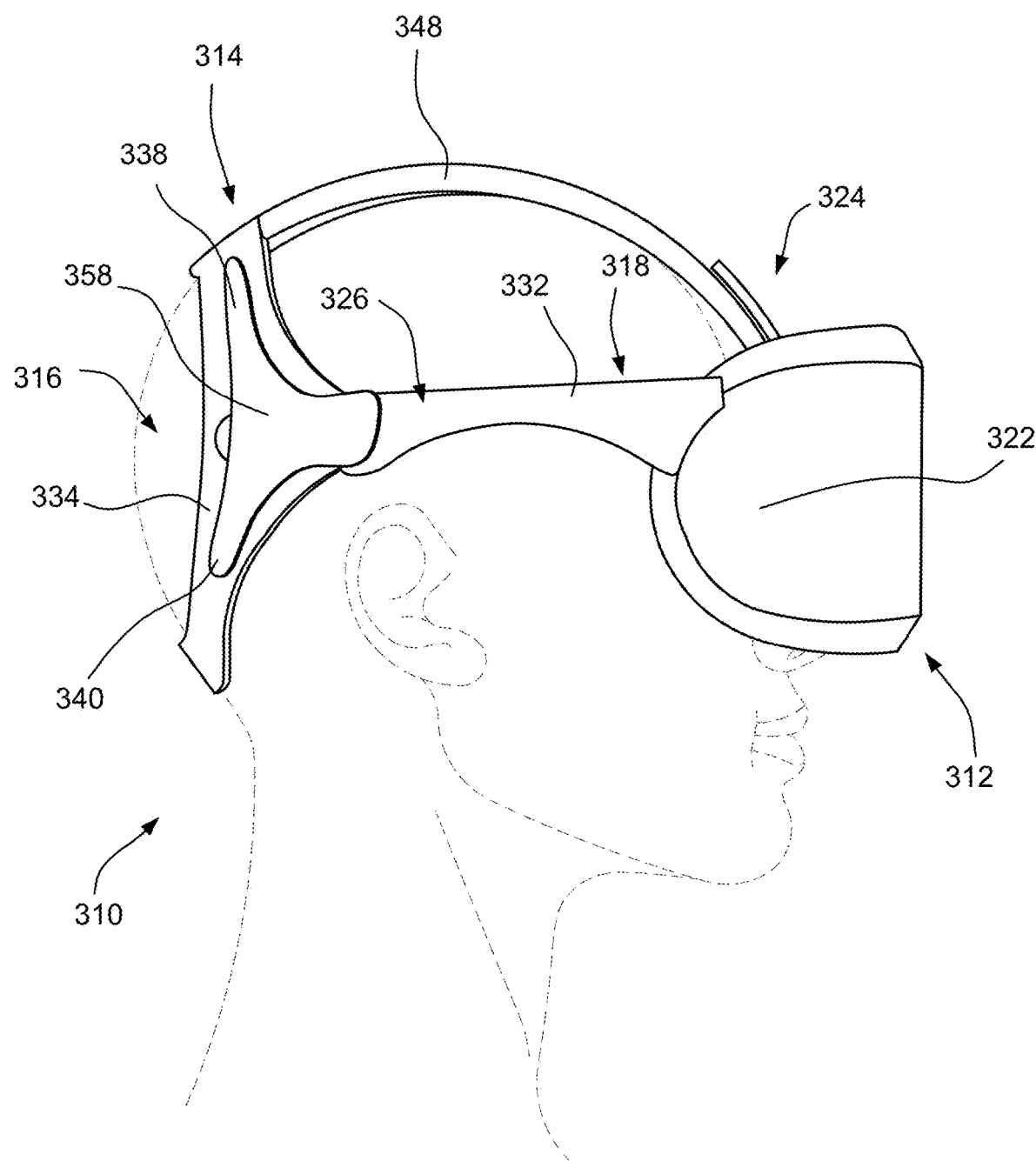

FIG. 6 is a side view of a positioning and stabilising structure of head-mounted display system according to a fourth example of the present technology.

Figure 7A:
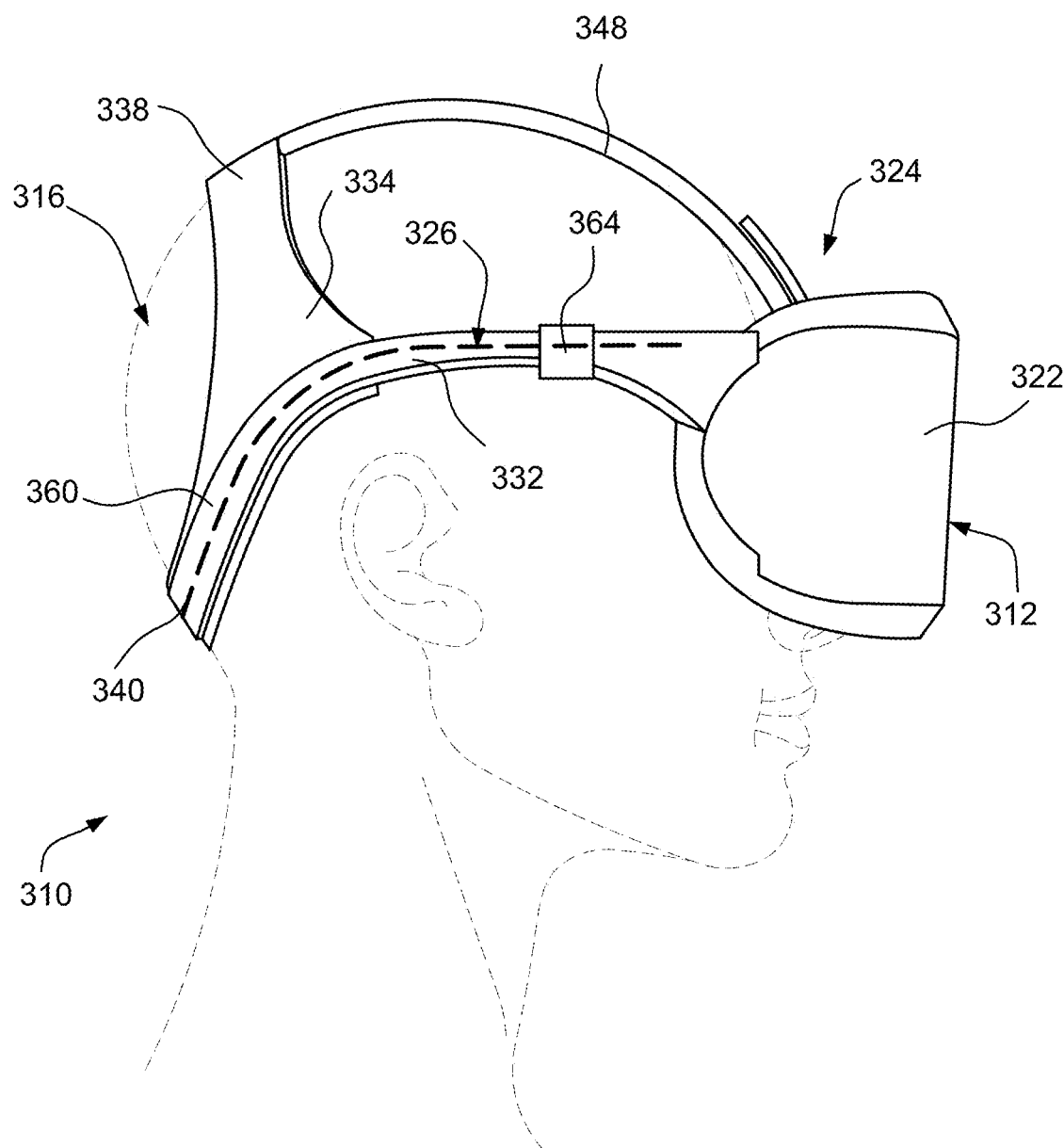
Figure 7B:
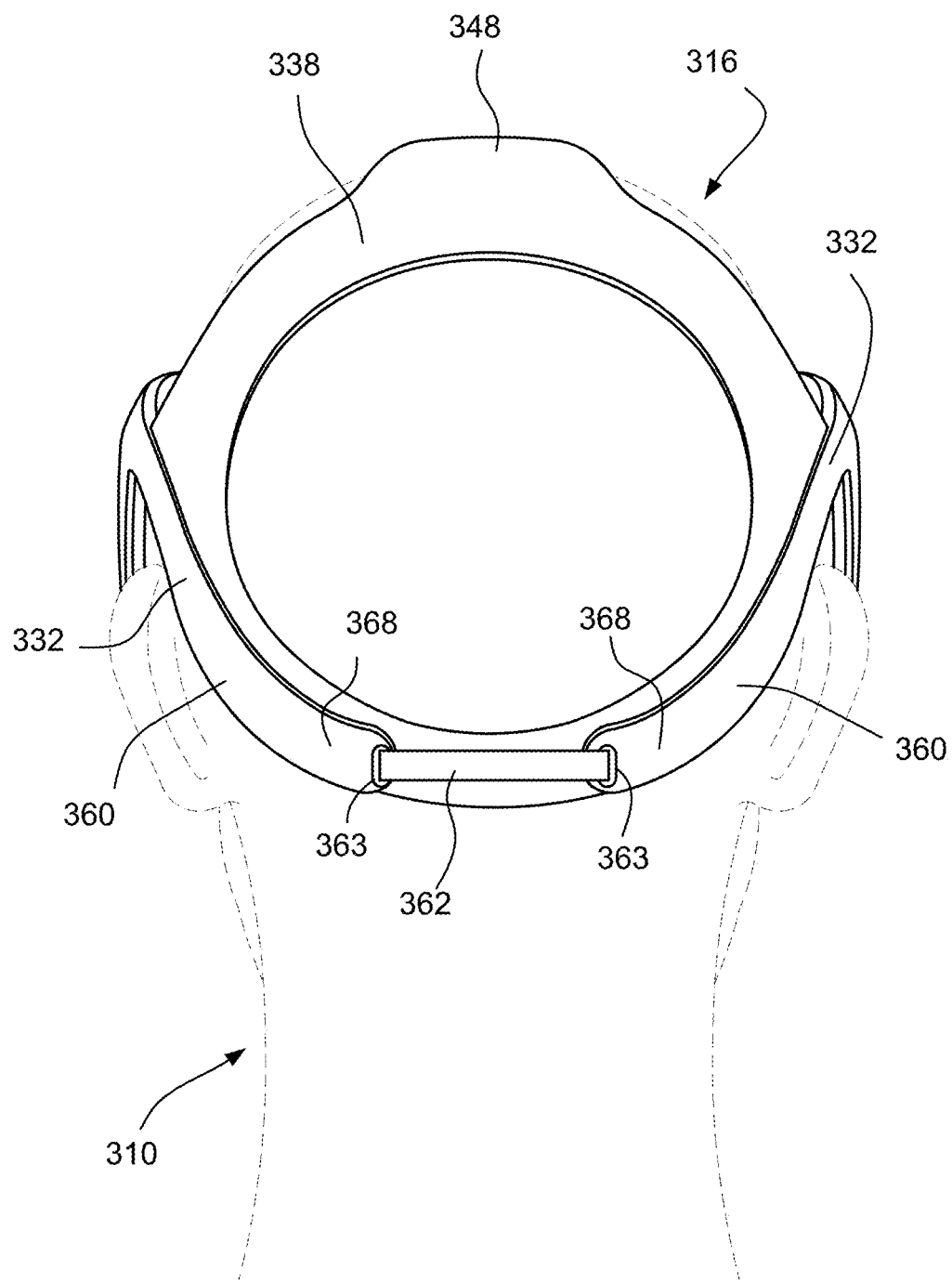
Figure 7C:
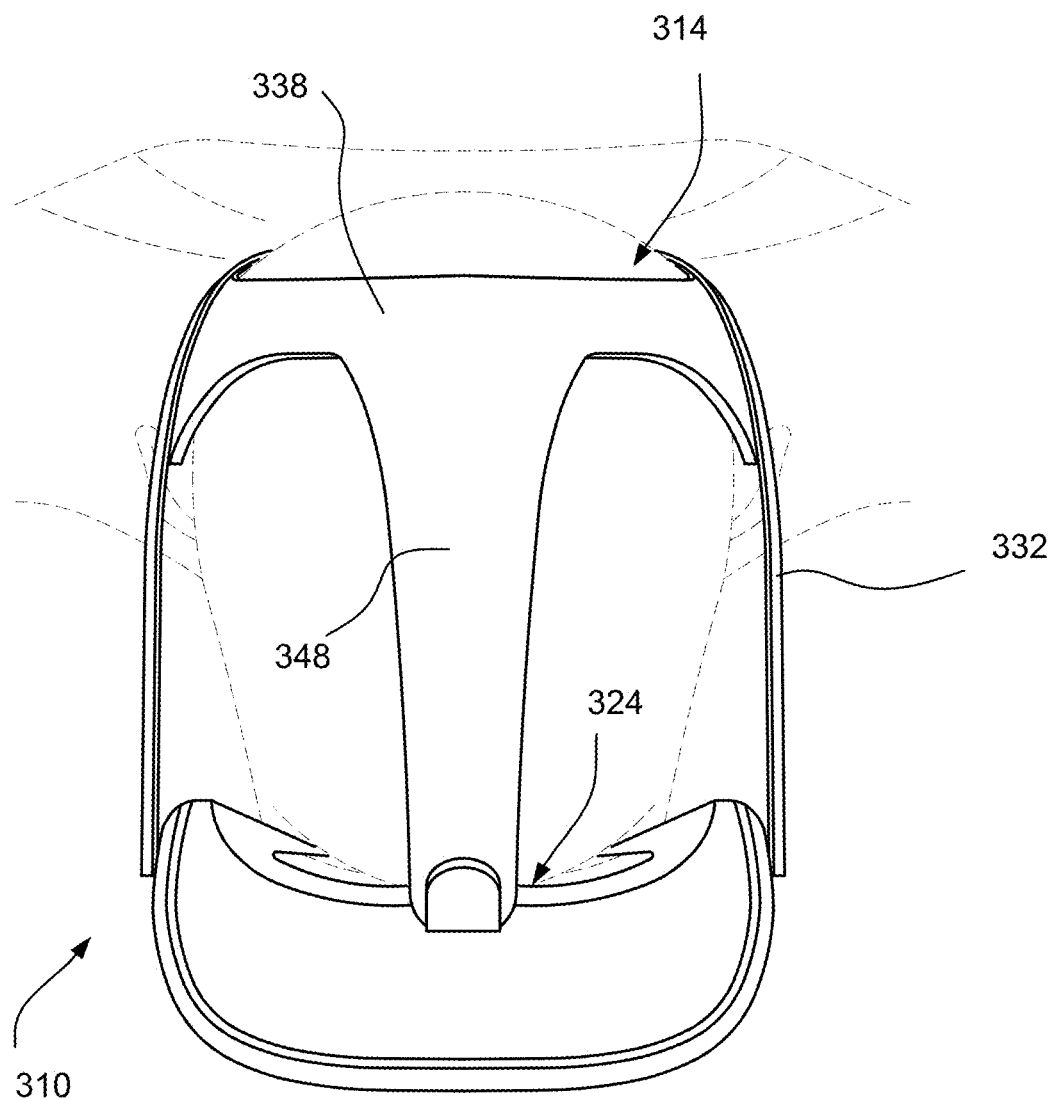

FIGS. 7a to 7c are respective side, front and top views of a head-mounted display system according to a variation of the fourth example of the present technology.

Figure 8:
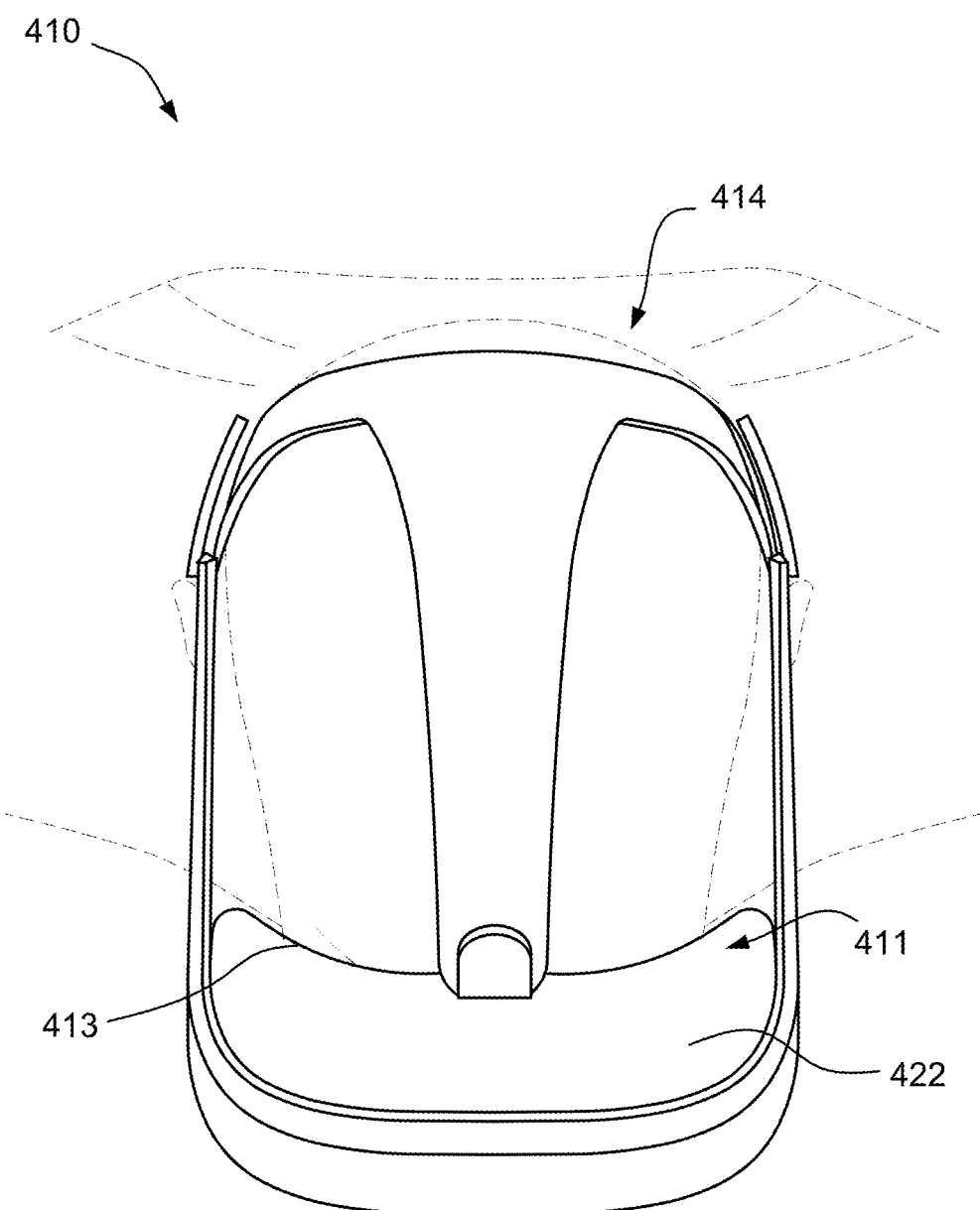

FIG. 8 is a top view of a head-mounted display assembly in-use according to a variation of the fourth example of the present technology.

Figure 9A:
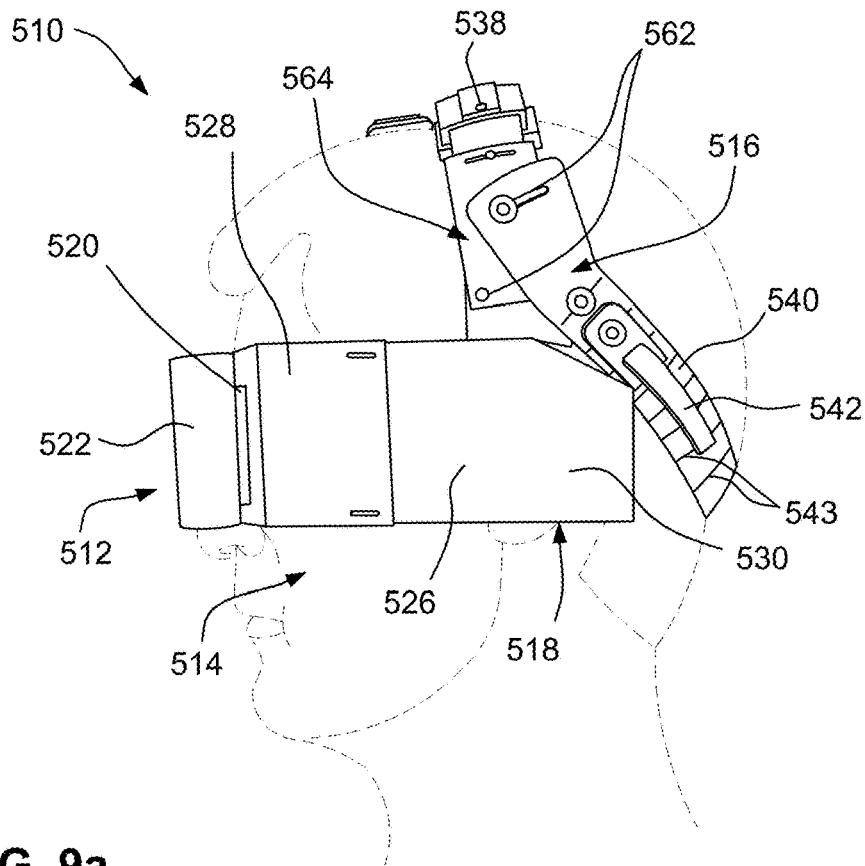
Figure 9B:
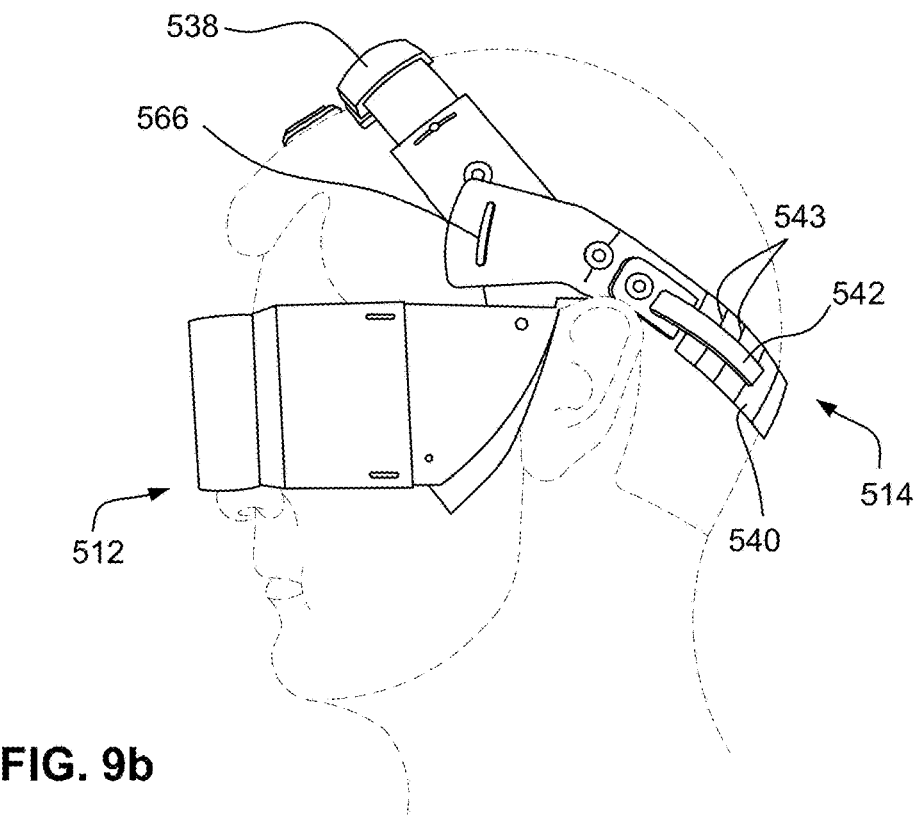

FIGS. 9a and 9b are side views of a positioning and stabilising structure of a head-mounted display system according to an example of the present technology.

Figure 10A:
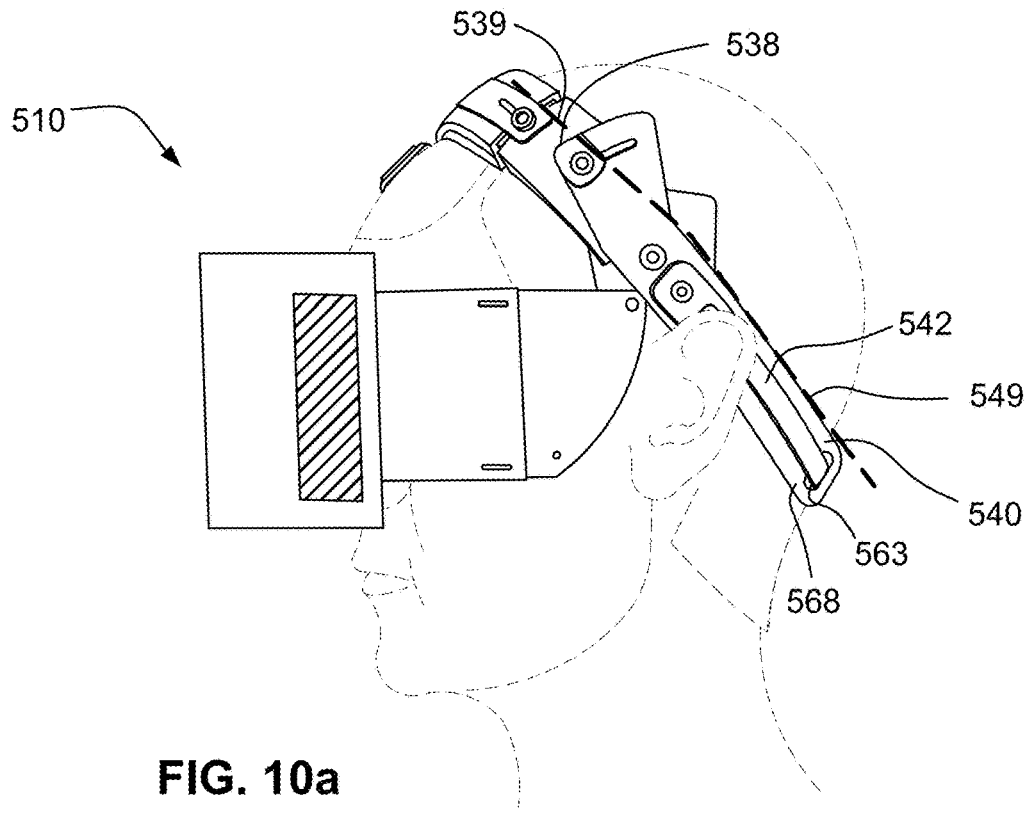
Figure 10B:
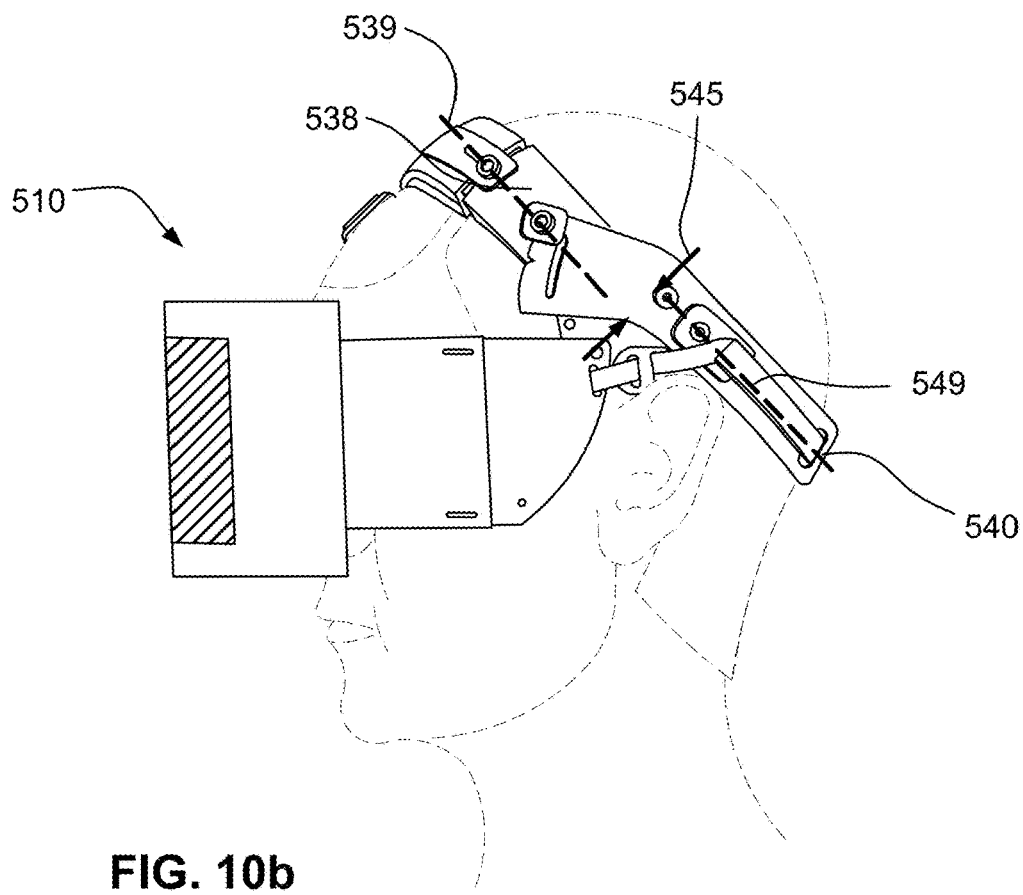
Figure 10C:
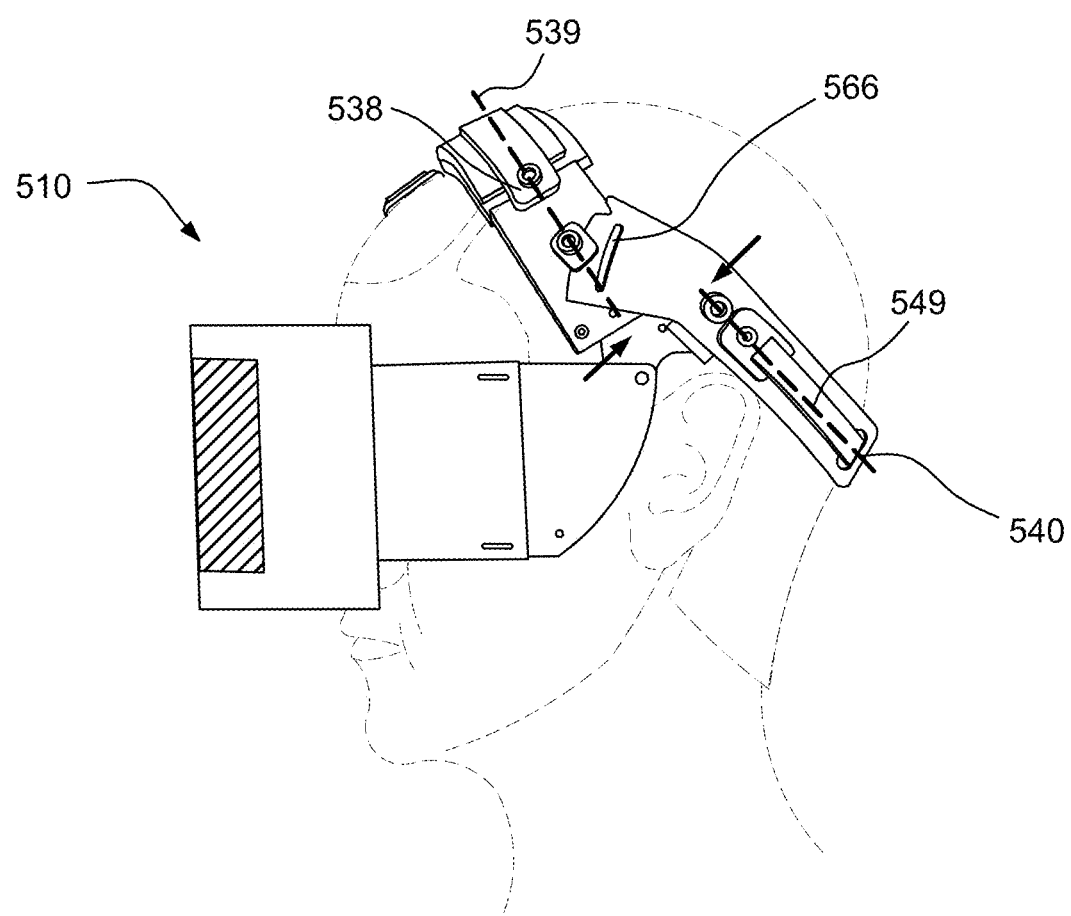

FIGS. 10a to 10c are side views of a positioning and stabilising structure of a head-mounted display system according to an example of the present technology.

Figure 11A:
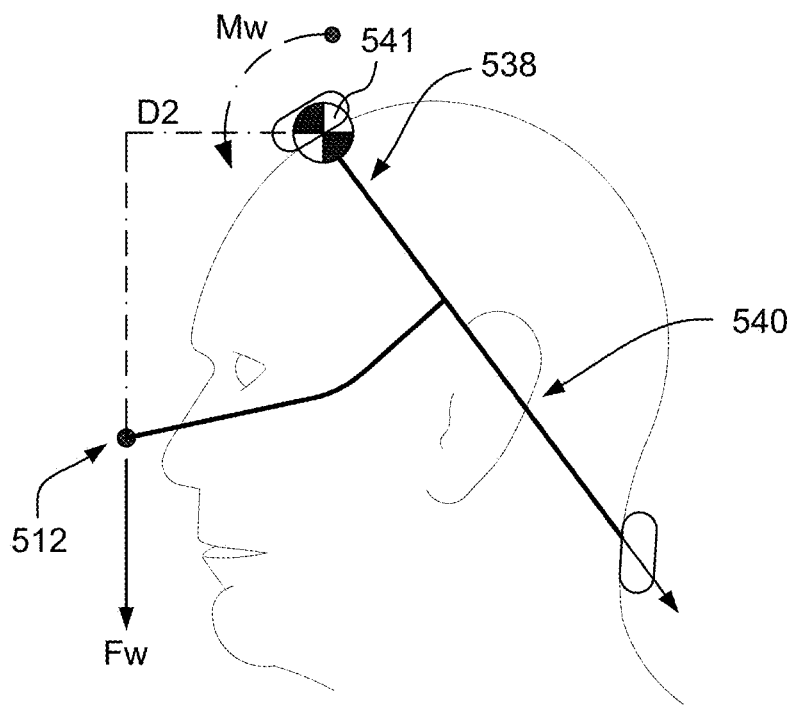
Figure 11B:
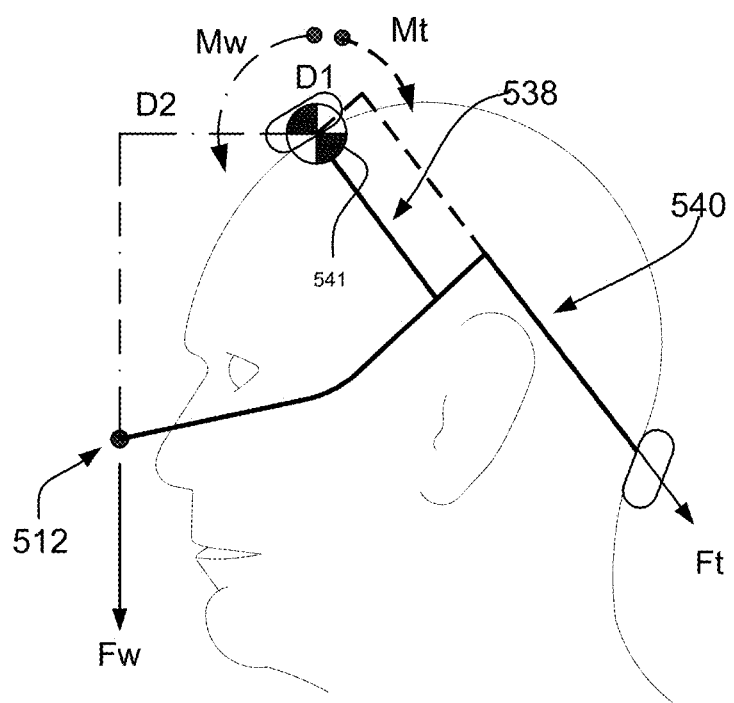
Figure 11C:
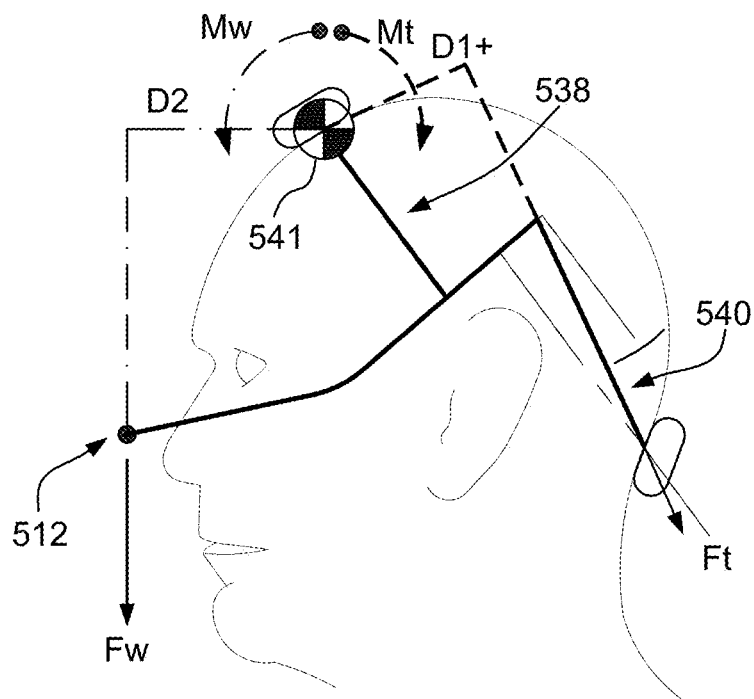

FIGS. 11a to 11c are schematic side views of a positioning and stabilising structure of a head-mounted display system according to an example of the present technology.

Figure 12A:
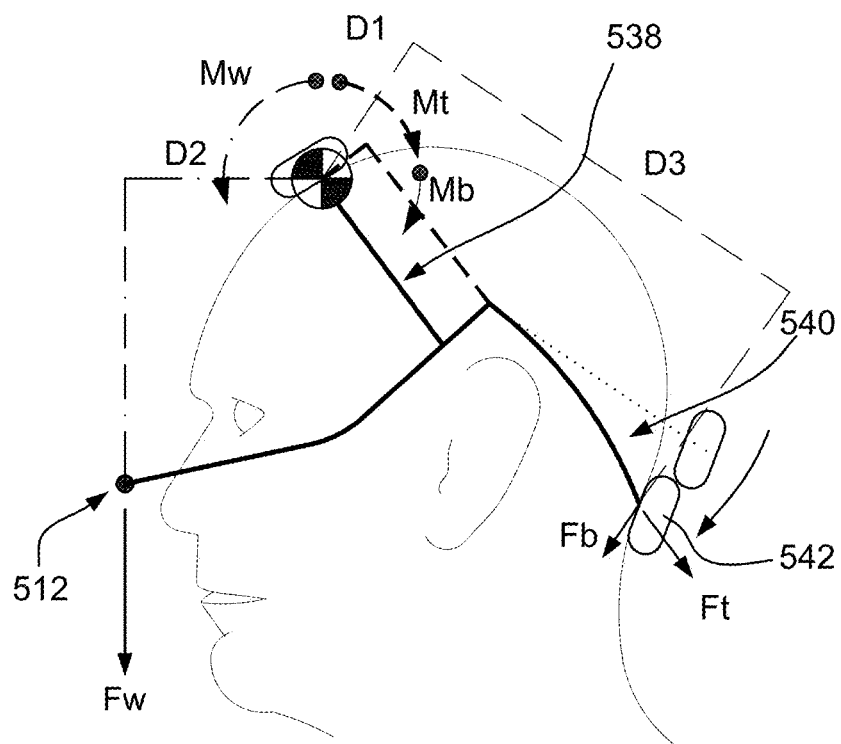
Figure 12B:
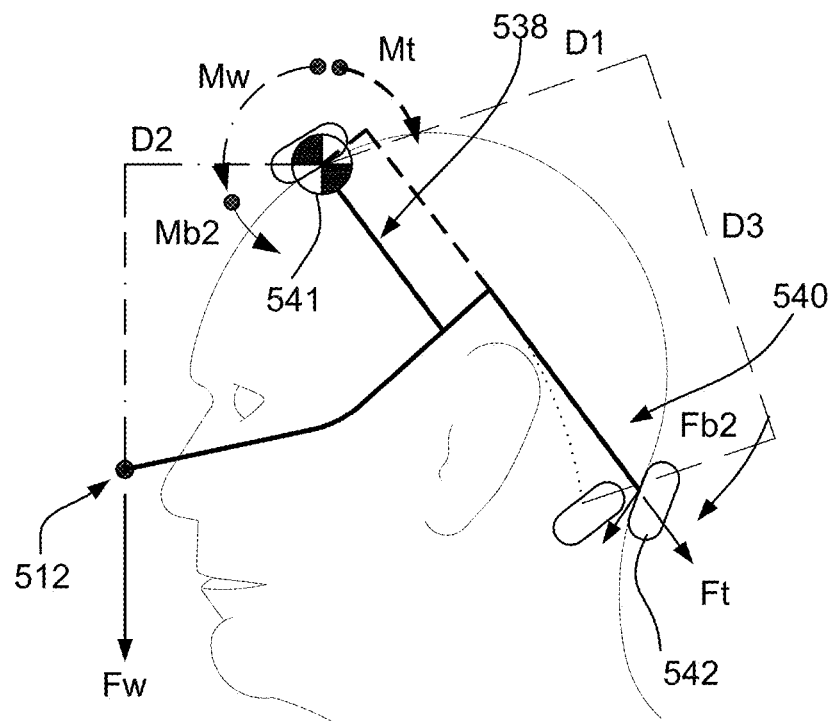

FIGS. 12a and 12b are schematic side views of a positioning and stabilising structure of a head-mounted display system according to an example of the present technology.

Figure 12C:
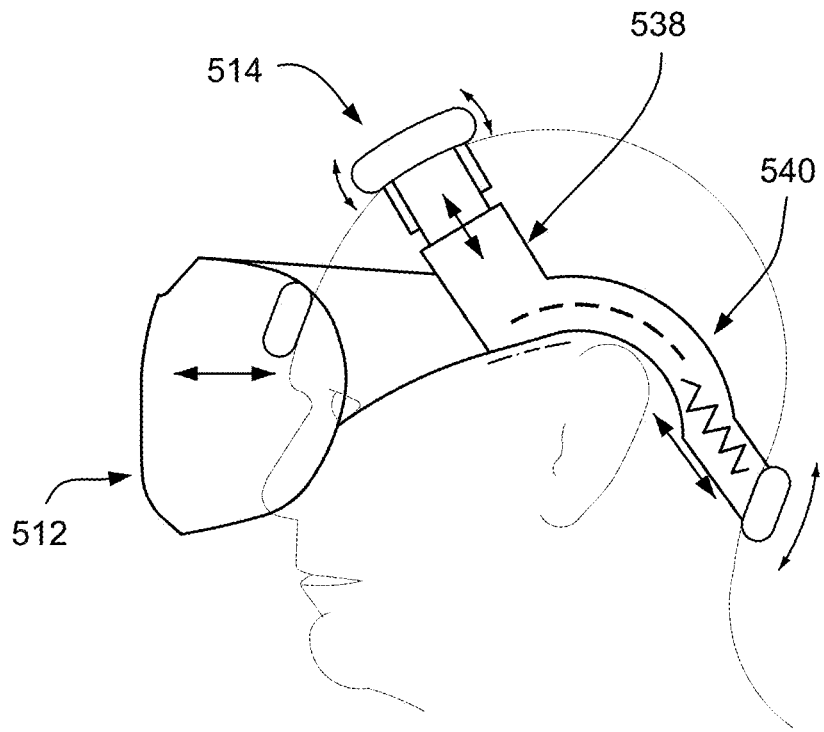

FIG. 12c is a schematic side view of the positioning and stabilising structure of a head mounted display system illustrating adjustability characteristics according to an example of the present technology.

Figure 13A:
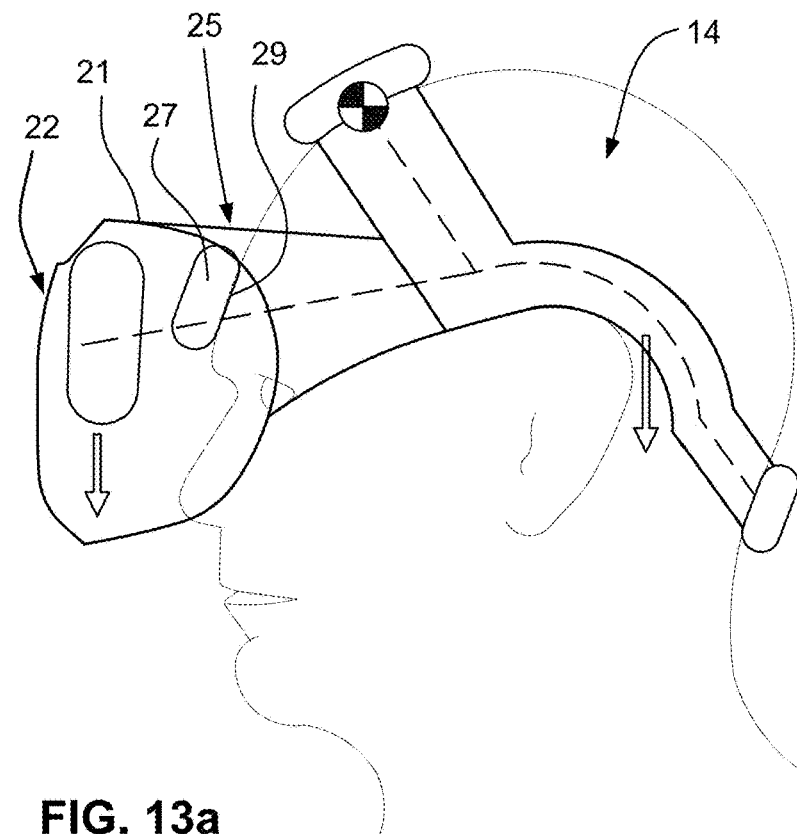
Figure 13B:
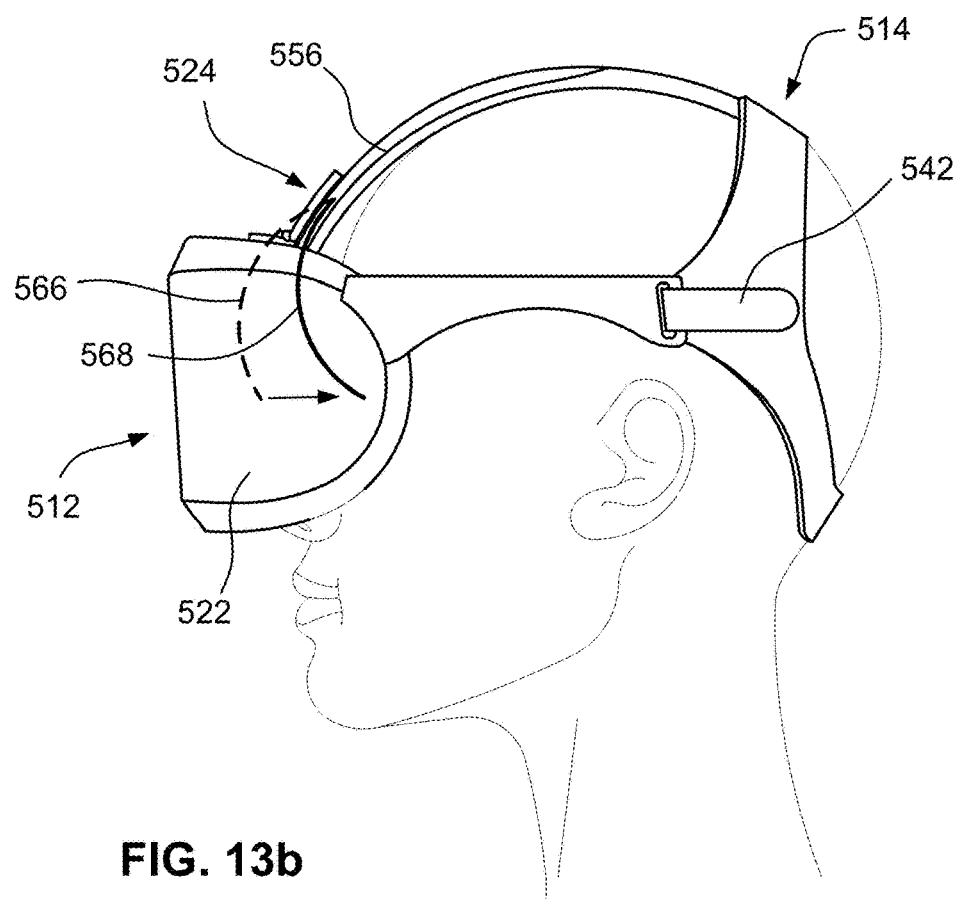

FIGS. 13a and 13b are schematic side views of positioning and stabilising structures including forehead support arrangements of a head-mounted display system according to examples of the present technology.

Figure 14A:
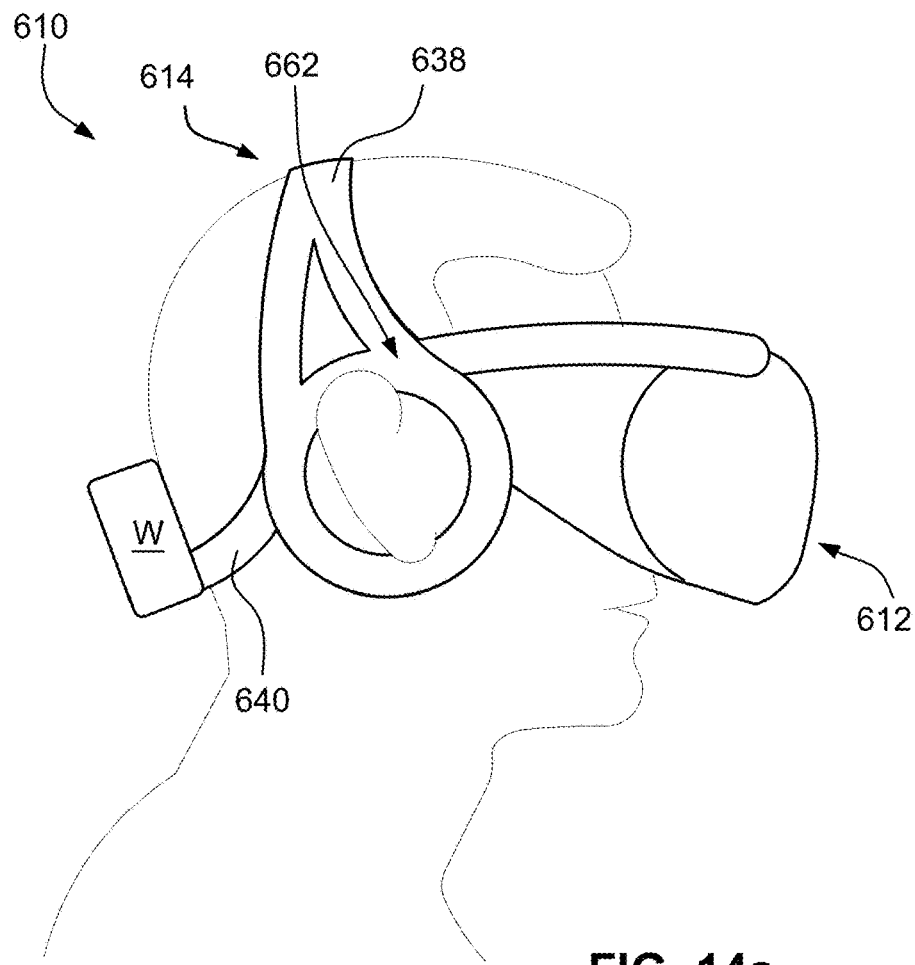

FIG. 14a is a schematic side view of a positioning and stabilising structure according to an example of the present technology.

Figure 14B:
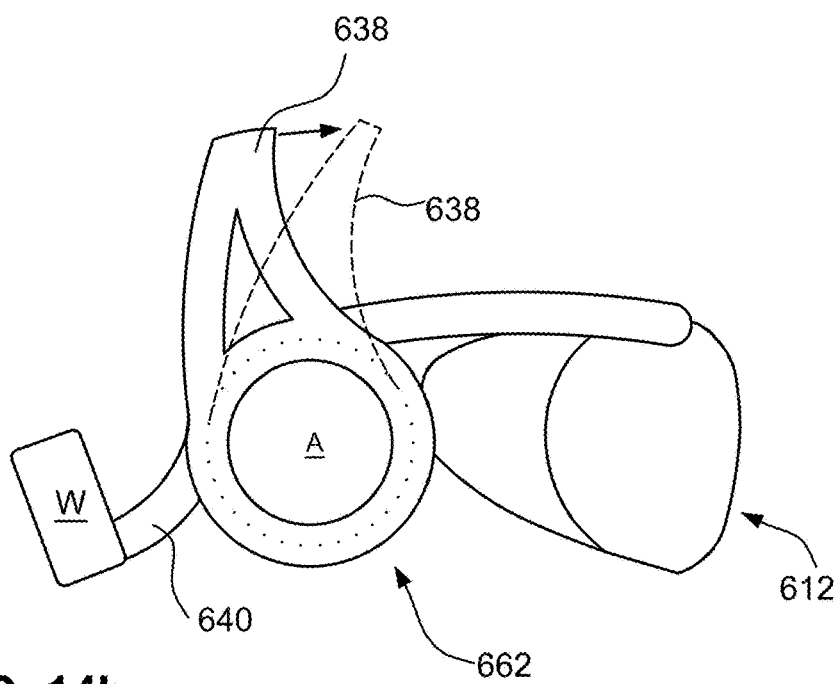

FIG. 14b is a schematic side view of a positioning and stabilising structure with a frontal portion configured in examples of first and second configurations according to an example of the present technology.

Figure 14C:
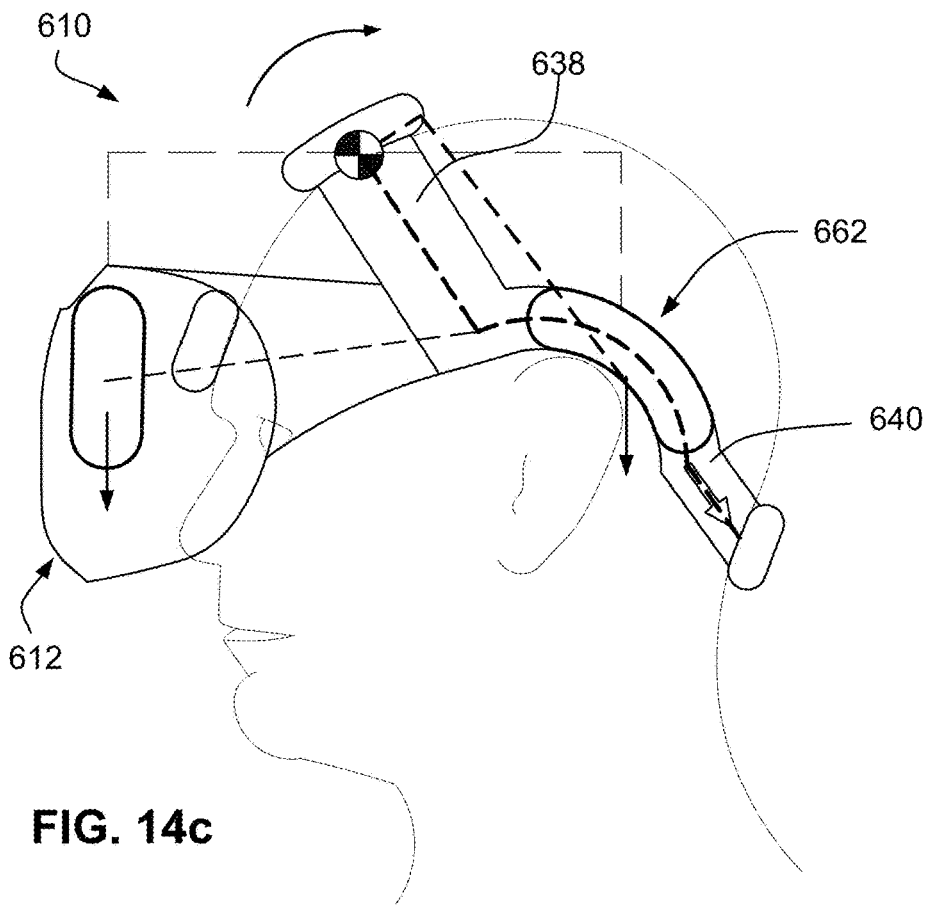

FIG. 14c is a schematic side view of a positioning and stabilising structure illustrating vector locations according to an example of the present technology.

Figure 14D:
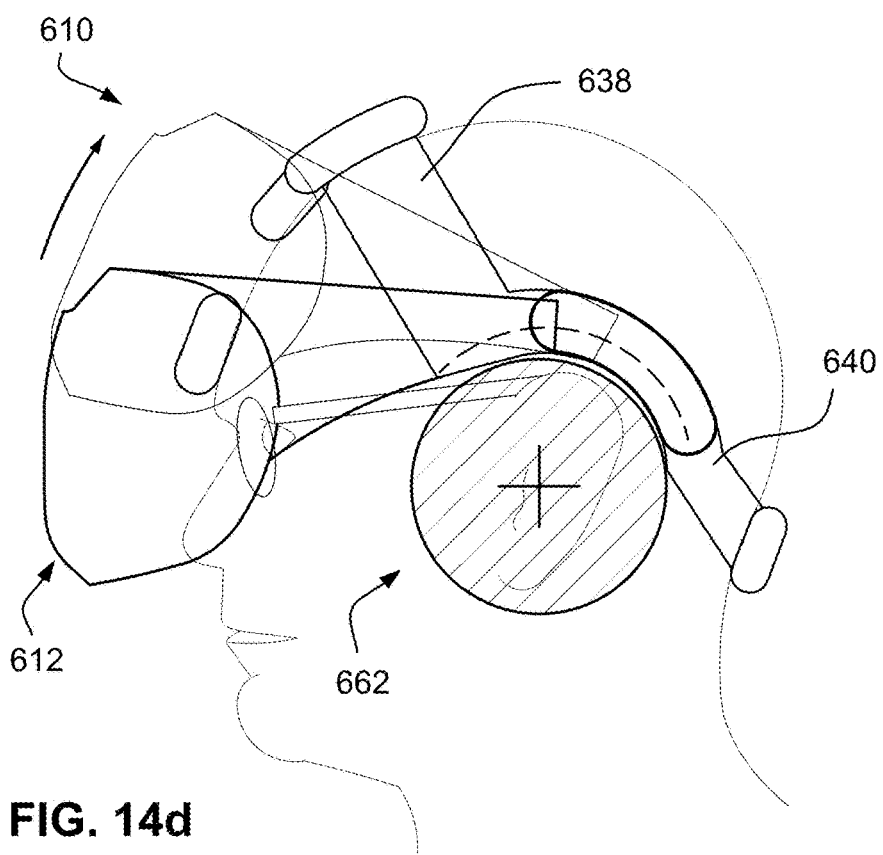

FIG. 14d is a schematic side view of a positioning and stabilising structure with a display unit configured in examples of first and second configurations according to an example of the present technology.

4.3.2 Interfacing Structures

Figure 15A:
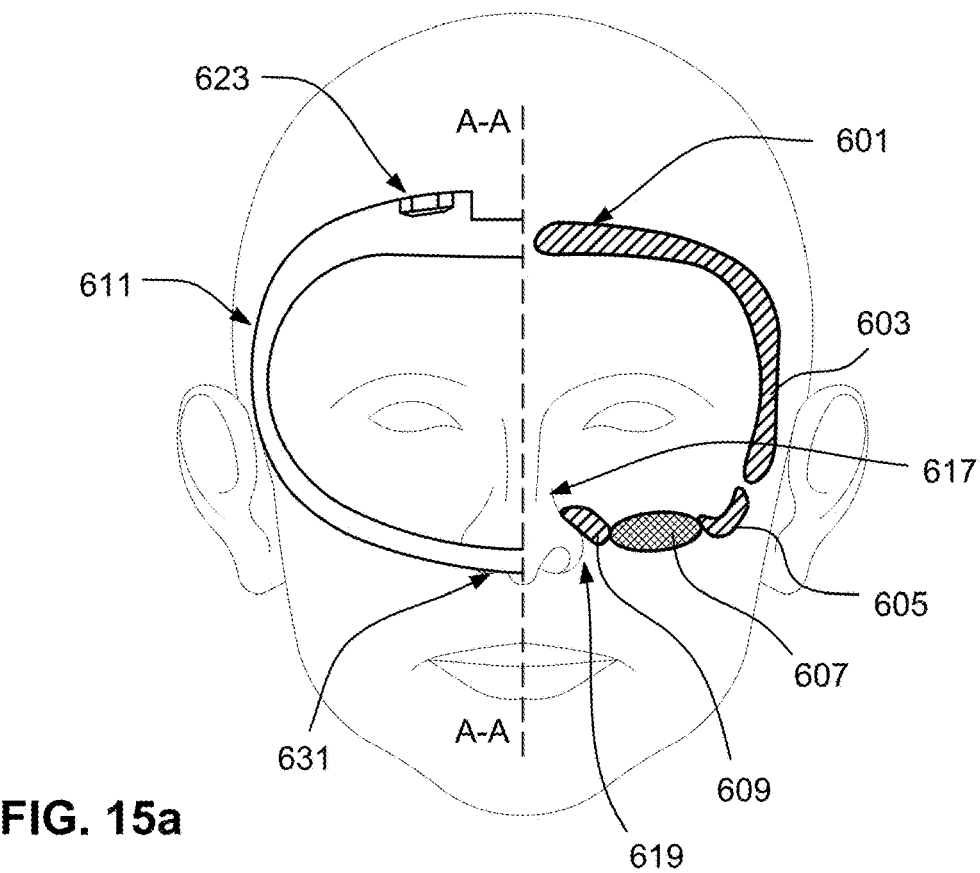

FIG. 15a is a split front view across axis A-A of the interfacing structure in use according to an example of the present technology, the left-hand side showing the location of the interfacing structure and the right-hand side showing approximate facial areas that are engaged by the interfacing structure.

Figure 15B:
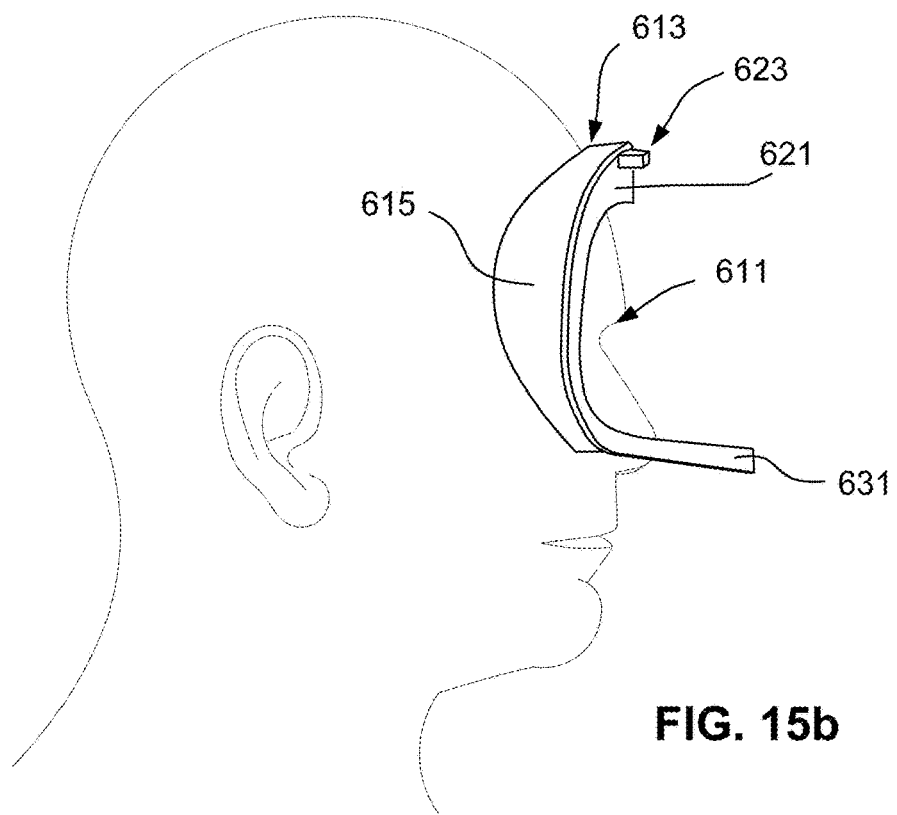

FIG. 15b is a side view of the interfacing structure of FIG. 15a, in use.

Figure 16A:
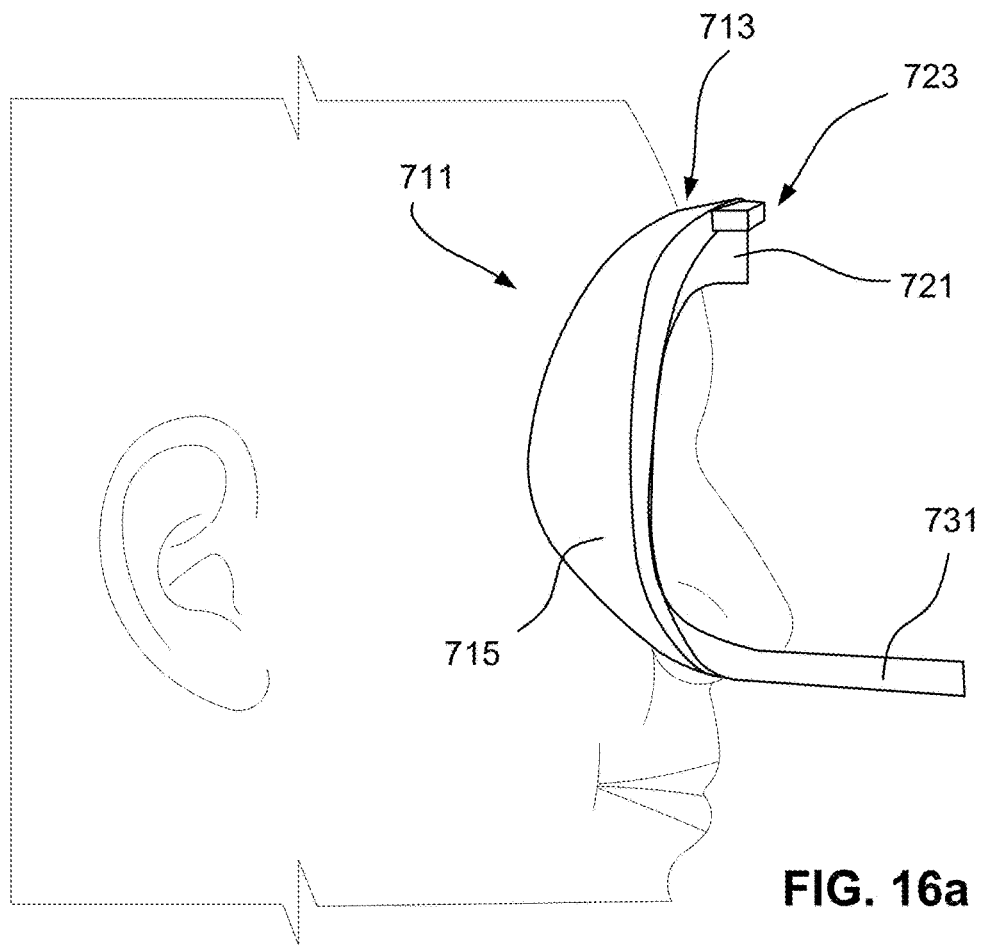
Figure 16B:
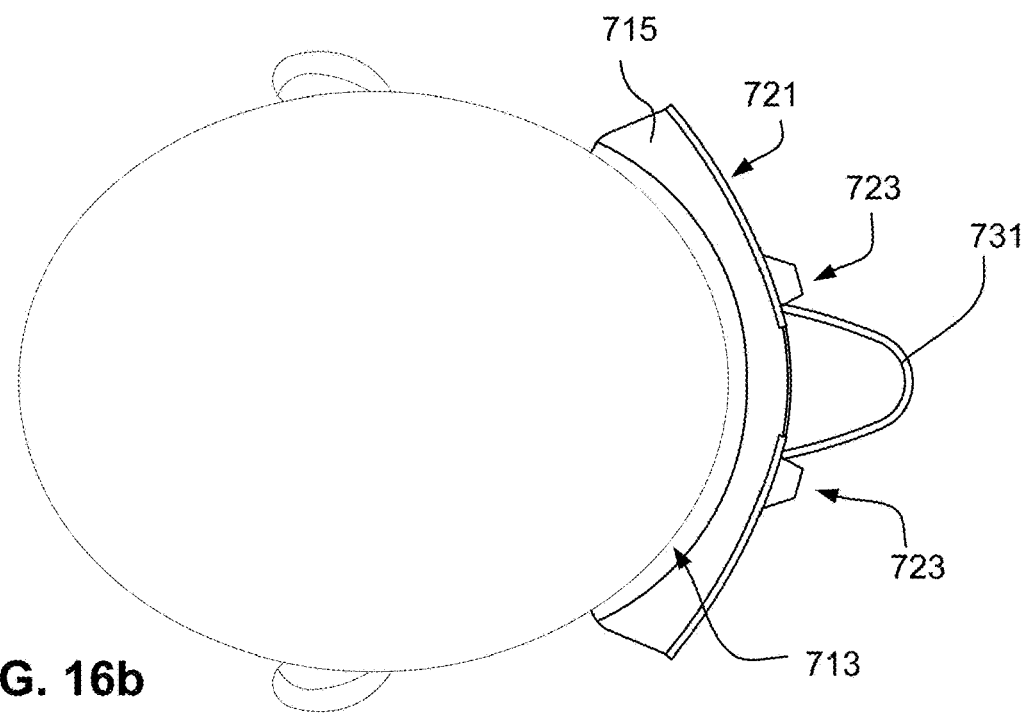

FIGS. 16a, 16b, and 16c are side, top and frontal superior views, respectively, of the interfacing structure in use according to a second example of the present technology.

FIG. 17a is a side cross section view through axis B-B of FIG. 16c, showing the support structure and face engaging surface according to an example of the present technology.

FIG. 17b is a side cross section view through axis B-B of FIG. 16c, showing the support structure and face engaging surface, further comprising a supporting flange, according to a second example of the present technology.

Figure 18:
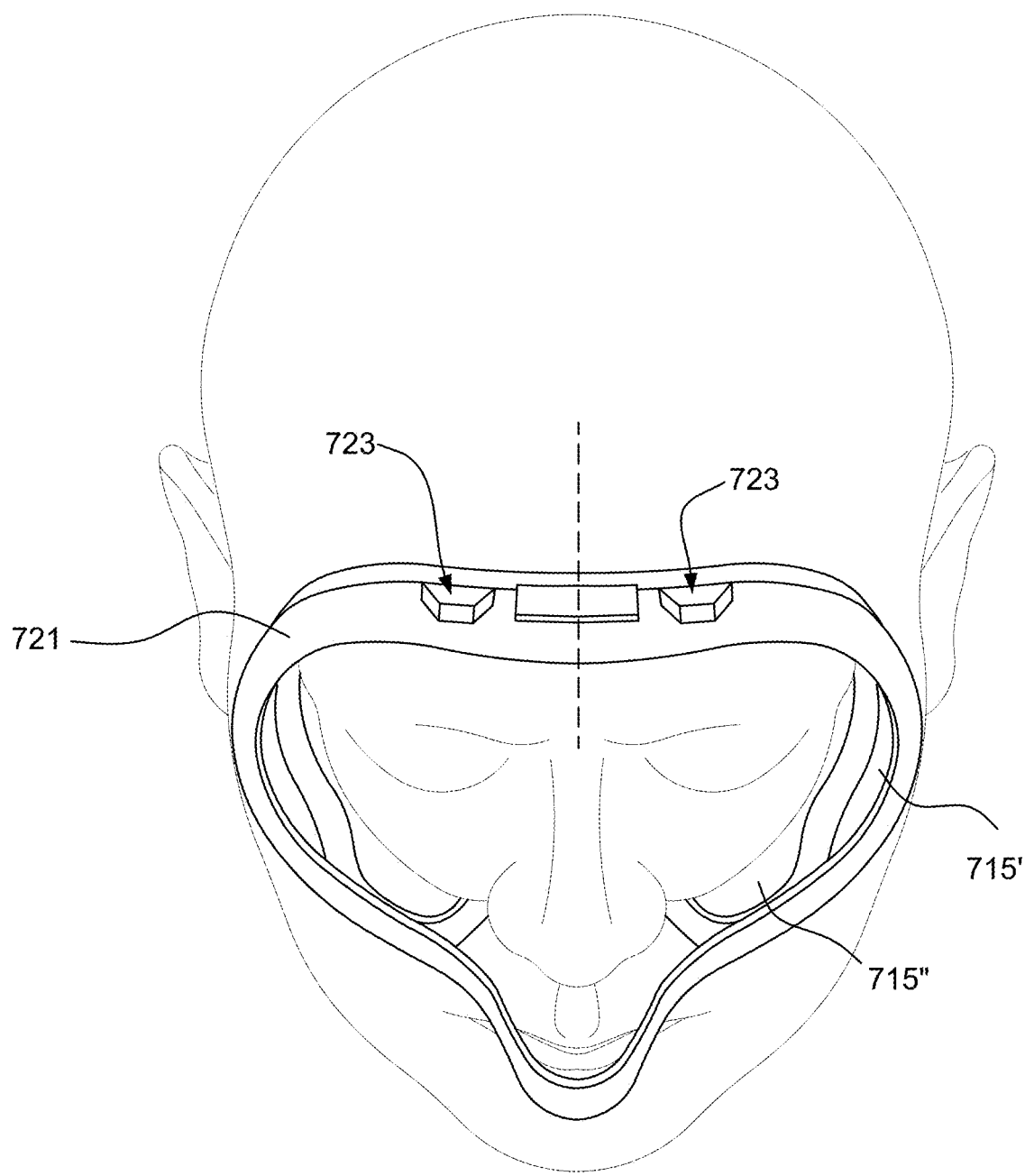

FIG. 18 is a frontal superior view of the interfacing structure in use according to a third example of the present technology.

Figure 19:
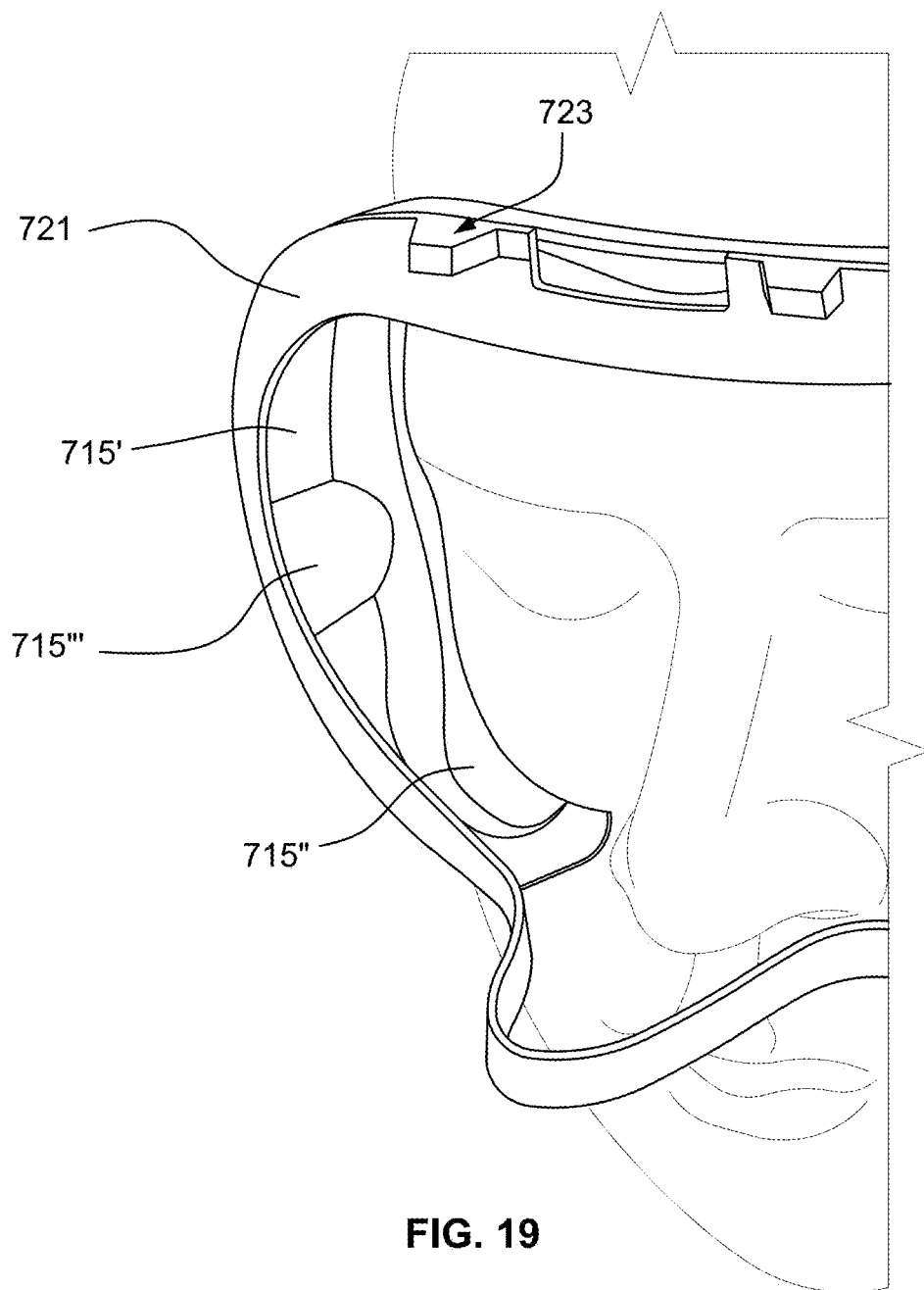

FIG. 19 is a partial frontal superior view of the interfacing structure in use according to a fourth example of the present technology.

FIGS. 20a, 20b, 20c and 20d are perspective views of the interfacing structure in use according to a fifth example of the present technology.

Figure 20A:
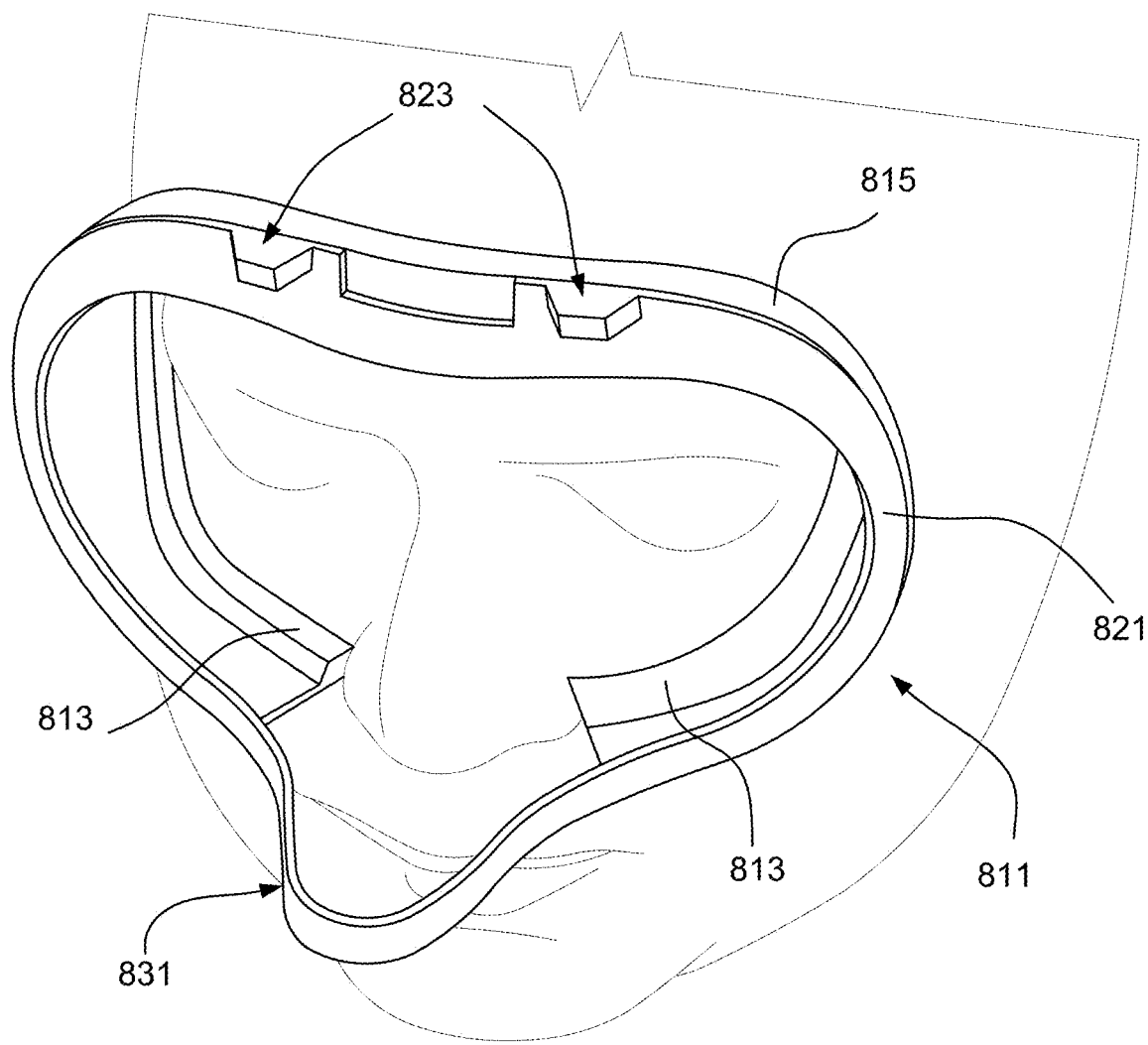
Figure 20B:
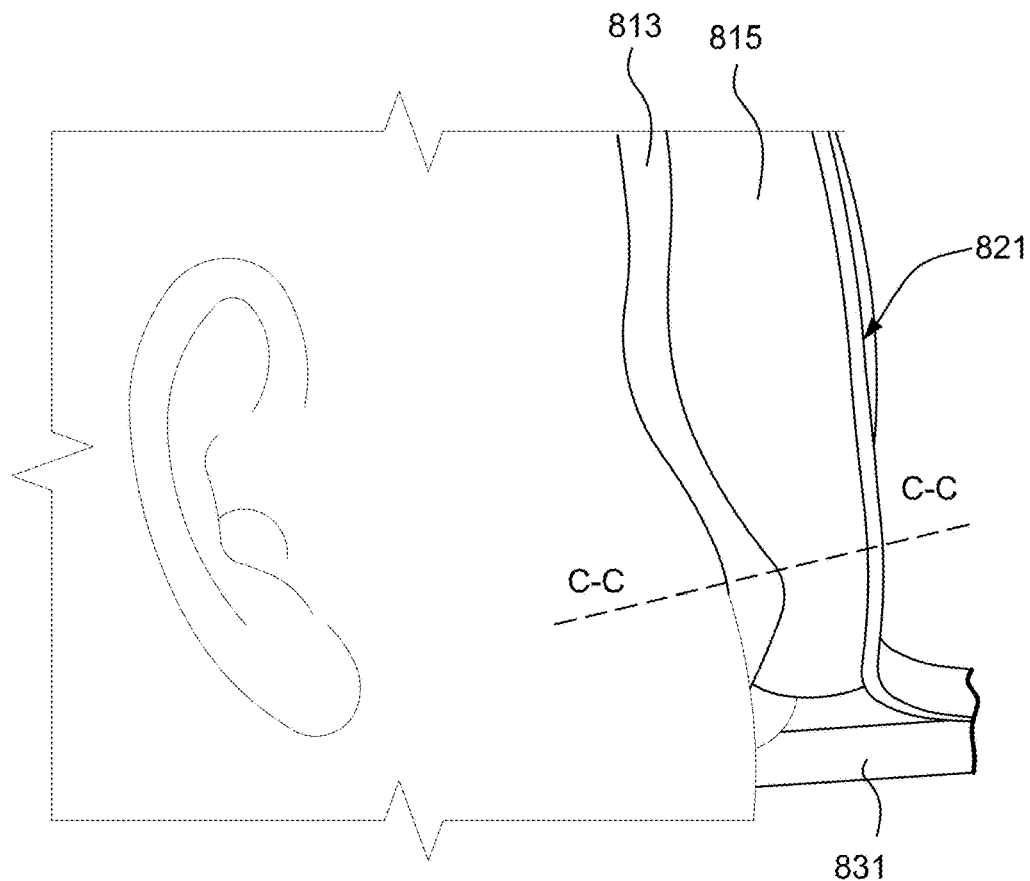
Figure 20C:
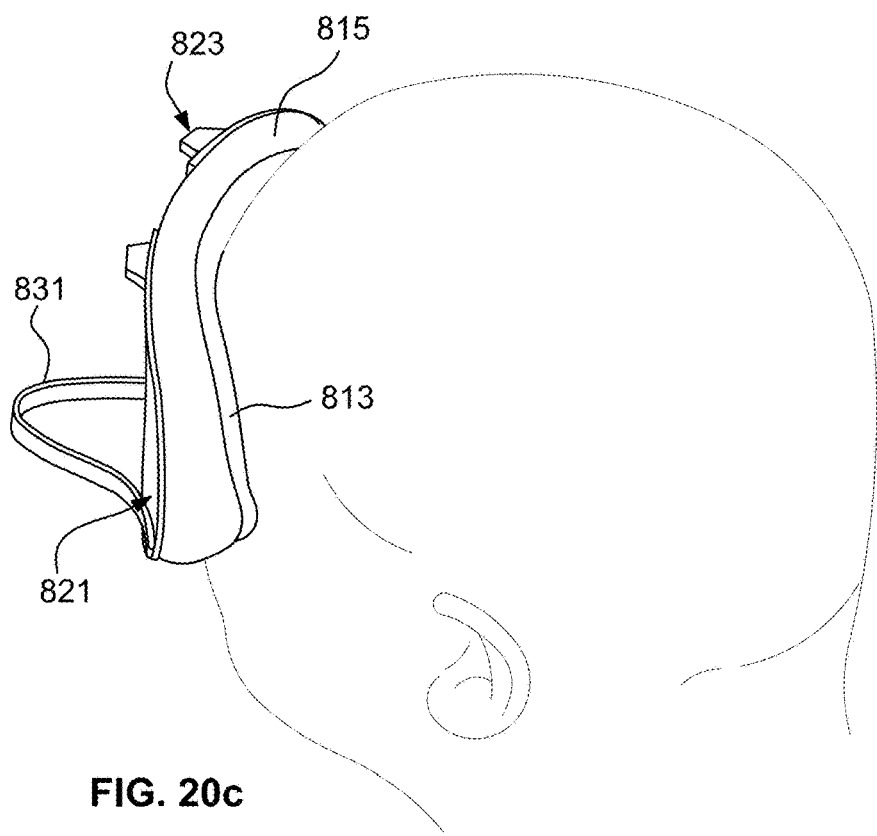
Figure 20D:
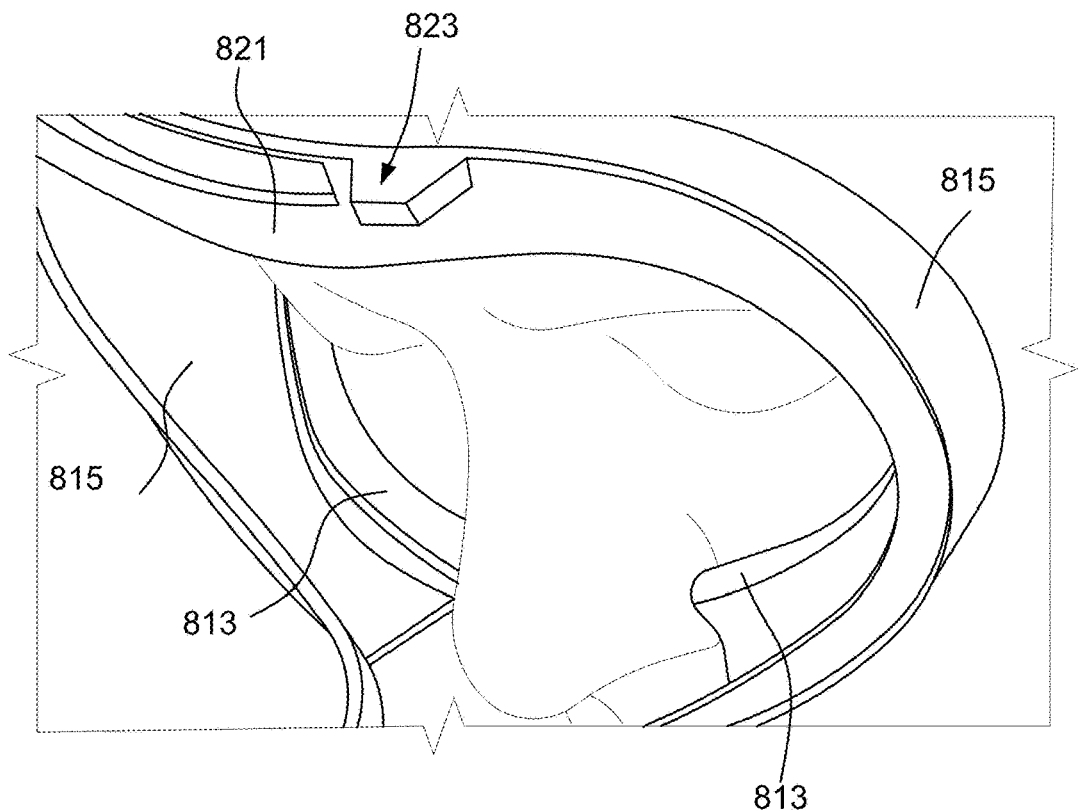
Figures 21A, 21B:
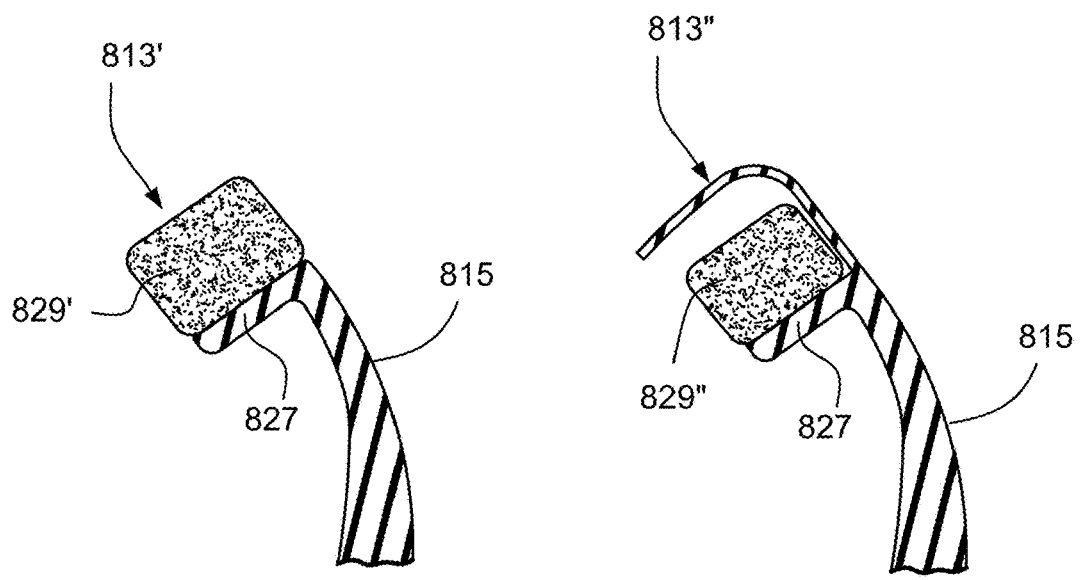

FIG. 21a is a side cross section view through axis C-C of FIG. 20b, showing a face engaging surface that includes a foam cushion attached directly to an upper portion of the support structure according to an example of the present technology.

FIG. 21b is a side cross section view through axis C-C of FIG. 20b, showing a face engaging surface that covers a foam cushion, the foam cushion being attached directly to an upper portion of the support structure according to an example of the present technology.

Figure 22:
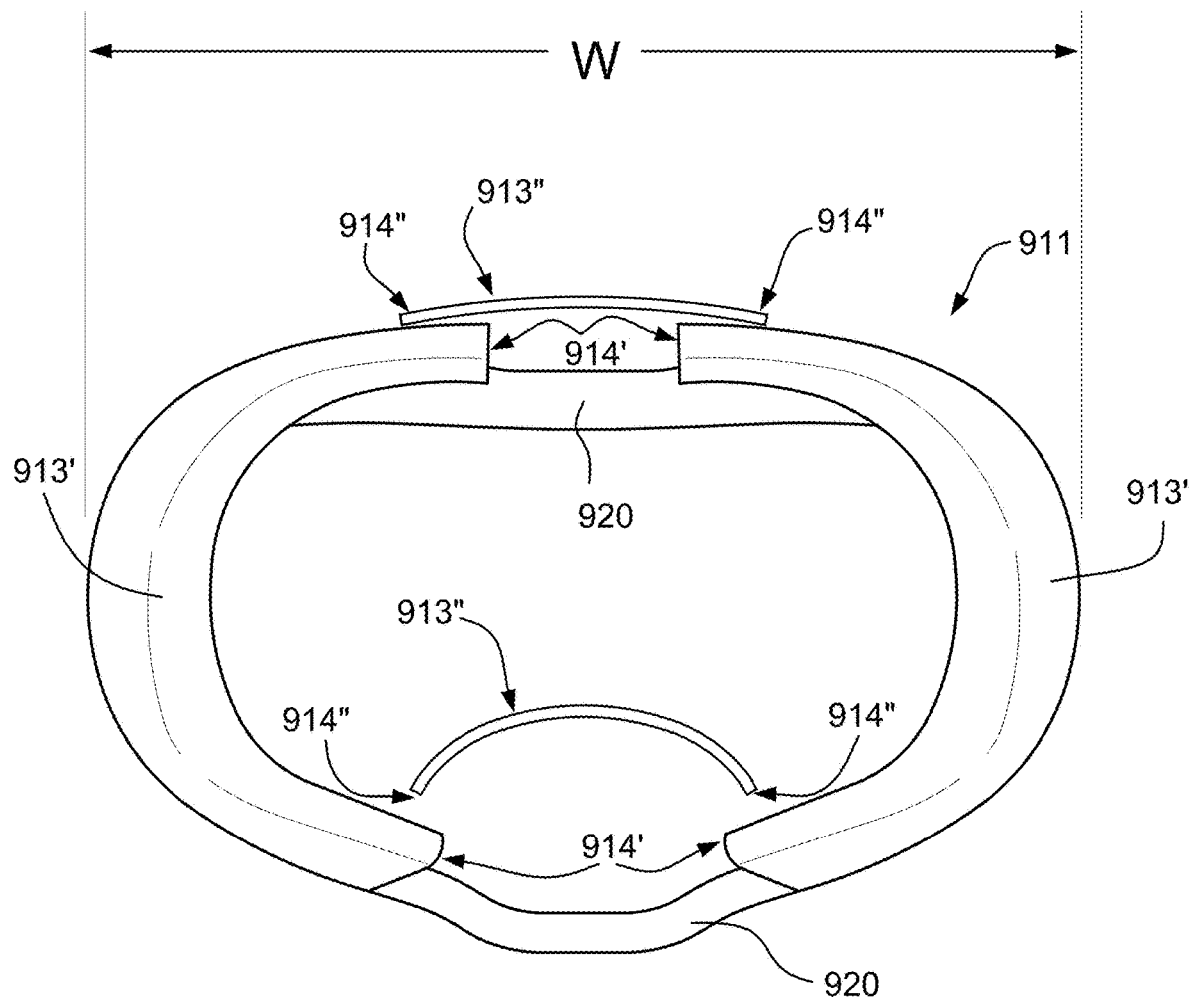

FIG. 22 is a rear view of the interfacing structure in use, the interfacing structure being adjustable in width W according to a sixth example of the present technology.

Figure 23A:
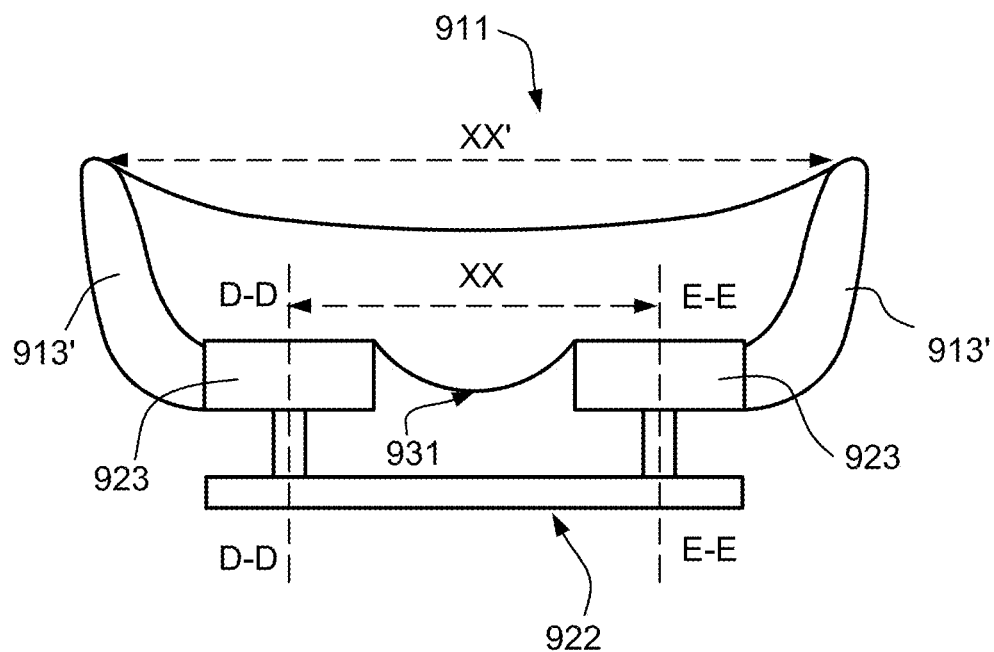
Figure 23B:
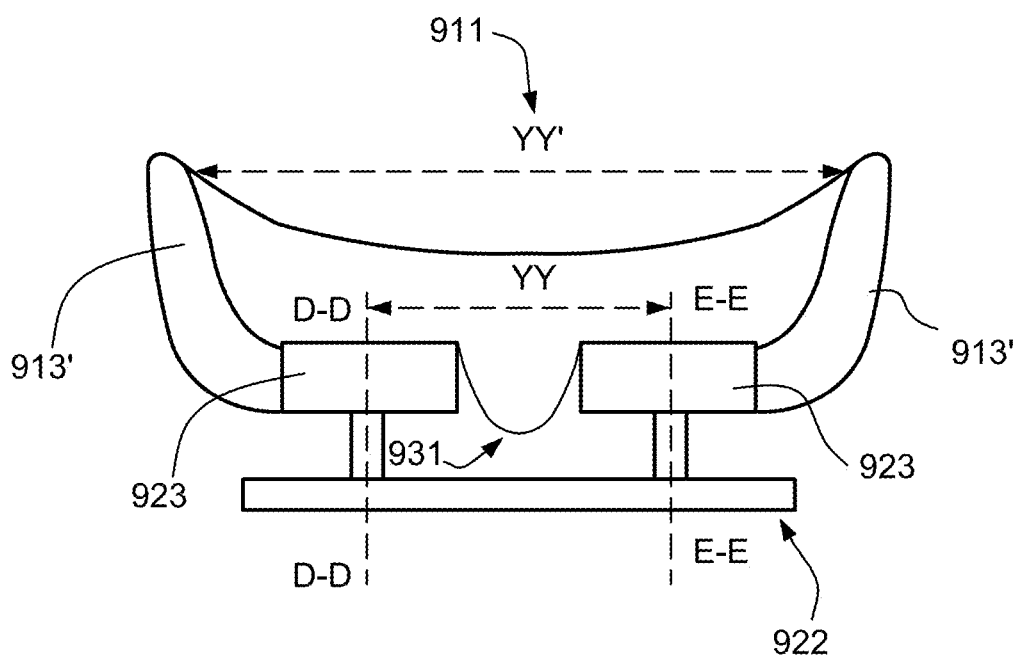

FIGS. 23a and 23b are cross-section views from below of the adjustable interfacing structure in use, at a wider lens width XX and narrower lens width YY respectively according to an example of the present technology. The lens width is measured from a central axis (e.g. axis E-E) of the first lens to a central axis (e.g. axis D-D) of the second lens.

Figure 24:
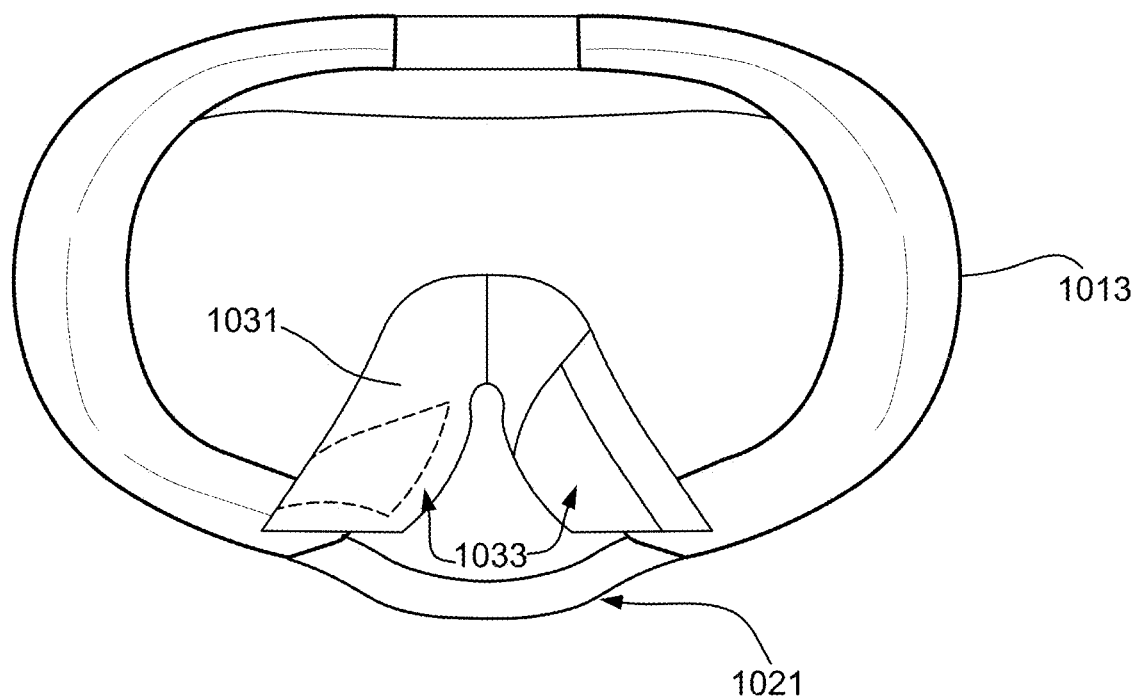

FIG. 24 is a rear view of the interfacing structure in use according to a seventh example of the present technology.

4.3.3 Anthropometric Data Models

Figure 25A:
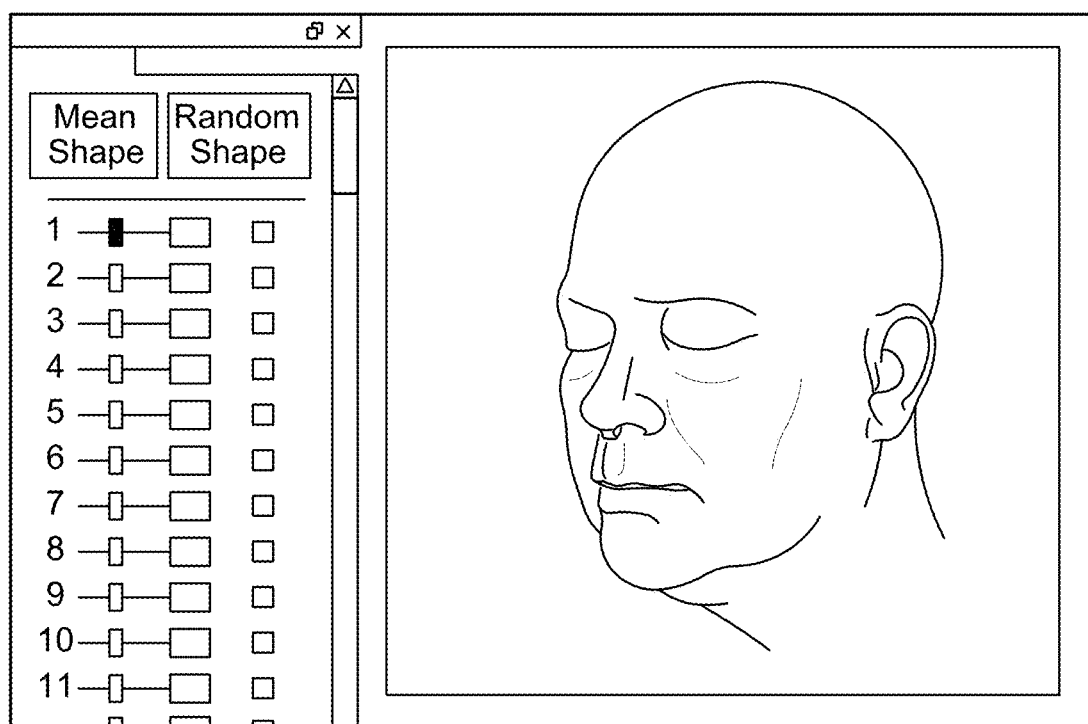
Figure 25B:
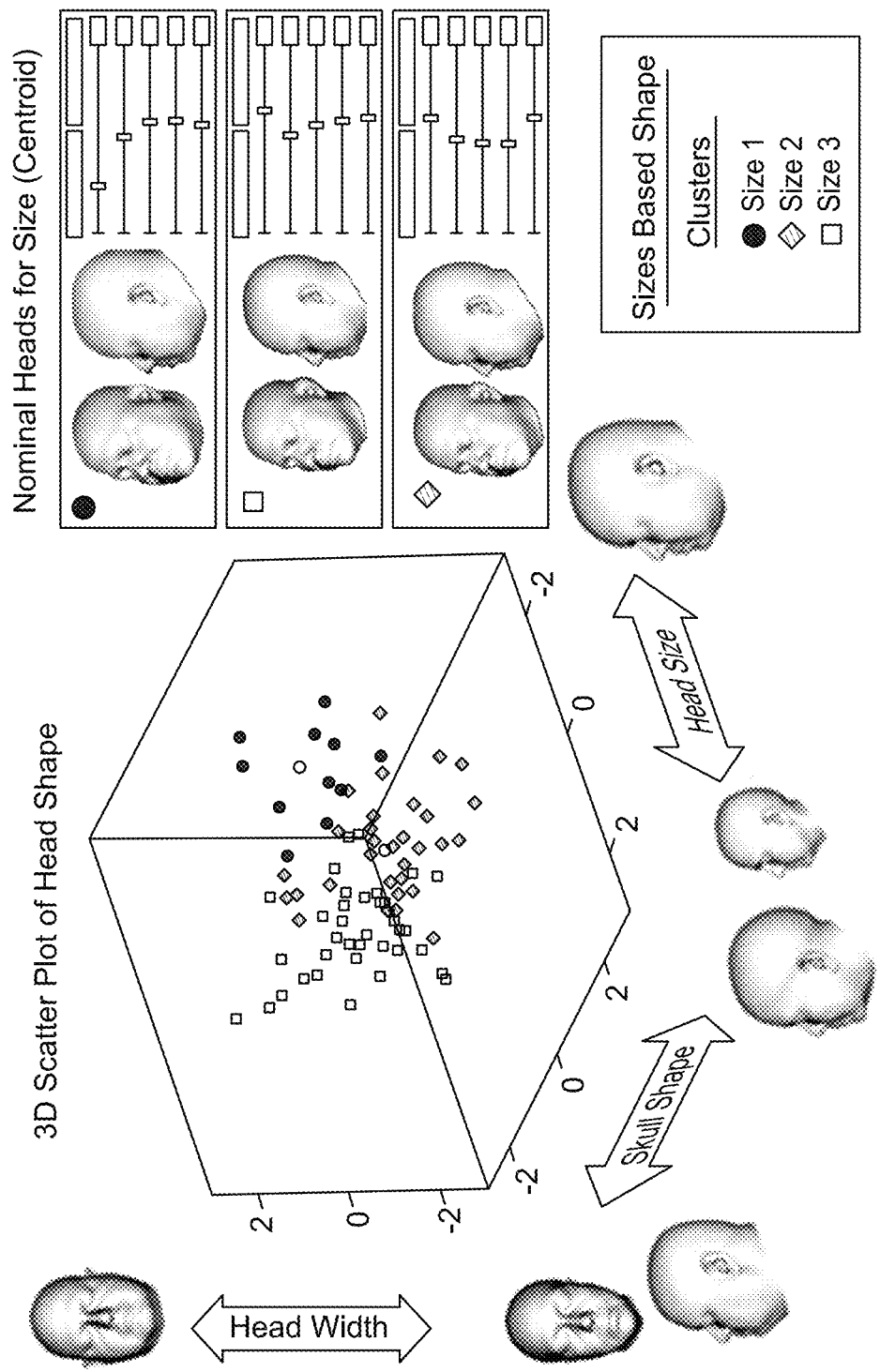

FIGS. 25a and 25b are an anthropometric data model of sizing and clustering based on head shape variation according to an example of the present technology.

Figure 26A:
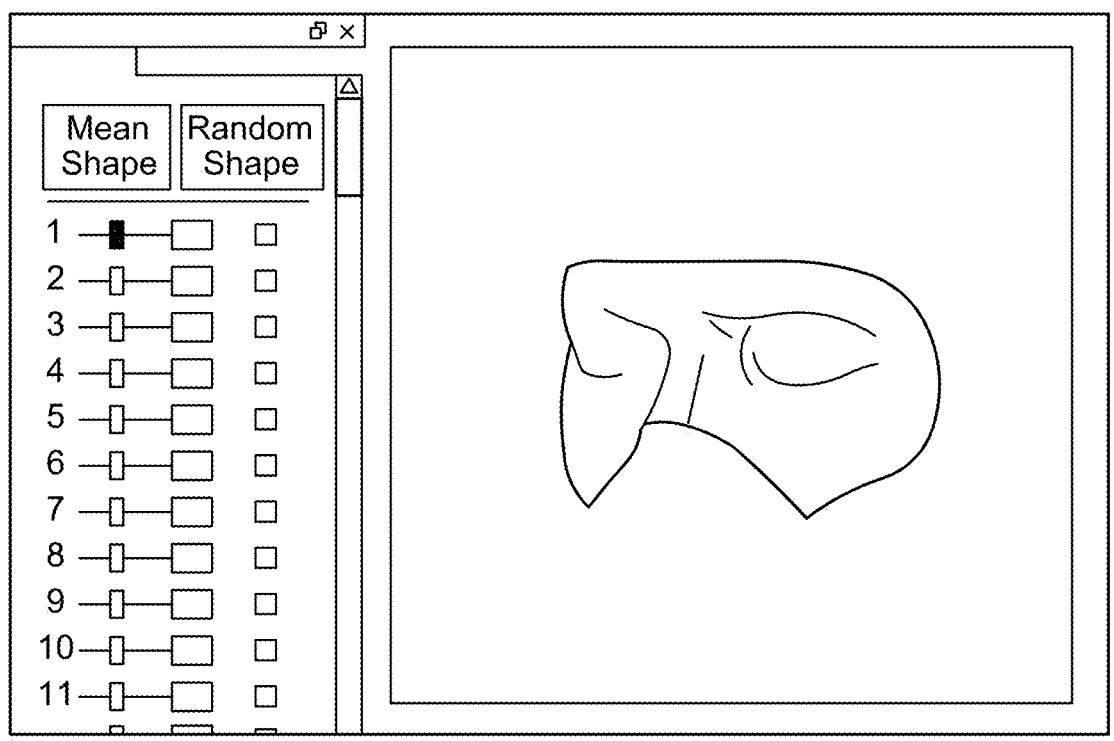
Figure 26B:
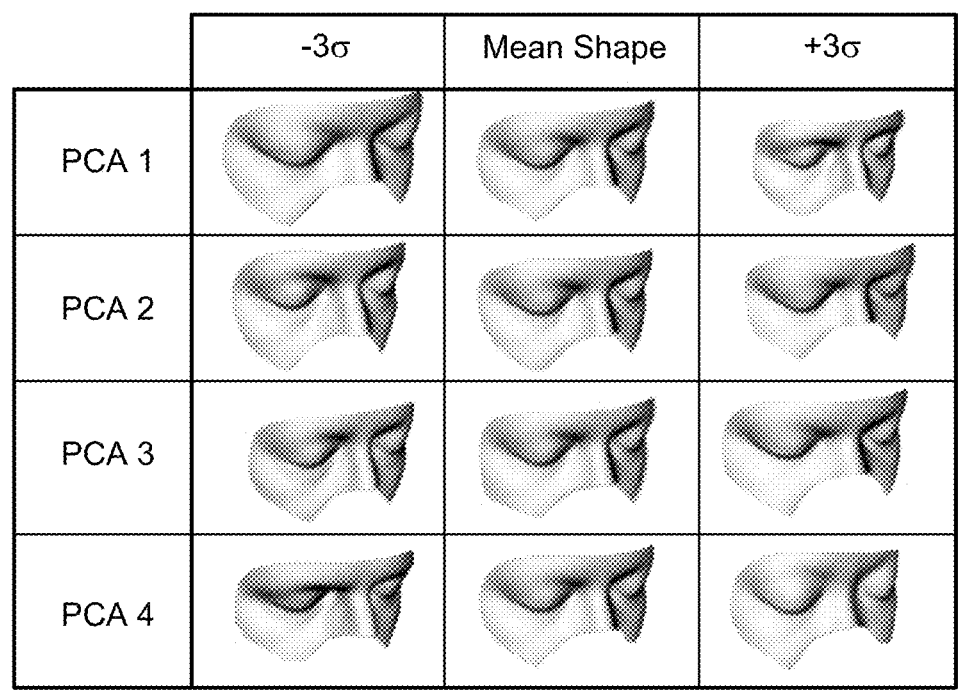

FIGS. 26a and 26b are an anthropometric data model of sizing based on nominated facial zones according to an example of the present technology.

Figure 27A:
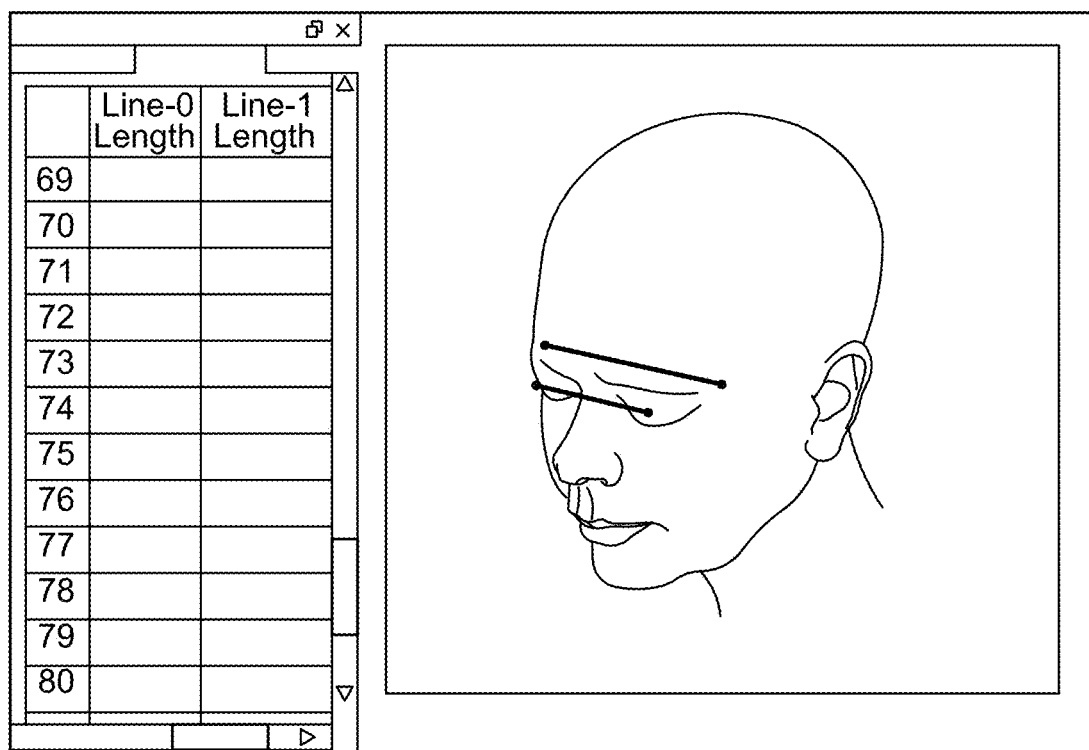
Figure 27B:
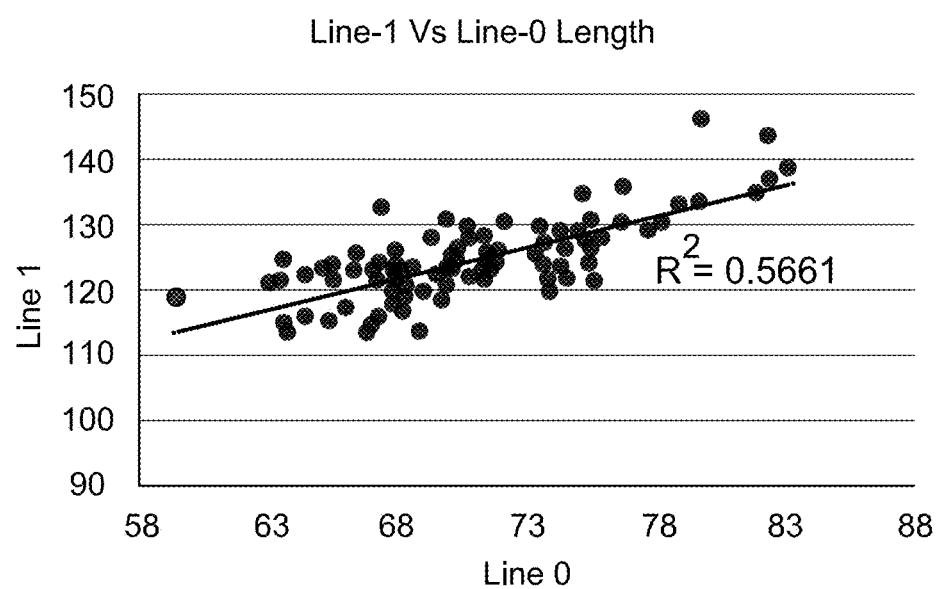

FIGS. 27a and 27b are an anthropometric data model of sizing based on anthropometrical landmarks according to an example of the present technology.

4.3.4 Materials

Figure 28:
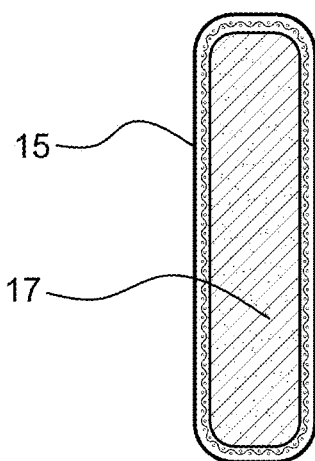

FIG. 28 is a cross-sectional view of a positioning and stabilising structure according to an example of the present technology.

Figure 29:
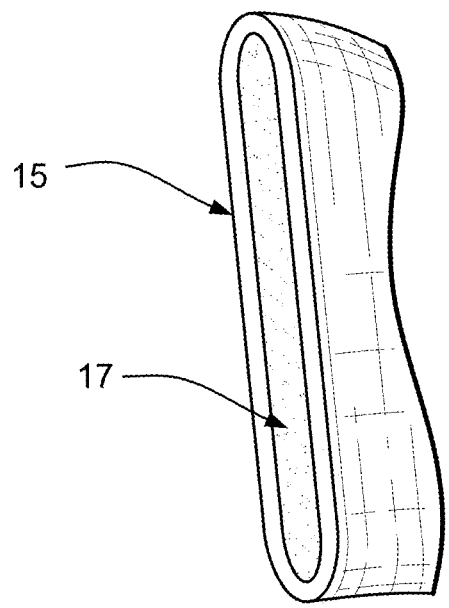

FIG. 29 is a cross-sectional view of a positioning and stabilising structure according to another example of the present technology.

Figure 30:
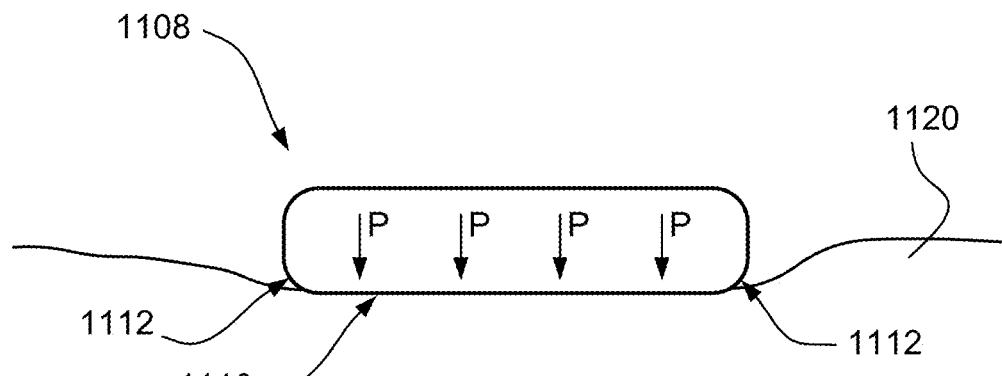

FIG. 30 is a close-up side view of an engagement structure (e.g., interfacing structure or positioning and stabilising structure) applying a pressure against a user's head when the engagement structure is in use according to an example of the present technology, wherein pressure is the force exerted on a surface divided by the area over which that force acts.

Figure 31:
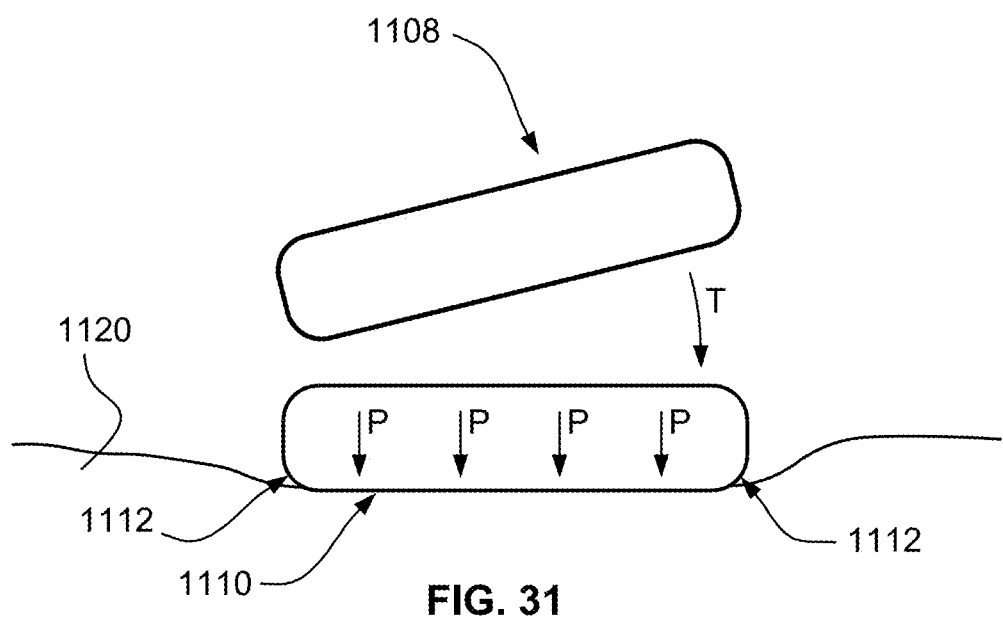

FIG. 31 is a close-up side view of an engagement structure twisting T to improve engagement and thus achieve even (or uniform) distribution of a pressure against a user's head when the engagement structure is in use according to an example of the present technology.

Figure 32:
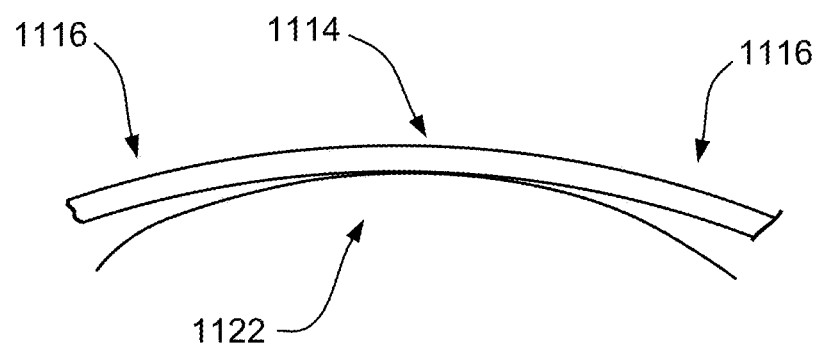

FIG. 32 is a close-up front view of a positioning and stabilising structure over at least a portion (e.g., the crown) of a user's head according to an example of the present technology.

Figure 33:
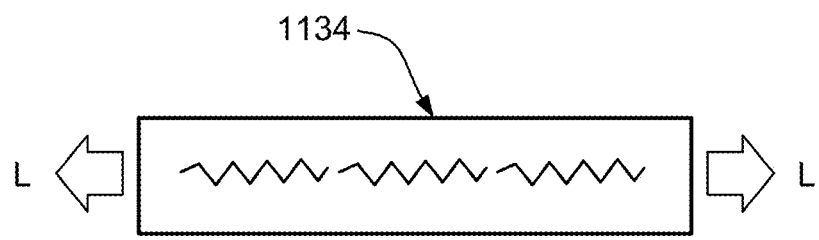

FIG. 33 is a close-up top view of an elastic portion of a positioning and stabilising structure in the form of a strap according to an example of the present technology.

Figure 34:
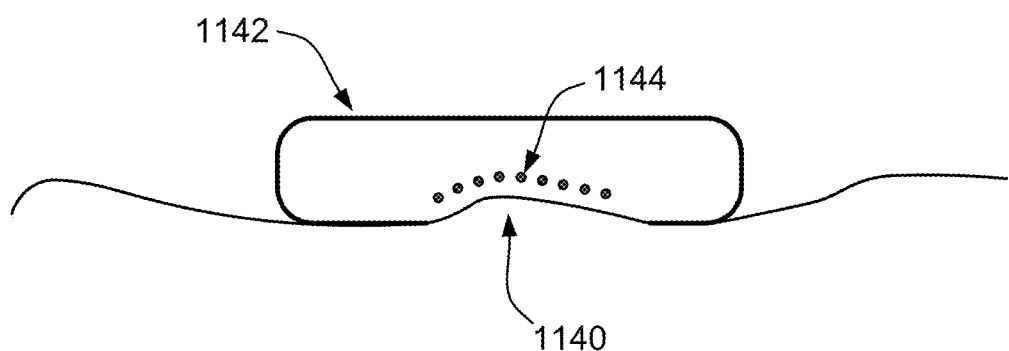

FIG. 34 is a close-up side view of an engagement structure that is locally compliant when engaging a protrusion of a user's head, when the engagement structure is in use according to an example of the present technology.

4.3.5 Examples of VR and AR Head-Mounted Display Apparatus

Figure 35:
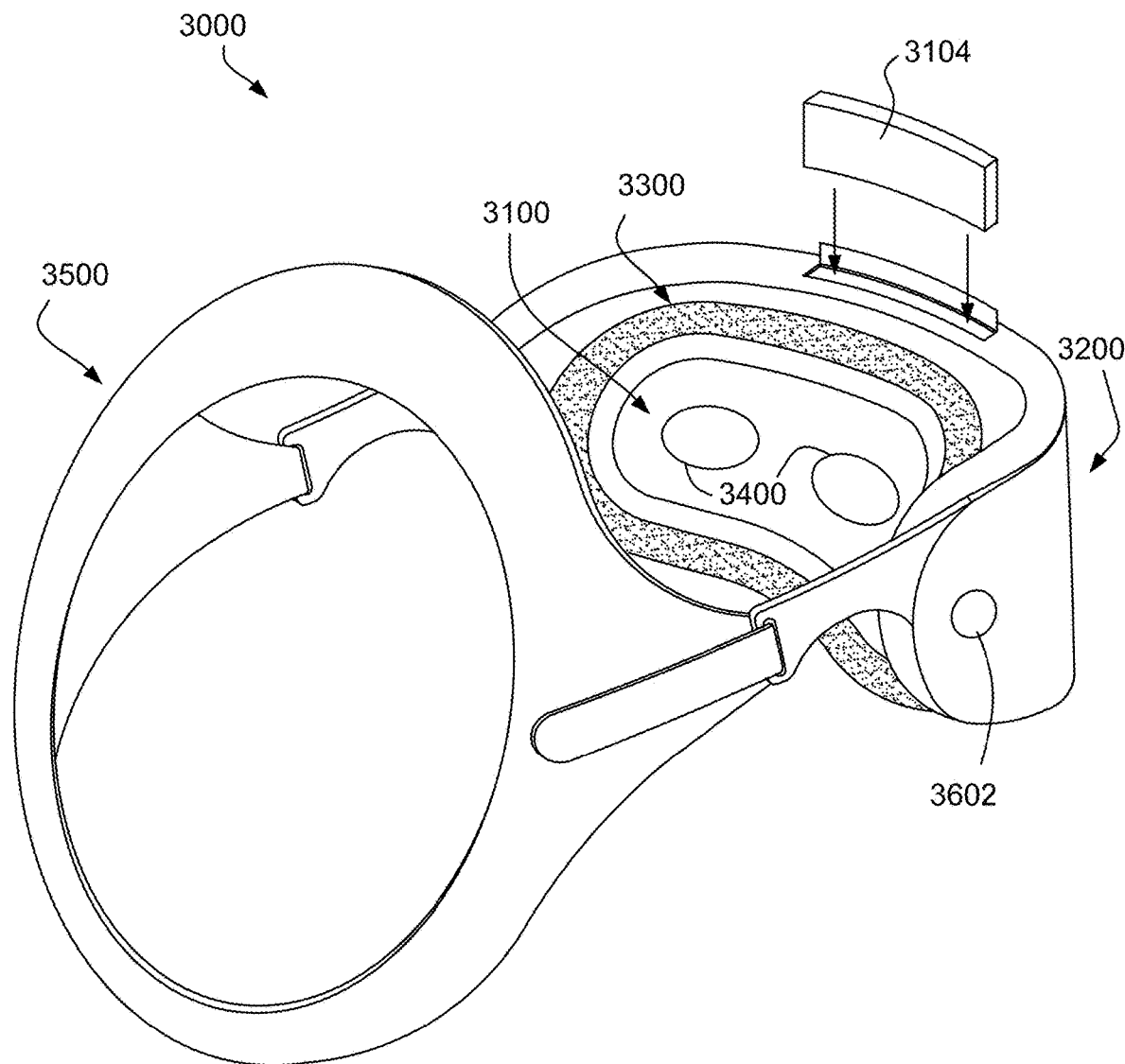

FIG. 35 is a perspective view of a VR head-mounted display apparatus according to an example of the present technology.

Figure 36:
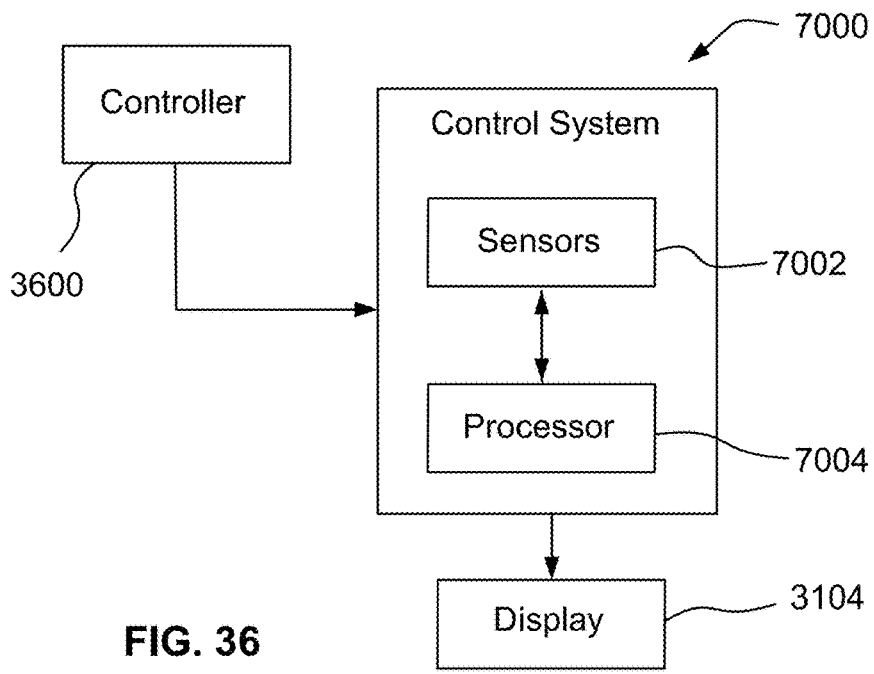

FIG. 36 is a schematic view of a controller and control system according to an example of the present technology.

Figure 37:
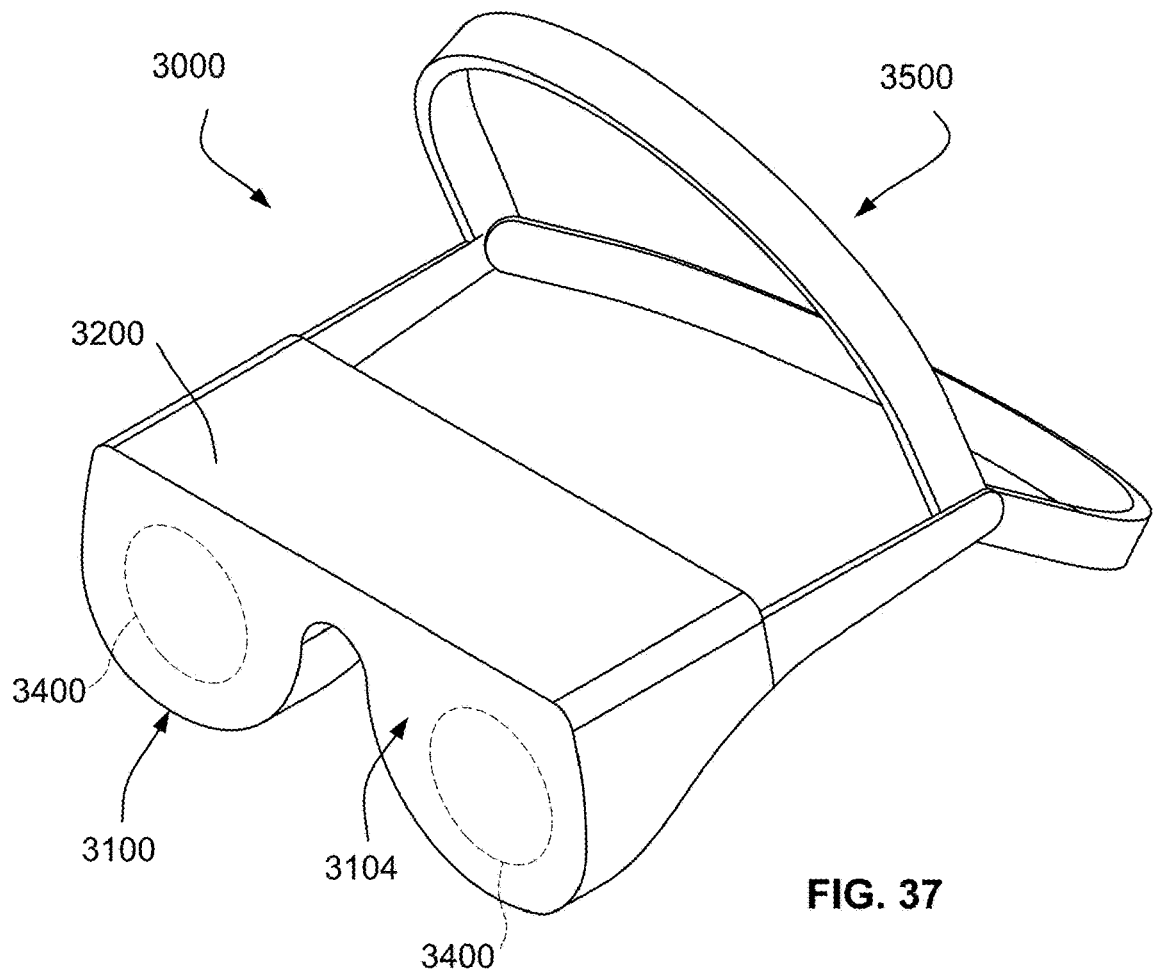

FIG. 37 is a perspective view of an AR head-mounted display apparatus according to an example of the present technology.

5 DETAILED DESCRIPTION OF EXAMPLES OF THE TECHNOLOGY

Before the present technology is described in further detail, it is to be understood that the technology is not limited to the particular examples described herein, which may vary. It is also to be understood that the terminology used in this disclosure is for the purpose of describing only the particular examples discussed herein, and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

The head-mounted display system according to examples of the present technology is structured and arranged to provide a balanced system, i.e., not overly tight at any singular point along the user's head and/or face, while providing a substantially complete sealing around the user's eyes, i.e., to provide or facilitate immersion in the use of virtual reality head-mounted displays. That is, the head-mounted display system according to examples of the present technology provides a more even fit that is structured and arranged to distribute pressure (e.g., universal and regional load distribution) in a comfortable stable manner to lessen hot spots or localised stress points.

Also, the head-mounted display system according to examples of the present technology comprises soft and flexible (e.g., elastic) materials (e.g., breathable material, e.g., textile-foam composite) structured and arranged to allow more conformity to the user's head and cushioning for comfort. In addition, the head-mounted display system according to examples of the present technology comprises simple adjustment mechanisms to facilitate adjustment while on the user's head and allow a wide fit range.

5.1 HEAD MOUNTED DISPLAYS 5.1.1 Positioning and Stabilising Structure

To hold the display unit in its correct operational position, the head-mounted display system further comprises a positioning and stabilising structure that is disposed on the user's head. The positioning and stabilising structures that are comfortable need to be able to accommodate the induced loading from the weight of the display unit in a manner that minimises facial markings and discomfort from prolonged use. There is also need to allow for a universal fit without trading off comfort, usability and cost of manufacture. The design criteria may include adjustability over a predetermined range with low-touch simple set up solutions that have a low dexterity threshold. Further considerations include catering for the dynamic environment in which the head mounted display system may be used. As part of the immersive experience of a virtual environment, users may communicate, i.e., speak, while using the head mounted display system. In this way, the jaw or mandible of the user may move relative to other bones of the skull. Additionally, the whole head may move during the course of a period of use of the head-mounted display system, e.g., virtual reality display. For example, movement may include a user's upper body, and in some cases lower body, and in particular, movement of the head relative to the upper and lower body.

FIGS. 3a and 3b show a positioning and stabilising structure 14 for a head-mounted display system or assembly 10 according to a first example of the present technology. The head-mounted display system 10 comprises a head-mounted display unit 12 (or display unit 12), and the positioning and stabilising structure 14 to maintain the display unit 12 in an operational position over a user's face in use.

The display unit 12 includes a user interfacing structure 11 constructed and arranged to be in opposing relation with the user's face, i.e., the user interfacing structure is facing or placed opposite the user's face as shown in FIG. 3c. The user interfacing structure 11 extends about a display contained by the display unit housing 22. The user interfacing structure 11 may extend about the display and define a viewing opening (i.e., an opening for viewing) to the display. The user interfacing structure 11 extends around the user's eyes, and may engage (e.g., light sealing) with the user's face, e.g., along the user's nose, cheeks and/or forehead.

In the illustrated example of FIGS. 3a to 3c, the positioning and stabilising structure 14 comprises a rear support hoop 16 (also referred to as a rear support structure) adapted to contact regions of a user's head (e.g., positionable at a crown of the user's head) and at least one connector structured and arranged to interconnect (or connect) the rear support hoop 16 to the display unit 12. In the illustrated example, the at least one connector comprises opposing temporal connectors 18 disposed on respective sides of the user's head that interconnect the rear support hoop 16 to respective posterior edge regions 20 of the display unit housing 22 of the display unit 12, and a forehead support connector 24 that extends across the frontal bone of the user to interconnect (or connect) the rear support hoop 16 with a superior edge region 21 of the display unit housing 22. However, it should be appreciated that one or more connectors may be provided to interconnect the rear support hoop 16 to the head-mounted display unit 12.

5.1.1.1 Temporal Connectors

Each of the opposing temporal connectors 18 comprises a temporal arm 26. Each temporal arm 26 includes an anterior end 28 mounted to the respective posterior edge region 20 of the display unit housing 22, and a posterior end 30 that forms part of a releasable coupling to connect the temporal arm 26 to the rear support hoop 16.

In some forms, each temporal arm 26 comprises a rigidiser 32, a resilient (e.g., elastomeric and/or textile) component 34, and a tab 36 arranged at the posterior end 30 for connecting to the rear support hoop 16. In an example, a portion of each of the temporal arms 26, in-use, is in contact with a region of the user's head proximal to the otobasion superior, i.e., above the user's ear. In an example, the temporal arms 26 are arranged in-use to run generally along or parallel to the Frankfort Horizontal plane of the head and superior to the zygomatic bone, i.e., above the user's cheek bone.

An advantage of the positioning and stabilising structure 14 is that it is relatively self-supporting and/or able to hold its shape without being worn. This can make it more intuitive or obvious for users to understand how to use the positioning and stabilising structure and may contrast with a positioning and stabilising structure that is entirely floppy and does not retain a shape. In one form, the rigidisers provide the self-supporting aspect of the positioning and stabilising structure.

5.1.1.2 Rigidisers

In some forms of the technology, for example in the rigidisers 32, the rigidisers 32 can take the form of stiffened and/or thickened elements. In one form, the rigidisers 32 may be encapsulated within the resilient (e.g., elastomeric and/or textile) component 34 of each temporal arm 26. For example, FIG. 3d shows an example of the resilient component 34 (e.g., elastomeric and/or textile) in the form of a cover configured to encapsulate the rigidiser 32. In this example, the textile component 34 includes a face contacting side arranged on one side of the rigidiser 32 that can provide a soft, face contacting surface 35 adapted to contact the user's face in use. In some alternative forms, the rigidiser may be stitched or otherwise attached (e.g., overmolded) to the resilient component 34, or the resilient component can be made of materials that can be selectively rigidized by heat treatment. For example, FIG. 3e shows an example of the resilient component 34 (e.g., elastomeric and/or textile) attached to a face contacting side of the rigidiser 32 that can provide a soft, face contacting surface 35 adapted to contact the user's face in use. In an example, the resilient component 34 may comprise a textile material or a textile-foam composite (e.g., breathable material, e.g., multi-layered construction including an outer textile layer and an inner foam layer) to provide a soft support for the rigidiser 32 to cushion against the user's head for optimised comfort. The rigidiser 32 can allow each temporal arm 26, or other component to which it is connected or formed, to retain an in-use shape and configuration when not worn by a user. Advantageously, maintaining the temporal arms 26 in the in-use state prior to use may prevent or limit distortion whilst the user is donning the positioning and stabilising structure and allow a user to quickly fit or wear the display system 10.

In an example, the rigidiser 32 can be made from a rigid material, e.g., Hytrel® (thermoplastic polyester elastomer). In the example of FIGS. 3a to 3c, the rigid nature, i.e., inextensibility, of the rigidiser 32 of each temporal arm 26 limits the magnitude of elongation or deformation of the temporal arm 26 while in-use. Advantageously, this configuration enables a more effective, i.e., direct, translation of tension through the temporal arm 26.

In another example, the positioning and stabilising structure may be designed so that, e.g., the positioning and stabilising structure springs 'out of the box' and generally into its in-use configuration or shape. In addition, the positioning and stabilising structure may be arranged to hold its in-use shape once out of the box, for example, a rigidiser may be formed to maintain the shape of some or part of the positioning and stabilising structure. Advantageously, the orientation of the positioning and stabilising structure is made clear to the user, as the shape of the positioning and stabilising structure is generally curved, e.g., much like the rear portion of the user's head. That is, the positioning and stabilising structure is generally dome shaped.

Another aspect of the positioning and stabilising structure described herein is to direct the display unit 12 to direct contact with the user's face, that is, the forces, i.e., force vectors, of the positioning and stabilising structure may cause the display unit to apply pressure perpendicular or normal to the user's face.

In an example, the rigidiser 32 forms a lever-arm (such as rigidiser arm 32), i.e., a means to pivot, about the rear support hoop 16. Advantageously, the rear support hoop 16 can provide an anchor point for the positioning and stabilising structure 14, thus forming a pivot point. The rigidiser may articulate about the anchor point of the rear support hoop 16 to enable the forehead support connector 24 to raise or lower the position of the display unit 12 relative to the user's nose. Advantageously, this configuration can minimise the magnitude of clamping pressure to stabilise the display unit 12 on the user's head.

In some forms of the present technology, the rigidiser may be curved, such that it take a crescent, semi-circular or partial crescent shape.

The rigidiser arm 32 may have a generally elongate and flat configuration (e.g., see FIG. 3a). In other words, the rigidiser arm is longer and wider (direction from top to bottom in the paper plane) than thick (direction into the paper plane). In an example, the thickness and/or width of the rigidiser arm 32 may vary along at least a portion of its length, e.g., rigidiser arm 32 may include wider and thinner sections along its length to facilitate connection and to distribute load.

While the rigidiser arm may be flat as represented in FIGS. 3a to 5c, it will be appreciated that the rigidiser arm may have a desired spatial configuration in the direction into the paper plane (e.g., see FIGS. 6 and 7a to 7c), particularly in order to allow improved alignment with the shape of a user's face, such as the shape of a side region of a user's head (e.g., see FIGS. 7a to 7c). Referring to FIGS. 6 and 7a to 7c, the rigidiser arm has a three-dimensional shape which has curvature in all three axes (X, Y and Z). Although the thickness of the rigidiser arm may be substantially uniform, its height or width varies throughout its length. The purpose of the shape and dimension of the rigidiser arm 32 is to conform closely to the head of the user in order to remain unobtrusive and maintain a low profile (i.e., not appear overly bulky).

The rigidiser arm may have a longitudinal axis which may be understood to be the axis substantially parallel to the paper plane, along which the rigidiser arm extends (see dashed line in FIG. 5a and FIG. 7a as examples).

In some forms of the technology, the rigidiser (such as rigidiser arm 32) is more rigid than the resilient (e.g., elastomeric and/or textile) component 34 and less rigid than the display unit housing 22. In particular, the rigidiser arm and/or the resilient component are such that, in combination, the rigidiser arm imparts a shape, and an increased degree of rigidity, in at least one direction or in or around at least one axis, to the resilient component.

The rigidiser 32 may be able to bend or deform along its length but resist or prevent stretching of the positioning and stabilising structure along the longitudinal axis of the rigidiser (see dashed line in FIG. 5a and FIG. 7a). As indicated in FIGS. 5a and 7a, the longitudinal axis of the rigidiser extends along the length of the rigidiser (e.g., generally through its center) and may be straight (FIG. 5a) or curved (FIG. 7a). The rigidiser may be substantially inextensible and resilient. A rigidiser in accordance with the present technology preferably has one or more of the following features: holds it shape, allows components to redirect force, i.e., force vectors, around curves such as around the cheeks, or around the ears, ability to flex and/or in certain planes provides a structure to maintain a predefined form.

In one form, the rigidiser 32 can be flexible or able to conform to the user's head along the longitudinal axis of the rigidiser. In one form, the rigidiser, however, may be structured such that it cannot flex or deform across its width. This is so that the positioning and stabilising structure is comfortable whilst maintaining its structural function of anchoring the display in position (e.g., rigidiser is flexible in one direction (into the user's head) while provide support or load bearing in another direction).

In some forms, the rigidiser 32 may have bows or bends. Bends may be provided in one or more select region(s) of the rigidiser to allow the rigidiser to readily flex or hinge at the region(s). Bends may be weakened regions to achieve a flexibility in the rigidiser so that the weakened portions act as living hinges. This flexibility may be beneficial for fitting a larger range of user head sizes. The bends may be positioned so as to allow portions of the rigidiser to flex outwards towards the ears of the user and/or inwards towards the centre of the user's head.

In some forms, the rigidiser 32 comprises a plurality of slots (e.g., on each side of the arm, i.e., slots on anterior and posterior sides of the arm), and the plurality of slots form a plurality of hinges along the component (such as temporal connector 18). The hinges form flexible portions in each arm. The hinges allow the arms to articulate and conform to micro variations of the cheek region and distribute load on the face more evenly upon headgear tension, e.g., when compared to a rigidiser arm without any flexible portions. In some forms, where the rigidisers are elongate extending in a general longitudinal direction, the hinges and/or weakened regions may extend transverse to the longitudinal direction or may extend in the longitudinal direction to increase the degree of conformity allowed.

In some forms, the slots are generally parallel to one another, generally evenly spaced apart from one another, and include similar widths and depths into the thickness of the arm. However, it should be appreciated that the slots may include other suitable arrangements and configurations to modify the location and flexibility characteristics of the arm, e.g., number of slots, slots on one or both sides of the arm (anterior and/or posterior sides), spacing between slots, width, depth, orientation or angle of slot on the arm (e.g., slots angled relative to one another to provide bending in different orientations). In an example, one or more of the slots may be filled with a flexible material, e.g., the narrow depression or groove formed by the slot may receive a flexible material. In an alternative example, the hinge may be provided by a plurality of flexible sections (e.g., flexible section formed by a flexible or bendable material) spaced apart by rigid segments.

In some forms, the rigidiser 32 may comprise a material to guide or define the direction or path of stretch for the resilient (e.g., elastomeric and/or textile) component, i.e., of the rear support hoop 16. In other words, the user stretches the positioning and stabilising structure 14 in a direction substantially parallel to the longitudinal axis of the rigidiser 32 (see dashed line in FIG. 7a). Stretching of the positioning and stabilising structure 14 in other directions leads to rotation of the rigidiser relative to the display unit housing 22 which is undesirable. The rigidity of the rigidiser biases the rigidiser towards its natural, unrotated, untwisted and undeformed state. To some degree, this enables the positioning and stabilising structure 14 to be a self-adjusting head-mounted display system. In an example, the rigidiser may be biased to a particular size (such as a relatively small fit), and the rigidiser can adjust to the user's head such as by opening up or flexing outwardly to scale head size, thereby conforming to the shape of the user's head and providing support as required.

In some forms, a resilient (e.g. elastomeric and/or textile) component may encapsulate the rigidiser. For example, a textile may be over-moulded onto one side of the rigidiser (e.g., see FIG. 3e). The rigidiser may be encapsulated within a suitable resilient (e.g. elastomeric and/or textile) material to improve user comfort and wearability (e.g., see FIG. 3d). The textile may be arranged on the user contacting side of the rigidiser to provide a soft contact with the user's skin.

In some forms, the rigidiser may be formed separately from the resilient component and then a sock (i.e., a cover or an enclosure) comprising a user contacting material (e.g., Breath-O-Prene™) may be wrapped or slid over the rigidiser. In alternative embodiments, the rigidiser may be made by adhesive, ultrasonic welding, sewing, hook and loop material, and/or stud connectors. In an embodiment, the user contacting material (i.e., a soft or comfortable material (e.g., Breath-O-Prene™) arranged to contact the user's skin in use) may be on both sides of the rigidiser, or alternatively may only be on the user contacting side of the rigidiser to reduce bulk and cost of materials.

The rigidiser may also be formed by a layer of additional material applied to the resilient component, such as silicone, polyurethane or other tacky material, that may be applied to the resilient component to reinforce the resilient component. Silicone beading or polymeric over-moulding may also be used.

The rigidiser may have a composite construction with two or more materials (rigid or semi-rigid material). For example, the rigidiser may be constructed by thickening or treating a textile such that it is stiffer or impedes the stretch of the material. In an example, the textile may be printed on such that the ink from the print restrains or reduces the capacity of the textile to stretch. Additionally, the textile may be stitched in selected regions to stiffen it. Also, the textile may be ultrasonically welded in selected regions to stiffen it.

In some alternative forms, the rigidiser may be constructed from a non-woven material, for example netting, such that it is resistant to stretching in at least one direction. The rigidiser may alternatively be formed from a woven material, where the grain of the material is aligned such that the textile may not stretch in the lateral direction to secure and anchor the positioning and stabilising structure when in use.

In an example, the rigidiser can be formed from Hytrel® and the display unit housing 22 may be formed from polypropylene (PP). PP is a thermoplastic polymer with good resistance to fatigue. Hytrel® is desirable for forming the rigidiser 32 because this material is resistant to creep. Since these materials cannot be integrally bonded, the display unit housing 22 may be overmolded to the rigidiser 32 to form a secure connection, i.e., a joint between the anterior end 28 of the arm 26 and the posterior edge regions 20 of the display unit housing 22.

In alternative forms, the rigidiser (such as the rigidiser arm) may be made from TPE which provides high elastic properties. For example, a Dynaflex™ TPE compound or Medalist® MD-115 may be used. The housing may be made from polypropylene (PP) material. An advantage of the rigidiser being moulded in TPE may be that it enables the rigidiser and the display unit housing to be permanently connected to each other. In other words, a fusion bond or chemical bond (molecular adhesion) is formed between the two components.

The joint that connects the rigidiser to the display unit housing may provide a targeted point of flexibility and the joint may be shaped and formed to allow flexing in a desired direction and degree. Thus, once the head-mounted display system is donned and the temporal arms 26 are stressed by tension from the rear support hoop 16 of the positioning and stabilising structure 14, the rigidiser 32 may flex at the joints to allow them to retain a face framing shape while helping to retain the temporal arms 26 in a desired position relative to the user's face.

Although the rigidiser and display unit housing have been described as permanently connected to each other, it is envisaged that the rigidiser (i.e., temporal arm) may be detachable from the display unit housing, for example, by a mechanical clip (snap-fit) assembly. This arrangement may provide a modular system with exchangeable display units and/or positioning and stabilising structures.

5.1.1.3 Rear Support Hoop (or Support Hoop)

The rear support hoop 16 may have a ring-like form (similar to the ring-like form of rear support hoop 316 shown in FIG. 7b) and be arranged to have a three-dimensional contour curve to fit or conform to the shape of the rear of the user's head, e.g., a user's crown. In an example, the support hoop provides a hoop-like or ring-like arrangement (e.g., closed loop) adapted to enclose or encircle a portion of the user's head therebetween. It should be appreciated that the support hoop is not limited to a circular or round shape, e.g., support hoop may be oval or part circular/oval or C-shaped. The rear support hoop 16 comprises a parietal portion or parietal strap portion 38, adapted to be in proximity to the parietal bone of the user's head when in use, and an occipital portion or occipital strap portion 40, adapted to be in proximity to the occipital bone of the user's head when in use. In an example, the occipital portion 40 is preferably arranged along a portion of the occipital bone when in use, e.g., along a portion of the occipital bone adjacent or near a junction where the neck muscles attach to the occipital bone, and the parietal portion 38 is preferably arranged rearward of the coronal plane when in use. In an example, the occipital portion 40 is adapted to be positioned along a portion of the occipital bone and above a junction where the neck muscles attach to the occipital bone. The junction may also be referred to as the external occipital protuberance (EOP). However, the exact location of the occipital portion 40 on the user's head may vary depending on the size and shape of the user's head with which the occipital portion 40 is being used, e.g., the occipital portion 40 may be positioned adjacent to, above, or below a portion of the occipital bone where the neck muscles attach to the occipital bone. In an example, the occipital portion 40 may be arranged beneath or underneath the occipital bone near the junction where the neck muscles attach. This hoop-like arrangement (e.g., ring-like, circular or oval or part circular/oval or C-shaped) of the rear support hoop 16 anchors the positioning and stabilising structure 14 around the rear or rear bump of the user's head, which provides an effective support structure to hold weight (i.e., the display unit) at the front of the user's head. The rear support hoop 16 may be formed from an elastic material, which elasticity may be used to stretch the hoop and securely hold the rear support hoop 16 in position.

In an example, the three-dimensional shape of the rear support hoop may have a generally round three-dimensional shape adapted to cup the parietal bone and occipital bone of the user's head in use.

In an example, the occipital portion 40 engages with the occipital bone in order to maintain the occipital portion 40 and the rear support hoop 16 in position and prevent the positioning and stabilising structure from riding up the back of the user's head. Further, the parietal portion 38 could capture or pass over the upper part of the user's parietal bone, so as to prevent the positioning and stabilising structure from slipping back down the user's head.

The rear support hoop 16 further comprises opposing connection straps or tabs 42 (e.g., see FIG. 3a).

In an example, the rear support hoop 16 is orientated in a generally vertical direction, i.e., arranged in a vertical plane generally parallel to the coronal plane. This arrangement of the rear support hoop 16 appropriately orients the rear support hoop 16 at the crown of the user's head to support the transverse, i.e., horizontal, tension applied by the connection straps 42 and support the weight of the display unit 12.

The rear support hoop 16 and connection straps 42 may be formed from an elastic and/or textile material to assist conforming to the shape of a user's head, e.g., rear support hoop 16 and connection straps 42 provide stretch capacity. Also, such elastic and/or textile material at the back of the user's head may allow easier lifting of the display unit 12 away from the user's face, e.g., move the display unit 12 away from the user's eyes to talk to someone while the positioning and stabilising structure 14 remains on the user's head. For example, the rear support hoop 16 may be a neoprene material, or other textile-foam composite (e.g., breathable material, e.g., multi-layered construction including at an outer textile layer and an inner foam layer), or spacer fabric. Advantageously, textiles can provide a soft support structure to stabilise the display unit 12 on a user's head and allow the positioning and stabilising structure 14 to cushion against the user's head for optimised comfort.

The rear support hoop, including portions of the temporal arms 26, may be stretchable. This enables the positioning and stabilising structure 14 to be stretched which leads to a comfortable (or relatively flat) force-displacement (or extension) profile. In an example, when the positioning and stabilising structure 14 is stretched apart under load L, the strain force can be substantially evenly spread across the positioning and stabilising structure 14. Consequently, the positioning and stabilising structure 14 has a relatively flat force (y-axis) vs. displacement (x-axis) profile, thereby illustrating that the force does not change much when the positioning and stabilising structure 14 is extended, particularly when compared to a prior art structure.

5.1.1.4 Adjustable (Connection) Straps

The straps or tabs will be understood to be a structure designed to resist tension. In use, a connection strap 42 is part of the positioning and stabilising structure 14 that is under tension. In certain forms of the present technology, the connection strap 42 can be bendable and, e.g., non-rigid. An advantage of this aspect is that the connection strap is more comfortable for a user to tension against their head.

Some straps will impart an elastic force as a result of this tension, as will be described. The straps of the positioning and stabilising structure 14 provide a retention force to overcome the effect of the gravitational force on the display unit 12. In this way, a strap may form part of the positioning and stabilising structure to maintain a light-sealing position of the display unit on the user's head.

In some forms, the positioning and stabilising structure 14 provides a retention force as a safety margin to overcome the potential effect of disrupting forces on the display unit in-use, such as from head and body movement, or accidental interference with the display unit. The strap may be configured in-use to direct a force to draw an interfacing surface of a display unit 12 into sealing contact with a portion of a user's face. In an example the strap may be configured as a tie.

In the form of FIGS. 3a to 3c, the connection straps 42 are adjustable and operate to change the distance between the rear support hoop 16 and the display unit housing 22 of the display unit 12. Each of the straps 42, in use, is threaded through an eyelet 44 in the tab 36 of a respective temporal arm 26. The length of each strap 42 through the tab 36 of a respective temporal connector 18 may be adjusted by pulling more or less (or adjusting the length, i.e., adjustment) of the strap 42 through a respective eyelet 44. The strap 42 may be secured to itself after passing through the eyelet 44 in the tab 36, for example, with hook-and-loop fastening means, which allows fine or micro adjustment of the straps for comfort and fit (e.g., tightness). Therefore, the distance between the rear support hoop 16 and the display unit housing 22 may be adjusted to fit around different head sizes. Such adjustable strap arrangement also allows adjustment while the display unit 12 is on the user's head, e.g., user can pull straps 42 to posteriorly tighten.

In an example, the thickness and/or width of the rear support hoop 16 and/or the straps 42 may vary along at least a portion of its length. For example, the rear support hoop 16 may include wider and thinner sections along its length, e.g., wider sections adjacent the straps 42 to facilitate connection to the temporal arms 26 and to distribute load. Also the straps 42 may be thinner along it free end to facilitate threading through the eyelet 44 in the respective temporal arm 26.

In some arrangements, the straps or rigidiser provide a press stud arrangement. For example, the rigidiser may include a portion with a plurality of holes and one end of strap 42 may provide a stud (e.g., over-moulded or sonically welded to the strap) adapted to be press fit into a selected one of the holes. The stud and holes are configured to provide a snap-fit arrangement. In other forms, the strap could be secured to itself with an arrangement of holes and studs.

In some arrangements, an adjustment mechanism is provided for adjusting the distance between the rear support hoop 16 and the display unit housing 22. The rigidisers may comprise an aperture to loop the strap 42 therethrough so as to form a looped portion of the strap 42. The rigidisers may be provided with a push-tab that is pre-loaded or biased with spring so as to allow for engagement and disengagement of the looped portion of the strap 42. A gripping portion may be provided on an opposite side of the aperture to the push-tab for the user to stabilize the positioning and stabilising structure on their face. The gripping portion may prevent disassembly of the looped portion by preventing it from pulling back through the aperture.

In certain forms of the present technology, more than one positioning and stabilizing structure 14 is provided with the display unit, each of the positioning and stabilising structure being configured to provide a retaining force to correspond to a different size and/or shape range. For example, one form of positioning and stabilizing structure 14 may be suitable for a large sized head, but not a small sized head, and another form of positioning and stabilizing structure may be suitable for a small sized head, but not a large sized head. As such, the display unit may be provided with a set of different positioning and stabilizing structures that caters to a different size and/or shape range. Advantageously, the display unit is versatile and may be better fitting and comfortable.

5.1.1.5 Modifications to Rear Support Hoop 5.1.1.5.1 Extended Rigidiser

FIGS. 5a to 5c show a support for a head-mounted display system or assembly 210 according to a third example of the present technology. In FIGS. 5a to 5c, like reference numerals denote similar or like parts to FIGS. 3a to 3c with the addition of 200 to allow distinguishing between examples, e.g., display unit 212, positioning and stabilizing structure 214, rear support hoop 216, temporal connector 218, posterior edge region 220, display unit housing 222, parietal portion 238, occipital portion 240, connection straps 242. In the third example, the support for a head-mounted display assembly 210 does not comprise a forehead support, i.e., the display unit 212 is supported by a positioning and stabilizing structure 214 without any forehead support connector or forehead support straps.

FIG. 6 shows a support for a head-mounted display system or assembly 310 according to a fourth example of the present technology. In the fourth example as shown in FIG. 6, like reference numerals denote similar or like parts to FIGS. 3a to 3c with the addition of 300 to allowing distinguishing between examples, e.g., display unit 312, positioning and stabilizing structure 314, rear support hoop 316, temporal connector 318, display unit housing 322, forehead support connector 324, temporal arm 326, rigidiser 332, parietal portion 338, occipital portion 340, forehead support strap 348. In the fourth example, the support for a head-mounted display system 310 comprises opposing temporal connectors 318 each having a temporal arm 326 with an extended rigidiser 358. Each extended rigidiser 358 may extend from the respective temporal arm 326 to the rear support hoop 316 to enhance support of the display unit 312, in use. Each extended rigidiser 358 may extend along a portion of the rear support hoop 316 and may extend into one or both of the parietal portion 338 and the occipital portion 340. For example, each extended rigidiser 358 may comprise a Y-shaped form as shown in FIG. 6 that extends into both the parietal portion 338 and the occipital portion 340. Alternatively, each extended rigidiser 358 may only extend into one of the parietal portion 338 and the occipital portion 340, e.g., only extend along the occipital portion 340 as shown in FIG. 7a discussed below. In the example of FIG. 6, the parietal and occipital portions of the extended arms of the rigidiser 358 are provided along the parietal portion 338 and occipital portion 340 of the rear support hoop 316 positioned proximal to the parietal and occipital bones of the user's head to support respective portions of the rear support hoop 316.

The extended rigidisers 358 increase the length of the temporal connectors 318 so as to increase the lever-arm moment created about the rear support hoop 316. In use, the larger lever-arm extends the moment of inertia further rearward of the user's head when compared with the first and second examples. Advantageously, this can provide more comfort to the user by decreasing the tension applied to the forehead support connector 324 to support the display unit 312.

Additionally, the extended arms of the rigidiser 358 may provide a more even distribution of pressure on the user's head under the weight of the display unit 312 and any clamping force applied by tension induced in the positioning and stabilising structure 314.

The extended arms of the rigidiser 358 can help prevent the rear support hoop 316 of the positioning and stabilising structure 314 from translating vertically upwards, i.e., riding upwards on the user's head, when tensioning the forehead support connector 324. The extended arms of the rigidiser 358 can more effectively secure the occipital portion 340 of the rear support hoop 316 beneath the corresponding occipital bone (e.g., along a portion of the occipital bone adjacent a junction where the neck muscles attach to the occipital bone) of the user's head.

In other words, the occipital portion 340 of the extended rigidisers 358 engages with the occipital bone in order to maintain the occipital portion 40 and the rear support hoop 16 in position when in-use. Further, the parietal portion 338 of the extended rigidisers 358 could capture or pass over the upper part of the user's parietal bone in-use, so as to prevent the positioning and stabilising structure from slipping back down the user's head when in-use.

In an embodiment, each of the parietal portion 338 and the occipital portion 340 may have different elastic properties so as to provide increased stability to the positioning and stabilising structure on the user's face in-use.

In an example, the parietal portion 338 may be constructed from an extensible material to allow for adjustment of the positioning and stabilising structure when in-use. For example, the parietal portion 338 may be made from an elastic material. The extensibility provided by the elastic parietal portion may allow for a greater fit range of users. Additionally, the occipital portion 340 may be made from a material with lower extensibility than that of the parietal portion 338. That is, the occipital portion 340 may be constructed of a material with less stretch for a given force when compared to the material used for the parietal portion 338. This is to secure the positioning and stabilising structure in position while allowing for some adjustment of the display unit position on the face of the user.

5.1.1.5.2 Biased Extended Rigidiser

FIGS. 7a to 7c show a variation of the fourth example in FIG. 6. In this example, each of the temporal arms 326 comprises a biased extended rigidiser 360. Each biased extended rigidiser 360 may extend from the respective temporal arm 326 to the occipital portion 340 of the rear support hoop 316, i.e., to generally take a J-shaped form, so as to enhance support of the display unit 312, in use.

The biased extended rigidisers 360 extend along a portion of the occipital bone, e.g., along a portion of the occipital bone adjacent a junction where the neck muscles attach to the occipital bone, to securely anchor the positioning and stabilising structure 314 so as to support the display unit 312 above the user's nose and cheek.

As best shown in FIGS. 7a and 7c, medial and temporal adjustment mechanisms 362, 364 may be provided to the temporal arms 326 and the biased extended rigidisers 360. The medial adjustment mechanism 362 may be adapted to connect a first biased extended rigidiser 360 to a second biased extended rigidiser 360, such that the medial adjustment mechanism 362 is located between the first and the second medial adjustment mechanisms 362. The medial adjustment mechanism 362 may have an adjustable length, thereby controlling the distance between the opposing arms of the rigidisers 360. The medial adjustment mechanism 362 can be mounted about the medial region of the occipital portion between opposed arms of the biased extended rigidisers 360. In an example, the medial adjustment mechanism 362 may be in the form of a strap threaded through opposing holes 363 in respective posterior ends 368 of the opposing arms of the biased extended rigidisers 360 (see FIG. 7b). The distance between the opposing arms of the rigidisers 360 can be controlled by pulling more or less of the strap 362 through the holes 363.

The temporal adjustment mechanism 364 can be disposed on each temporal arm 326, along the temporal region of the user's head. The temporal adjustment mechanism 364 can be adjustable and operate to change the distance between the biased extended rigidisers 360 and the display unit housing 322.

The biased extended rigidisers 360 may be formed from a flat component and then bent or deformed into a shape suitable for use. For example, the rigidiser 360 may be die cut from sheet material.

5.1.1.6 Adjustable Support Hoop and Offset Configuration

FIGS. 9a to 10c show a positioning and stabilising structure 514 for a head-mounted display system 510 according to a further example of the present technology. The head-mounted display system 510 comprises a display unit 512, and the positioning and stabilising structure 514 is structured to maintain the display unit 512 in position on a user's face.

The positioning and stabilising structure 514 comprises a support hoop 516 that is positionable between a frontal bone and a temporal bone of the user's head, and opposing connectors 518 disposed on respective sides of the user's head that interconnect the support hoop 516 to respective posterior edge regions 520 of the display unit housing 522. In the illustrated example, the connectors 518 connect to a portion of the support hoop 516 at a location closer to the mid coronal plane, as compared to the anterior coronal plane of the head, when in use.

Each of the connectors 518 comprises an arm 526, having an anterior end 528 mounted to the posterior edge region 520 of the display unit housing 522, and a posterior end 530 that forms part of a coupling 564 to connect the arm 526 to the support hoop 516.

The support hoop 516 can have a three-dimensional contour curve to fit or conform to the shape of a user's head. The support hoop 516 comprises a frontal portion 538 (also referred to as a front support portion or anterior support portion), arranged to generally locate on either of the frontal bone or parietal bone, or between the frontal bone and the parietal bone, (e.g., contact an anterior region of the user's head), and an occipital portion 540 (also referred to as a back support portion or posterior support portion) arranged to generally locate on either of the occipital bone or parietal bone, or between the occipital bone and the parietal bone, (e.g., contact an posterior region of the user's head). The occipital portion 540 is preferably arranged along a portion of the occipital bone (e.g., along a portion of the occipital bone adjacent a junction where the neck muscles attach to the occipital bone), and the frontal portion 538 is preferably arranged forward of the coronal plane extending through the otobasion superior. In the illustrated example, the frontal portion 538 and the occipital portion 540 extend transverse to the sagittal plane. For example, as shown in FIGS. 10a to 10c, the frontal or anterior support portion 538 of the support hoop 516 is adapted to extend or lie in a plane 539 and the occipital or posterior support portion 540 of the support hoop 516 is adapted to extend or lie in a plane 549, and each of the plane 539 and the plane 549 is adapted to extend transverse to the sagittal plane. In an example, the plane 549 may be referred to as a first plane, and the plane 539 may be referred to as a second plane, merely to distinguish between the planes 549, 539. That is, although the terms "first" and "second" may be used, unless otherwise specified, they are not intended to indicate any order but simply utilised to distinguish between distinct elements, e.g., planes.

The frontal portion 538 and the occipital portion 540 can be rigid components and comprise adjustment mechanisms 562. In particular, the rigid components of the frontal portion and the occipital portion may be in any of the form of rigidisers or rigidiser arms as previously described. In an example, the frontal portion 538 and/or the occipital portion 540 may comprise a plurality of slots (e.g., on one or both sides of the frontal portion 538 and/or the occipital portion 540) forming a plurality of hinges along the component, e.g., see slots 543 in the occipital portion in FIGS. 9a and 9b. The hinges form flexible portions in the frontal portion 538 and/or the occipital portion 540. The hinges allow the frontal portion 538 and/or the occipital portion 540 to articulate and conform to micro variations of the user's head and distribute load on the head more evenly.

In some forms, the adjustment mechanism 562 can be disposed on either one or both the rigidiser arms, and/or at a connection point between the frontal portion 538 and the occipital portion 540. The adjustment mechanism 562 can be adjustable and operate to move the frontal portion 538 and occipital portion 540 relative to each other. In some forms, the adjustment mechanism 562 can be adjustable and operate to change the distance (e.g., distance or displacement 545 (e.g., offset) between planes 539, 549 of the frontal portion 538 and the occipital portion 540 as shown in FIG. 10b) between the frontal portion 538 and the occipital portion 540. In some forms, the adjustment mechanism 562 can be adjustable and operate to change the angle between the frontal portion 538 and the occipital portion 540.

In some forms, the frontal portion 538 and occipital portion 540 may articulate about the adjustment mechanism 562 of the support hoop 516 to enable the frontal portion 538 to, for example, rotate forward or rearward relative to the coronal plane, and the occipital portion 540 to raise or lower relative to the Frankfort horizontal.

In some forms, the frontal portion 538 and the occipital portion 540 may be articulated to adjust the distance between the frontal portion 538 and the occipital portion 540. The adjustment mechanism 562, in some forms, may comprise a sliding assembly where at least one of the frontal or occipital portions are slidable between an in-line position and at least one offset position. In the in-line position, the frontal portion lies co-planar with the occipital portion. In the at least one offset position, the frontal portion lies in an offset plane (i.e., not co-planar) to the occipital portion. The offset plane may be parallel or may not be parallel to the plane of the occipital portion.

The adjustment mechanism 562 can further comprise a guide 566 for guiding one of the frontal or occipital portions as they move relative to each other, between the in-line position and offset position. The guide 566 may take the form of an elongate slot disposed in either of the frontal or occipital portions, and a corresponding guide pin disposed in the other of the frontal or occipital portions. The guide 566 enables the corresponding guide pin to move within the elongate slot for slidable adjustment.

In some forms, the guide 566 provides a cam and slide movement to the frontal and occipital portions. The guide can take the form of a straight slot, arcuate slot, or other variation to introduce additional movement behaviour between the frontal and occipital portions. Further, the guide 566 can be arranged at specific angles relative to the Frankfort horizontal so as to adjust the movement behaviour of the frontal and occipital portions 538, 540.

The adjustment mechanism 562 enables the frontal and occipital portions 538, 540 of the hoop 516 to be configured in any one of, or combination of, parallel and co-planar to each other, parallel and offset to each other, arranged at an angle to each other and to the temporal arms. The advantages of some of the above combinations are described below.

Referring to FIG. 10a, an in-line configuration is shown wherein the frontal portion 538 is arranged in the same plane as the occipital portion 540, as indicated by a dotted line, i.e., the plane 539 formed by the frontal portion 538 of the hoop 516 is co-planar with the plane 549 formed by the occipital portion 540 of the hoop 516. The frontal portion and occipital portion can move relative to each other such as, to move from the in-line position to one or more offset positions, e.g., in which the planes 539, 549 are not co-planar.

Referring to FIGS. 10b and 10c, an offset configuration is shown, wherein the frontal portion 538 has been offset into a different, but parallel, plane to the plane of the occipital portion 540. As shown in FIGS. 10b and 10c the frontal portion 538 can be offset more or less distant from the occipital portion 540 (e.g., the offset configuration forms a spacing, distance, or displacement 545 between the plane 549 (e.g., a first plane) and the plane 539 (e.g., a second plane), and the adjustment mechanism allows the spacing or displacement to be selectively adjusted). That is, in FIGS. 10b and 10c, the plane 539 formed by the frontal portion 538 of the hoop 516 is offset or not co-planar with the plane 549 formed by the occipital portion 540 of the hoop 516. In an example, as shown in FIG. 10b, the offset planes 539, 540 may be substantially parallel to one another but spaced apart by a displacement 545 so that the plane 539 is out of line from the plane 549 (i.e., substantially parallel but not co-planar). In an alternative example, as shown in FIG. 10c, the offset planes may not be parallel, i.e., the plane 539 is arranged at an angle to the plane 549.

In some forms, the frontal and occipital portions are constrained in parallel configurations to each other, i.e., the portions cannot be rotated away from a parallel configuration. Examples of this configuration are shown in FIGS. 10b and 10c. Corresponding schematic diagrams of FIGS. 10b and 10c are shown in FIGS. 11a and 11b, respectively.

Referring to the schematic representation of FIG. 11a, the in-line configuration is shown, i.e., no offset between the frontal and occipital portions 538, 540. In this configuration, a counter-clockwise moment Mw is created by the weight Fw of the display unit 512 and its horizontal displacement D2 from the pivot point 541 of the display system which is located at the contacting region of the frontal portion 538 of the support hoop 516 (i.e., Mw=Fw×D2). As a result of both the frontal and occipital portions 538, 540 being in alignment, there is no internal moment created within the frontal and occipital portions to either assist or impede the resisting forces provided by the positioning and stabilising structure 514, i.e., no clockwise moment from created by the frontal and occipital portions. By comparison, and referring to FIG. 11b, when an offset (i.e., displacement D1) is introduced between the frontal and occipital portions, a corresponding clockwise moment Mt is created (i.e., Mt=Ft×D1) in the hoop 516 which assists in resisting the moment Mw induced on the system by the display unit 512.

In the parallel and offset configuration of FIG. 11b, the separation introduced between the frontal and occipital portions creates a moment Mt that is clockwise, and counteracting to, the counter-clockwise moment Mw created on the user's face by the display unit 512. Advantageously, this configuration can balance the acting moments placed on the system 510 to thereby improve the in-use comfort when wearing the positioning and stabilising structure.

Further, as disclosed in FIGS. 11a to 11c, the location of the pivot point 541 dictates the length D2 of the moment arm for the moment Mw induced by display unit 512. However, as this pivot point 541 moves forward on the forehead (under different adjustments of the support hoop 516), the more vertical the surface becomes on which the frontal portion 538 would locate. Whilst this may reduce the induced moment, it may require increased clamping pressure on the support hoop to resist sliding of the support hoop 516 down the face. Accordingly, obtaining a balance between these competing criteria allows a more optimal solution to be achieved that assists both comfort and fit for the user. In an example, the frontal portion 538 (e.g., providing pivot point 541) is configured and arranged to engage the user's head along an upper portion of the frontal bone or along a portion of the parietal bone (e.g., superior the user's forehead where the head shape is less vertical), which allows a reduction in the force to prevent the positioning and stabilising structure from slipping down the front of the user's head when in-use under the weight of the display unit 512. The reduction in force provides improved comfort while stably supporting the display system. In an example (e.g., see FIG. 13a), a forehead support 25 (e.g., forehead pad) may be optionally provided to the display unit to provide a light loading contact point at the user's forehead, e.g., for added stability. In such example, the forehead support would apply less force than the frontal portion 538, e.g., to avoid discomfort (e.g., red marks on the skin) at the forehead.

In some other forms, as shown in FIG. 11c, the occipital portion 540 can be independently angled relative to the frontal portion 538 in addition to being offset from the frontal portion 538. Adjusting the angle of the occipital portion 540 to become more vertically oriented enables the occipital portion 540 to more effectively apply a downward load to the positioning and stabilising structure. Advantageously, this can more effectively balance the load of the display unit 512 and in turn, create a more stable positioning and stabilising structure. Further, adjusting the angle of the occipital portion 540 can more effectively anchor the occipital portion to the user, i.e., unique shape of the user's head. In this example, adjustment of the angle of the occipital portion 540 increases the offset (i.e., displacement D1+) between the frontal and occipital portions, which increases the clockwise moment Mt (i.e., Mt=Ft×D1+) in the hoop 516 to more effectively assist in resisting the moment Mw induced on the system by the display unit 512.

In some other forms, the frontal portion 538 can be independently angled (or moved) relative to the occipital portion 540. Angling the frontal portion can allow the centre of mass of the head-mounted display system to be optimally positioned on the user's head. Advantageously, controlling the position of the centre of mass can assist with balancing the moment loads on the head-mounted display system, and therefore improve the stability of the positioning and stabilising structure. In-use, this can prevent the head-mounted display system from sliding down the user's face.

As shown in the embodiments of FIGS. 9a to 10c, the occipital portion 540 can further comprise a medial adjustment mechanism. In some forms, the adjustment mechanism is in the form of connection strap 542. For example, as shown in FIG. 10a, the strap 542 can be mounted about the posterior, medial region of the occipital portion 540, threaded through opposing holes 563 in respective posterior ends 568 of the opposing arms of the occipital portion 540 (similar to the strap 362 in FIG. 7b).

The strap 542 may be formed from an elastic material to assist conforming to the shape of a user's head. In some forms, the distance between the posterior ends 568 can be manually controlled, i.e., changed, by pulling more or less of the strap through the holes 563. Both methods of elastic and manual control act to maintain a positive pressure on the occipital portion 540, and in turn, the positioning and stabilising structure in-use. Advantageously, the strap 542 maintains tension in the positioning and stabilising structure during dynamic loading scenarios, e.g., a user moving their head and body when operating the head-mounted display unit 512.

In some forms, the medial adjustment mechanism does not support the moment load of the display unit 512. In this form, the configuration of frontal and occipital portions act to balance the head-mounted display on the user's head and so do not require the strap 542 to support the moment load applied by the display unit 512. In this way, the medial adjustment mechanism is decoupled from bearing loads in the positioning and stabilising structure.

As shown in FIGS. 12a and 12b, the positive pressure, i.e., pre-load, applied to the positioning and stabilising structure by the strap 542 holds the occipital portion 540 of the support hoop 516 close to the occipital bone of the user's head. The loading applied by the occipital portion 540 can be small in magnitude, sufficient to counter-act the dynamic loads applied to the head-mounted display when in-use, and not applying excess pressure into the user's occiput. The tension applied to the strap 542 can assist preventing the head-mounted display from sliding down the user's face in-use.

For example, FIG. 12a shows a first example of pre-load applied by the strap 542. In this configuration, a counter-clockwise moment Mw is created by the weight vector Fw of the display unit 512 and its horizontal displacement D2 from the pivot point 541 of the display system (i.e., Mw=Fw×D2), and a clockwise moment Mt is created (i.e., Mt=Ft×D1) in the hoop 516 via the tension force vector Ft and offset (i.e., displacement D1) between the frontal and occipital portions 538, 540 to resist the moment Mw. Further, an additional force vector Fb is created by bending the occipital portion 540 inwards (via the pre-load applied by strap 542), which creates an additional moment Mb (i.e., Mb=Fb×D3). Thus, the moments Mt and Mb together more effectively assist in resisting the moment Mw induced on the system by the display unit 512.

FIG. 12b shows a second example of pre-load applied by the strap 542. In this configuration, a counter-clockwise moment Mw is created by the weight vector Fw of the display unit 512 and its horizontal displacement D2 from the pivot point 541 of the display system (i.e., Mw=Fw×D2), and a clockwise moment Mt is created (i.e., Mt=Ft×D1) in the hoop 516 via the tension force vector Ft and offset (i.e., displacement D1) between the frontal and occipital portions 538, 540 to resist the moment Mw. Further, an additional force vector Fb2 is created by bending the occipital portion 540 outwards (via the pre-load applied by strap 542), which creates an additional moment Mb2 (i.e., Mb2=Fb2×D3). In this example, the moment Mt resists the moments Mw and Mb2 induced on the system.

In some forms, the medial adjustment mechanism can comprise a rigidly bound elastic portion. The rigidly bound elastic portion can, for example, be mounted about the posterior, medial region of the occipital portion 540 and threaded through the opposing holes 563 in each of the posterior ends 568. The length of the rigidly bound elastic portion can be manually controlled, i.e., can be adjusted, to increase or decrease the distance between the posterior ends 568 and therefore adjust the size of the positioning and stabilising structure to fit different shaped and/or shape heads.

The rigidly bound elastic portion comprises an elastic component and an inelastic component. The two components are connected, whereby the elongation of the elastic component is limited by the length of the inelastic component. In some forms, the elastic component is shorter in length than the inelastic component, so as to allow the elastic component to elongate until the length of elongation equals the length of the inelastic component. For example, when the rigidly bound elastic portion is mounted to the positioning and stabilising structure in-use, a user may be able to apply dynamic loading to the head-mounted display, e.g., the user jumps and moves around, and the elastic component applies sufficient tension to the user's head to prevent the positioning and stabilising structure from sliding off. If the user applies excess dynamic loading to the head-mounted display, the inelastic component can prevent the occipital portion 540 displacing away from the user's head, i.e., loosening the fit, and ensure the head-mounted display does not slide off the user's head.

Referring to FIG. 12c, the positioning and stabilising structure 514 may exhibit a high degree of adjustment in a manner that provides intuitive fit and adjustment. Further the structure provides responsive stability that can cater for dynamic movements of the user. A further feature of the design is that the reactive forces induced by the display unit 512 is catered for by the frontal and occipital portions 538, 540 whilst still allowing for fine independent adjustment of the display unit. In particular, adjustment of the display unit 512 in an anterior and posterior direction controls the contacting pressure of the interfacing structure on the face (e.g., adjustment until forehead pad provided to interfacing structure lightly touches the face), adjustment in the frontal portion 538 assists in accommodating different head sizes and location of the display unit 512 in a superior-inferior position (e.g., headphone-style adjustment (e.g., self-levelling contact) relative to the ears keeps display unit at correct height), whilst adjustment of the occipital portion 540 assists in fit, location of contacting points, and the amount of counter-moment generated to aid comfort and load distribution in the positioning and stabilising structure 514 (e.g., occipital portion 540 provides combination of properties: rigidity to control the direction of pull, conformability for comfort and grip, elasticity to automatically hold the system snug, coupled with selectable adjustment).

Referring to FIG. 13b, the forehead support connector 524 may further comprise a forehead support rigidiser 556. In some forms, the forehead support rigidiser can be pre-tensioned to apply a moment load to the positioning and stabilising structure 514 that urges the display unit housing 522 to rotate inwards, i.e., posteriorly, towards the user's face in-use (as indicated by the arrow). Advantageously, the display unit housing 522 is directed into (or towards) the user's face without requiring the positioning and stabilising structure 514 to be tensioned by the strap 542 to pull the display unit into (or towards) the user's face. The moment load created by the pre-tensioned forehead support rigidiser 556 acts similarly to a spring loading on the display unit 512. The schematic lines 566 and 568 of FIG. 13b illustrate respective loading and non-loading conditions applied to the rigidiser 556. In a loading condition (line 566), the positioning and stabilising structure is in-use on a user's head, wherein the display unit 512 is urged towards the user's face, and the rigidiser 556 behaves like a leaf-spring, deflecting away from the user's face. In the un-loaded or non-loading condition (line 568), the rigidiser 556 is pre-loaded so as to deflect the display unit housing 522 inwards in readiness to receive a user's face.

5.1.1.7 Central Support Structure

Referring to FIGS. 14a to 14b, disclosed is a further embodiment of a positioning and stabilising structure 614 for a head-mounted display system 610. The head-mounted display system 610 differs from the embodiment shown in FIGS. 9a to 13b in that the head-mounted display system 610 further comprises a central support structure 662, e.g., a hub component, arranged to locate around a user's ear. In the illustrated example, the central support structure 662 may comprise a central part or hub of the positioning and stabilising structure 614 that connects to the frontal portion 638 and/or the occipital portion 640.

In an example, the hub component 662 is rotatably connected to the frontal portion 638 (also referred to as an anterior portion) and/or occipital portion 640 (also referred to as a posterior portion). The frontal portion and occipital portion may articulate about the hub 662 to enable the frontal portion 638 to, for example, rotate forward or rearward relative to the coronal plane, and the occipital portion 640 to raise or lower relative to the Frankfort horizontal.

Referring to FIG. 14*b*, examples of two possible configurations of the frontal portion 638 relative to the hub 662 are illustrated. In a first example (shown in solid line), the frontal portion 638 is configured in a position proximal to the parietal bone. In a second example (shown in dotted line), the frontal portion 638 is configured in a position proximal to the frontal bone.

In some forms, the frontal portion 638 can be independently angled (or moved) relative to the occipital portion 640. The frontal portion can be adjusted to move towards the centre of gravity of the display system. In some forms, the occipital portion can move upwards or downwards to support the positioning and stabilising structure against the occipital bone of the user's head. In some other forms the occipital portion 640 can comprise a type of counter-weight (w) to balance the display unit 612 (e.g., see FIGS. 14*a* and 14*b*).

Referring to FIG. 14*c*, the hub 662 can, in-use, direct the force applied by the frontal portion 638 and the occipital portion 640 around the user's ear (i.e. force vectors). For example, in some forms, the occipital portion 640 can be articulated about the hub 662 into a position offset and parallel to the frontal portion 638. In this configuration, the force, i.e., vectors, applied to the occipital portion 640 can translate around the perimeter of the hub 662 and through the frontal portion 638.

Referring now to FIG. 14*d*, in some forms, the hub component 662 is also rotatably connected to the display unit 612. The display unit may articulate about the hub 662 to enable the display unit to rotate i.e., move relative to the Frankfort horizontal. For example, the display unit is raised or lowered relative to the eyes of the user. That is, the positioning and stabilising structure may allow for upward, e.g., superior, pivoting movement (or pivotal movement) of the display unit to allow for movement of the display unit to a nonoperational position without removal of the positioning and stabilising structure (e.g., flip-up version). In some forms, the pivoting movement (or pivotal movement) of the display unit involves a pivoting arrangement (or pivotal movement) which includes the positioning and stabilising structure. In some forms, this pivoting arrangement may provide a release mechanism at the forehead support connector (e.g., release mechanism releasably locks the display unit in operational (i.e., lowered) and nonoperational (i.e., raised) positions) and/or provide limited hinging regions at the temporal connectors (e.g., limited hinging regions may limit hinging movement of the temporal connectors, e.g., at the connection to the display unit).

In some forms, the hub component 662 may accommodate some of the weight of the display unit 612, thereby creating a pivot axis for the head mounted display system 610 about the user's ears and in the region of the mid coronal plane. This can relieve loading on the frontal portion and assist in angular adjustment of the display unit 612 about the hub 662.

Examples of two possible configurations of the display unit 612 are illustrated in FIG. 14*d*. In a first example, the display unit 612 is configured in front of the user's eyes, i.e., generally parallel with the Frankfort horizontal. In a second example, the display unit is shown in a raised position above the user's eye, i.e., angled relative to the Frankfort horizontal. Advantageously, moving the display unit 612 between these two positions enables the user to move the display unit 612 away from their eyes during use (e.g., game play), or before donning and doffing the head-mounted display system 610.

In some forms, an audio device (A), i.e., headphones (e.g., noise cancelling), can be located on the hub 662 (see FIG. 14*b*). The audio device A can be configured to releasably engage with the hub 662, e.g., about a snap-lock type feature. In some forms, an audio device A can be placed on the hub 662 to encapsulate a user's ear, in-use.

5.1.1.8 Materials and Composites

In one form of the present technology, a positioning and stabilising structure 14 comprises a strap constructed from a laminate of a resilient (e.g., elastomeric and/or textile) skin-contacting layer, a foam inner layer and a textile outer layer. In other words, the positioning and stabilising structure 14 comprises at least one strap 14. In one form, the foam is porous to allow moisture, (e.g., sweat), to pass through the strap. In one form, the textile outer layer comprises loop material to engage with a hook material portion i.e., tab portion 54. In some forms of the technology, the skin contacting layer is formed from a material that helps wick moisture away from the user's face. This may help to maintain comfort if the user sweats while wearing the user interface.

In one form of the present technology, a positioning and stabilising structure 14 is provided that is configured to have a low profile, or cross-sectional thickness, to reduce the perceived or actual bulk of the apparatus (or display system). In one example, the positioning and stabilising structure 14 comprises at least one strap 14 having a generally rectangular cross-section. In another example the positioning and stabilising structure comprises at least one strap having a profile with one or more rounded edges to provide greater comfort and to reduce the risk of straps marking or irritating the user.

In some forms, the straps of the positioning and stabilising structure 14 may at least partially be made of or comprise at least one synthetic polymer such as nylon and/or polyurethane (e.g., lycra). Further, the straps may comprise different layers, e.g., of different materials. Different layers may be welded one to another. In an example, the straps may comprise different layers of different materials, e.g., an outer layer of an aesthetically pleasing material and/or an inner layer facing the user's head made of a soft and/or pleasing material. For example, the straps forming the parietal portion of the hoop may be made of an inexpensive and/or comfortable material. In a further example, with reference to FIGS. 28 and 29, the straps (such as straps 14) can comprise an internal layer 17 having a thickness of 2.5-4.0 millimetre (mm) of a low density polyurethane foam with an outer layer 15 configured to surround the internal layer 17. The outer layer 15 may be formed from a laminated layer made up of nylon, polyester, another similar material that can be manufactured to provide a soft exterior surface, or a mixture thereof. The laminated layer may comprise one or more layers. In some forms, the outer layer 15 may be formed from a mixture of nylon and polyester. Consequently, the selection of material(s) for the straps may improve the comfort of the straps.

In some forms, an outer layer 15 of the straps of the positioning and stabilising structure 14 can comprise a resilient component made of an elasticated nylon knit that is formed so as to slide freely (or longitudinally) over an internal layer 17 that acts as a rigidiser (e.g., FIG. 28). The rigidiser (i.e., internal layer 17) can act as a frame (or support) for the strap 14, and can be formed from a material such as TPE that is advantageously both lightweight and offers controlled flexibility.

In an example, a strap may be a single layer component such as an elastomer/fabric. The strap may alternatively be a composite or multiple layer component such as a textile and foam composite, or outer textile layers and inner spacer fabrics. The straps may be made of a spandex or elastane/foam composite or may be formed of other suitable materials (such as a 3D spacer fabric or a double-knit interlock textile).

Different materials for different layers of a strap portion and/or different straps may be selected depending on the specific properties/functions/requirements. In an example, the straps of the positioning and stabilising structure may be BPA-free and Gelamid® which may be applied at least for portions of the strap.

In some forms, it may be desirable for at least one of the materials used for the strap(s) of the positioning and stabilising structure to be breathable. In a further example, the straps may be formed from a breathable neoprene substitute. For example, the neoprene substitute can have inner and outer resilient layers comprising porous, four-way stretchable textile. The inner layer being designed to wick moisture away from the skin surface and the outer textile layer being a loop textile for receiving Velcro® hooks.

The textile on the user contacting side may preferably have the same weave as the textile on the non-user contacting side, such that the stretch characteristics of the straps are approximately equal on both sides. Also, it is preferred that the textile on the user contacting side has the same heat shrinkage characteristics as the non-user contacting side. This is to prevent the positioning and stabilising structure from deforming unevenly when processed or exposed to heat, or otherwise thermoformed.

The textile on the user contacting side may be a different textile to the non-user contacting side, such that the textile on the user contacting side is more comfortable than the non-user contacting side.

The straps may be cut from a sheet of material (e.g., flame laminated), or cut from a roll of narrow resilient (e.g., elastomeric and/or textile) strap and then thermoformed and ultrasonically welded to create rounded edges before being ultrasonically welded together. The straps may have a geometry that allows them to be nested on the sheet to increase yield, e.g., the geometry may be substantially linear.

In some forms, the positioning and stabilising structure can comprise straps configured as separate elements. As such, the positioning and stabilising structure can be made up of an assembly of straps i.e. strap assembly. For example, the strap 48 can be connected, e.g., by a welded joint, to the parietal portion 38. The separate elements may be joined together during the manufacturing process. Alternatively, straps of the positioning and stabilising structure may be configured as or made of one piece. In another example, the strap 48 and the parietal portion 38 may be cut out of one material sheet.

Designing the strap pieces separately may allow flexibility for the strap pieces to be made relatively smaller which contributes to an increased yield and simpler process of manufacturing. In addition, the design of the strap pieces may allow for less material wastage when cut from a sheet, e.g., due to the substantially rectangular shape of the parietal portion straps. Moreover, manufacturing the strap assembly in separate pieces may allow for the substitution of materials that are less expensive, more comfortable and/or have an aesthetically pleasing colour.

The width of the straps of the positioning and stabilising structure 14, and thus the footprint, may be additionally reduced by using different materials, different strap thicknesses and/or different compositions. Different materials and/or cheaper materials may be used for some parts or portions of the structure 14, e.g., with the same support and/or comfort. In an example, the parietal portion of the hoop may have an increased thickness compared to the occipital portion of the hoop. This may increase comfort. Additionally, having a smaller overall size of the occipital portion of the hoop can allow a user to bend their head backwards towards their spine (e.g., in a posterior direction) with an additional freedom of movement.

The joints between adjacent strap portions may be constructed as a thinned region or thinned connection portions to encourage bending. The thinned region may function as a flex point or hinge (e.g., a living hinge) to provide increased flexibility where desired. The flex point or hinge may be reinforced using hot-melt seam tape, or thinner textile layer with an adhesive backing, or other reinforcement methods.

Such a hinge feature of the connection may permit the straps to better accommodate the shape of a user's head. A combination of linear and nonlinear joints may be utilized to achieve a desired level of flexibility and direction of flexion, as well as a desired level of three-dimensional shaping to a component made up of a series of parts which were originally a flat material (such as textile or paper, for example). Such shaping may include darts, tucks, gathers, or a curved seam.

In some examples, materials having differing degrees of flexibility may be combined in an alternating manner to form a controlled flex region. Components may be stacked one on top of the other and ultrasonically welded together in a manner that leaves no space therebetween. The user interfacing component may be constructed of a soft material, e.g., a soft textile.

In an example, the forehead support connector 24 that extends across the frontal bone of the user to connect to the support hoop 16 may be connected together by welding, e.g., by ultrasonic welding. In an example, portions of the forehead support connector 24 and the hoop 16 may overlap. These members may be placed in an ultrasonic welding tool.

An advantage of the ultrasonic welding process is that a flush or butt joint does not increase the thickness of the components at the joint and is visually appealing, unlike stitching where components must be overlapped, and which results in an uneven thickness. Even if the edges of the two or more components are butted together and stitched without any or substantial overlapping to form stitches, the stitches will create a rougher, stiffened and raised joint. Further, the flush or butt joint formed by ultrasonic welding may result in a smooth connection that may reduce skin irritation, chaffing or facial marking, even when reinforced with seam reinforcement tape. An advantage of using an overlapped ultrasonic weld variation is that multiple components may be joined in a single machine in one operation. Furthermore, the ultrasonic welding process may be designed such that the joint is embodied as a thinned region or thinned portion between the components.

In an embodiment, the straps may be thermoformed and then edges of the strap may be ultrasonically cut. The thermoformed and ultrasonically cut strap provides rounded edges which provides substantially reduced facial marking in-use. In addition, the thermoformed and ultrasonically cut edges are softer and less abrasive, which provides a more comfortable feel on the user's face in-use, e.g., more comfortable feel around the user's ears.

In a further embodiment, at least a portion of the positioning and stabilising structure may be constructed from a spacer fabric, where the edges of the spacer fabric may be ultrasonically welded. This may cause the edges of the spacer fabric to be rounded, thereby reducing facial marking and increasing comfort for the user.

In an embodiment, one or more aspects of the positioning and stabilising structure may be structured to enhance comfort. For example, the rigidiser may be relatively thin. In another example, the strap may include a nylon rigidiser enclosed in foam. In such embodiment, the density of the foam may be increased to improve comfort and reduce chances of feeling the nylon rigidiser. Alternatively, the thickness of the foam may be utilized to alter the softness or roundness of the edge of the strap. For example, thicker layers of foam are more likely to produce rounder corners than thinner layers of foam. In a further embodiment, the foam may begin at one thickness, and be compressed to another thickness during processing.

In an embodiment, foam on the user contacting side may be less dense or have a lower hardness than foam on non-user contacting side. It is also possible to have more than one layer of foam and more than one rigidiser component.

In some alternative embodiments, the rigidiser may include a semi-rigid moulded component that is over-moulded with a soft polymeric material, e.g., TPE, TPU. The polymeric material provides a softer material for contacting the user's face in use. In some forms, the moulded component may be provided with soft touch or flock coatings.

In certain forms of the present technology, the positioning and stabilising structure can be formed to have a biocompatible material as an outer surface, e.g., silicone rubber, textile laminate, etc. The biocompatible material can be devoid of toxicity and reduce any risk of skin reaction.

In certain forms of the present technology, the positioning and stabilising structure can be formed from durable materials that can withstand daily use, including repetitive disassembly and cleaning.

In some forms, a reduction in the overall weight of the head mounted display can be proportional to a reduction in one or more of: (a) the number of components; (b) the rigidity of the positioning and stabilising structure; (c) the rigidity of the interfacing structure; and (d) the ability to adjust the features of the head mounted display such as the positioning and stabilising structure or interfacing structure.

For example, foam (such as polyurethane foam, or viscoelastic foam) or foam-like components can be lighter and more compliant than silicone components. In a further example, spacer fabrics comprising lightweight materials such as textiles can be used to bridge across sections of the positioning and stabilising structure to assist with weight reduction. However, where some stiffness is required, it may be appropriate to utilise silicone or TPE (e.g., in a frame rigidiser).

5.1.1.9 Forehead Support Arrangements

Referring to FIG. 3a, the forehead support connector 24 of the positioning and stabilising structure 14 can be connected to the superior edge region 21 of the display unit housing 22. In some forms, the connector 24 can be connected to the display unit housing 22, e.g., about a forehead support 25 (e.g., see FIG. 13a), which can be adjusted to allow the positioning and stabilising structure to accommodate the configuration of a user's face.

5.1.1.9.1 Forehead Support

Referring now to FIG. 13a, the forehead support 25 can be connected to the superior edge region 21 of the display unit housing 22 and in some forms can be mechanically coupled to the forehead support connector 24. The support 25 can comprise a forehead contacting portion 27 which is adapted to be in contact with the user's forehead to support and stabilize the load of the display unit 12.

The forehead support 25 can be configured to be essentially straight or it can be curved. In the case where the connector (i.e., forehead support 25) is curved, the curvature generally follows the curvature of the user's forehead. While this is the most likely structure, it is within the scope of the present invention to use a forehead support 25 that has the opposite curvature, or any combination thereof. The forehead support 25 can be made from a thermoplastic material.

The forehead support 25 can be presented at an angle which is generally parallel to the user's forehead to provide improved comfort to the user. Advantageously, this can reduce the likelihood of pressure sores which may result from an uneven presentation. In-use, some user anatomical structures may require the forehead support 25 to be positioned higher up the forehead. In this case, the angle of presentation of the support 25 can be adjusted to suit the user.

The forehead support 25 can be provided with one or more openings. These openings can be adapted to serve numerous purposes including points of connection to the housing, points of connection to any another support surface, points of connection for straps to secure the head-mounted display to the user (e.g., forehead support strap 48) and apertures for a forehead contacting portion, e.g., a forehead contacting pad (or forehead pad).

In some forms of the forehead support 25, the apertures are designed to receive the forehead pad. The apertures can be disposed about the forehead support 25 in a manner to allow a user to adjust the position of the forehead pad.

The apertures are also designed to allow a user to attach the forehead pad securely to the forehead support 25. In some forms, the apertures are designed to allow a user to attach the forehead pad securely and reversibly to the forehead support 25. In some forms, the forehead pad is adapted to releasably engage with the forehead support 25.

In one form, the forehead pad is generally plate- or disc-shaped. In other forms, the pad may have a concave surface to correspond to a convex portion of the forehead of a user in-use. Possible shapes of the base portion of a forehead pad include rectangular and oval shapes.

In one form, the forehead pad may comprise one or more portions. In an embodiment, two base portions of a forehead pad are provided in order to be situated above left and right eyebrows of the user.

5.1.1.9.2 Forehead Contacting Portion

The forehead contacting portion 27 comprises a forehead contacting surface 29 which, in an in-use position, is seated on a forehead area of a user. In some forms, the forehead contacting portion 27 can be made of an elastomer material.

The contacting surface 29 can optionally include a raised surface pattern. The pattern reduces the possibility of a suction effect of the surface thereby reducing the drawing of blood in the region and making the contacting portion more comfortable. The raised pattern has the added benefit of reducing sweating. In another embodiment, the surface can be given a sand-blasted finish to improve ventilation and reduce the likelihood of sweating.

In some forms, the contacting surface 29 can have cut away portions to improve the flexibility of the contacting portion. Another advantage of the cut away portions is that the contacting portion 27, in-use, can better accommodate rolling and twisting of the display unit on a user's face. A further advantage of the cut away portions in the contacting portion is that they can reduce the effect of a single point of pressure on the forehead, e.g., reduce discomfort.

In some forms, the contacting portion includes a jacket, which defines a hollow chamber that is filled with a viscous medium in such a way that a wall of the jacket that forms the contacting surface 29 is subjected, on its side facing away from the forehead area of the user, essentially to the pressure of the viscous medium. The hollow chamber filled with viscous material may be used as a contacting portion between the user and other components of the positioning and stabilising structure, e.g., portions of the support hoop, and also may be used in the interfacing portion.

In some forms, the forehead contacting portion can comprise materials that include rubber and flexible plastics. In some embodiments, the contacting portion is constructed from cured Liquid Silicone Rubber or alternatively, a silicone with a suitable hardness. These examples are merely intended to be illustrative and are not limiting in any manner.

5.1.1.9.3 Forehead Support Connector Strap

As shown in FIGS. 3a to 3c, the forehead support connector 24 of the positioning and stabilising structure 14 comprises a forehead support strap 48 arranged to run generally along or parallel to the sagittal plane of the user's head. The strap 48 is adapted to connect between the superior edge region 21 of the display unit housing 22 and the parietal portion 38 of the rear support hoop 16. In an example, the strap 48 can be non-adjustably connected, e.g., by a welded joint, to the parietal portion 38, and the strap 48 can be adjustably connected to the display unit housing 22 by an adjustment mechanism 50.

The strap 48 is adjustable to enable dimensional control of the forehead support connector 24. As shown in FIGS. 3a and 3c, an end portion or tab portion 54 of the strap 48, in-use, is threaded through a forehead support hole 52 in the superior edge region 21 of the display unit 12. The strap 48 may be secured to itself after passing through the hole 52 in the display unit 12, for example, with hook-and-loop fastening means, which allows fine or micro adjustment of the straps for comfort and fit (e.g., tightness). In an example, the forehead support strap 48 may comprise a similar material to rear support hoop 16 and/or the connection straps 42, e.g., textile-foam composite (e.g., breathable material, e.g., multi-layered construction including at an outer textile layer and an inner foam layer).

The forehead support connector 24 supports the weight of the display unit 12. The length of the strap 48 between the superior edge region 21 of the display unit 12 and the parietal portion 38 of the hoop 16 may be adjusted by pulling more or less of the strap 48 through the hole 52. Therefore, the strap is able to be adjusted to raise or lower the position of the display unit 12 relative to the user's nose, e.g., adjust to angle or lift the display unit 12 relative to the user's face. Advantageously, this adjustment can move the display unit housing 22 away from the user's nose to relieve pressure felt on the face, nose, and/or cheeks. The forehead support connector 24 secures the display unit 12 in position so that the display unit does not slide downwards or laterally on the user's head.

In an example, the thickness and/or width of the forehead support strap 48 may vary along at least a portion of its length, e.g., forehead support strap 48 may include wider and thinner sections along its length to facilitate connection and to distribute load.

In an example, the adjustment mechanism 50 is positioned, in use, out of contact with a user's frontal bone region.

In an alternative example, the positioning and stabilising structure 14 does not include a forehead support connector 24/forehead support strap 48, e.g., see example of FIGS. 5a to 5c.

FIGS. 4a to 4c show a support for a head-mounted display system 110 according to a second example of the present technology. In FIGS. 4a to 4c, like reference numerals denote similar or like parts to FIGS. 3a to 3c with the addition of 100 to allow distinguishing between examples, e.g., display unit 112, positioning and stabilizing structure 114, rear support hoop 116, temporal connector 118, posterior edge region 120, display unit housing 122, forehead support connector 124, temporal arm 126, parietal portion 138, occipital portion 140, connection straps 142, forehead support strap 148, adjustment mechanism 150, forehead support hole 152, end portion 154. Referring to FIG. 4c, the forehead support connector 124 may further comprise a forehead support rigidiser 156. The forehead support rigidiser 156 can provide further stabilisation and support for the display unit 112 above the user's nose and cheeks, i.e., relieve pressure on the user's nose and cheeks. The rigidiser 156 can be connected to the superior edge region 121 and form part at least part of the forehead support hole 152 to receive an end portion or tab portion 154 of the strap 148 for dimensional adjustment of the positioning and stabilising structure 114. As illustrated the forehead support strap 148 is arranged beneath the forehead support rigidiser 156 for comfort and load distribution.

In some forms, the adjustment mechanism 150 may further comprise an angle adjustment mechanism for easy lifting of the visor from an in-use position to a stowed position, i.e., not in-use.

In an example, the system may be structured and arranged to redistribute one or more components from the display unit to the positioning and stabilizing structure, e.g., to redistribute weight from the display unit to the positioning and stabilizing structure. For example, the forehead support rigidiser 156 and/or forehead support strap 148 may be used to at least partially support one or more non-location essential electrical components, e.g., batteries, hard drive storage, to shift weight from the front of the user's head to a more central location, i.e., to counterbalance weight of the display unit. In alternative examples, one or more components from the display unit may be at least partially supported by the rear support hoop 116 and/or temporal connectors 118 to redistribute weight.

5.1.2 Interfacing Structure

A user interface may be partly characterised according to the design intent of where the interfacing structure is to engage with the face in-use. Some interfacing structures may be limited to engaging with regions of the user's face that protrude beyond the arc of curvature of the face engaging surface of the interfacing structure. These regions may typically include the user's forehead and cheek bones. This may result in user discomfort at localised stress points. Other facial regions may not be engaged at all by the interfacing structure or may only be engaged in a negligible manner that may thus be insufficient to increase the translation distance of the clamping pressure. These regions may typically include the sides of the user's face, or the region adjacent and surrounding the user's nose. To the extent to which there is a mismatch between the shape of the user's face and the interfacing structure, one or both may be adaptable in order for an appropriate contact or other relationship to form.

In some embodiments of the present technology, the interfacing structure can comprise a single seal forming element that overlays a portion of the nasal ridge region, the frontal bone region and each of the left and right infraorbital margin regions of the face, in-use. In some embodiments, the interfacing structure may be designed for mass manufacture. For example, the interfacing structure can be designed to comfortably fit a wide range of different face shapes and sizes.

Referring to FIG. 8, in one form of the present technology, the head-mounted display system 410 further comprises an interfacing structure 411 that provides a facial interface or face engaging portion 413 that is arranged to engage with, and be in opposing relation to, the user's face in use. The interfacing structure 411 can, in some forms, provide a cushioning function so as to improve the overall comfort for a user. The facial interface 413 can, in some forms, be arranged to at least partially block light from entering the display unit housing 422 in-use.

The interfacing structure 411 extends about a display contained by the display unit housing 422. The interfacing structure 411 may extend about the display and define a viewing opening to the display. In an example, the facial interface 413 extends around the user's eyes, and may engage (e.g., light sealing) with the user's face, e.g., along the user's nose, cheeks and/or forehead.

The positioning and stabilising structure 414 can be attached to the display unit housing 422 whereby the interfacing structure 411 of the present technology is held in the operable position on a user's face. In some alternative forms, the positioning and stabilising structure 414 can be attached to a portion of the interfacing structure 411 whereby the interfacing structure 411 of the present technology is held in the operable position on a user's face.

FIG. 15a illustrates a split front view of a further embodiment of an interfacing structure 611 in use, where the interfacing structure 611 is otherwise generally formed to be symmetrical on either side of central axis A-A. The left-hand side of central axis A-A illustrates an example of an interfacing structure 611 as it may be positioned in use to engage with the user's face generally around a periphery of a user's eyes. The right-hand side of central axis A-A illustrates an example of the user's face beneath the interfacing structure 611, showing the facial regions that may be in contact with the interfacing structure 611 in use. In broad terms, the interfacing structure 611 may be formed on regions of the epicranius 601, the user's sphenoid 603, across the outer cheek region 605 between the sphenoid 603 to the left or right zygomatic arch 607, over the zygomatic arch 607, across the inner cheek region 609 from the zygomatic arches 607 towards the alar crests 619, and on the user's nasal ridge 617 inferior to the sellion to enclose a portion of the user's face therebetween.

The interfacing structure 611 provides a substantially continuous facial interface or face engaging surface 613 around the periphery of the user's eyes, i.e., the facial interface or face engaging surface 613 is adapted to contact the user's face on regions of the epicranius, the sphenoid, across the outer cheek region between the sphenoid to the left or right zygomatic arch, over the zygomatic arch, across the inner cheek region from the zygomatic arches towards the alar crests, and on the nasal ridge inferior to the sellion to enclose the user's eyes therebetween. That is, the interfacing structure 611 provides continuous contact (e.g., at least light sealing) around the entirety of the user's eye to prevent or at least reduce the ingress of undesirable light. In this regard, the substantially continuous facial interface or face engaging surface 613 may be contoured and/or angled along its periphery to conform or closely follow the contours/facial profile of the patient's face.

In use, the interfacing structure 611 may be compressed against the user's face (e.g., via the positioning and stabilising structure), and the interfacing structure 611 is configured and arranged such that the compression force or load applied to the user's face is distributed or spread around a periphery thereof so that the load is not concentrated on a minimal number of contact points. Moreover, the interfacing structure 611 comprises varying compliance around the periphery thereof configured to allow selective distribution of the force onto the user's face. For example, the interfacing structure may include a first compliance at a first region and a second compliance at a second region, and the first region and the second region are configured around the periphery of the interfacing structure to allow selective distribution of the force onto the user's face. This arrangement allows higher levels of pressure to be spread across regions of the user's face that are more adept at absorbing the pressure, e.g., epicranius and the sphenoid.

In some forms of the present technology, a system is provided where the interfacing structure is integrally formed with the display unit housing. In some forms of the present technology, such as the embodiments shown in FIGS. 15b, 16a to 16c, 18, 19, and 20a to 20d, a system is provided where the interfacing structure is formed as a separate removable component that is configured to integrate with, and be retained by, the display unit housing so as to engage with, and be in opposing relation to, the user's face in use. That is, the display unit housing may provide a common frame structured and arranged to removably retain each of a number of interfacing structures (each corresponding to a different size and/or shape range and/or material type) to allow variants of interfacing structures to be exchanged based on fit or user preference.

Referring to FIG. 8, when the interfacing structure 411 is formed as a removable component, a number of interfacing structure 411 embodiments can be formed, with each embodiment being configured to correspond to a different size and/or shape range. For example, the head-mounted display system 410 may comprise one form of an interfacing structure 411 suitable for a large sized head. This may not be suitable for users with smaller sized heads and may thus result in reduced comfort and performance. An interfacing structure 411 suitable for a small sized head may not be suitable for a large sized head and may likewise result in reduced comfort and performance for the user. Thus, a removable interfacing structure 411 may be advantageous in that it enables a user to customise the head-mounted display system 410 and to select the interfacing structure 411 that best fits their individual facial anthropomorphic features. In some further embodiments, a user can have their facial anthropomorphic features measured in order to custom design and form a suitable interfacing structure 411. A removable interfacing structure 411 also allows for applications, such as medical use, where the structure 411 may be disposable or may allow separate cleaning to comply with surgical procedures.

Referring to FIG. 15b, when the interfacing structure 611 is formed as a removable component, it can be formed to comprise a chassis 621 of rigid, or semi-rigid, material that is configured to facilitate engagement with the display unit housing 622. For example, in some embodiments, the chassis 621 can be formed of a plastic material. The chassis 621 can comprise one or more engagement elements 623 around the periphery thereof that are configured to detachably mate with a corresponding element configured on the display unit housing 622. Suitable engagement elements may include one or more of a clip, fastener, magnet, or Velcro provided that the number and location of the engagement elements utilised in any given embodiments are capable of ensuring that the chassis 621 and display unit housing 622 are relatively fixed to one another without allowing significant slippage to occur therebetween. For example, as in FIGS. 15*a* and 15*b*, the engagement elements 623 can be two clips that are spaced laterally from one another so as to locate on symmetrically opposing sides of the central axis A-A. Similar engagement elements 723 are shown in FIGS. 16*a* to 16*c*. In some further embodiments, a series of indents, can be formed at the in-use lower portion of the chassis in addition to the clips that are formed at the in-use upper portion of the chassis. As one skilled in the art would appreciate, other combinations of engagement elements are also considered within the functional scope of the present technology. In some further embodiments, the display unit housing can comprise a groove that engages with the outer peripheral rim of the chassis so as to provide additional vertical support to the engagement elements and further reduce relative movement between the display unit housing and interfacing structure.

The chassis 621 acts as a base for the rest of the interfacing structure 611. In addition, the chassis 621 can provide some rigidity and necessary structure to the interface support structure 615 of the interfacing structure 611, and therethrough also to the facial interface or face engaging surfaces 613. The chassis 621 can be adhesively engaged to the support structure 615, or in some embodiments mechanically bonded to the support structure 615, with the method used to join the chassis 621 to the support structure 615 being dependent on the composition of the materials and their specific structures. The chassis 621 can be generally curved laterally across the user's face. In some embodiments, the curvature can generally correspond to a curvature of the user's face. In some embodiments, such as in FIG. 16*b*, the curvature of the chassis 721 can be relatively small, with the support structure 715 being formed to extend therefrom to bridge the distance to the user's face and thus having varying depths laterally across the user's face. In other words, the support structure 715 can extend to a greater depth in the regions adjacent the sides of the user's face, in comparison to the smaller depth formed in the region proximal the central axis A-A of the user's face. In some embodiments, the chassis 621,721,821 may advantageously remain the same size and shape, whilst the remainder of the interfacing structure 611,711,811 can be varied so as to be provide multiple modular embodiments, or custom designed modular embodiments that suit a user's individual facial anthropomorphic features.

In some embodiments, the chassis, support structure and face engaging surfaces of the interfacing structure can be integrally formed as a single component comprising varying thicknesses and finishes thereacross so as to provide the desired level of rigidity at the chassis or desired level of cushioning effect at the face engaging surfaces. For example, in some such embodiments, the interfacing structure can be formed from a singular silicone body. In alternative embodiments, the interfacing structure can be integrally formed as a single component from a foam or an elastomeric material.

In some embodiments, the chassis 721 can be formed as a separate component from the rest of the interfacing structure 711 which is manufactured as a singular integrally formed body (e.g., see FIGS. 16*a* to 16*c*). For example, in some embodiments, one or more regions of the facial interface or face engaging surface 713' can be formed together around the periphery of the interfacing structure 711' as an inwardly projecting flange-like rim (e.g., membrane or flap) that stems from the support structure 715' (e.g., see FIG. 17*a*). Alternatively, in some embodiments, the face engaging surface 713" can be supported by a spring-like supporting flange 725" that stems from the support structure 715" and is substantially concealed beneath the face engaging surface 713" (e.g., see FIG. 17*b*). For example, the supporting flange 725" and support structure 715" can both be formed from silicone, with the material thickness of the supporting flange 725" being thinner than that of the support structure 715" so as to provide a more compliant, yet resilient, spring-like support to the portion of the interfacing structure 711" that engages the user's face. In some embodiments, the face engaging surface 713" can be loosely overlaid over the supporting flange 725" such that each can respond independently to the compression pressure applied when interacting with a user's face in use. In some embodiments, the overlaid face engaging surface 713" can be bonded with the supporting flange 725" over which it is overlaid, whereby they effectively form a singular body that responds in unison to the compression pressure applied when interacting with a user's face in use.

The face engaging surface 713 can comprise one or more regions of silicone, or one or more layers of a textile material or foam. The one or more regions of the face engaging surface 713 can be formed to have varying thicknesses and/or varying surface finishes, whereby the resultant face engaging surface 713 can have a variable compliance therealong when compressed against a user's face in use.

Some or all of the face engaging surface 713 may be regions of (relatively) reduced friction. Where silicone is used, this may be achieved by providing a so-called frosted surface. With a region of reduced friction, the sealing surface may adhere to the user's face less than without the region of reduced friction. For example, the region of reduced friction may be provided to allow the side(s) of the user's nose to slide freely along the face engaging surface 713. Likewise, a textile or foam materials having (relatively) reduced friction outer surface finishes can be used to form part or all of the face engaging surface 713.

Some or all of the face engaging surface 713 may be regions of (relatively) high friction. Where silicone is used, this may be achieved by providing a so-called polished surface. With a region of high friction, the sealing surface may adhere to the user's face better than without the region of reduced friction, thus reducing the slippage of the display unit housing 722. Likewise, a textile or foam materials having (relatively) high friction outer surface finishes can be used to form part or all of the face engaging surface 713.

In some embodiments, one or more distinct regions of the face engaging surface 713 can be formed to have different finishes or different levels of friction so as to optimise the grip and retention performance of the face engaging surface 713 whilst also improving user comfort (e.g., one or more regions with frosted surface and one or more regions of polished surface). In some embodiments, a combination of two or more materials can be used to form the overall face engaging surface 713, where different materials can be used in different regions. This may improve retention of the display unit housing 722 whilst also improving user comfort.

In some embodiments, the heat wicking performance of the face engaging surface can be improved by using a silicone material whereby the user comfort may be improved.

Referring to FIGS. 18 and 19, the support structure 715 can be formed to comprise one or more distinct regions 715', 715" having varying thicknesses and/or being further supported by the addition of stiffening ribs 715'''. In some regions, the support structure can be thinner 715', or generally provide less resistance to compression, for example in the regions adjacent the user's zygomatic arch, cheek bones, and nose. In some other regions the support structure can be thicker 715", or can generally be structured to provide more resistance to compression, for example in the regions adjacent the user's forehead or sphenoid. In some embodiments, the thickness of the support structure 715 can be varied incrementally thereacross, rather than as distinct regions having a singular thickness. In some embodiments, stiffening ribs 715''' can be formed as wide regions of thicker material, whilst in other embodiments, stiffening ribs 715''' can be formed as a tie-like support from narrow and/or less compliant material.

Thinner regions of the support structure 715 can provide a more compliant, yet resilient, cushion support to the face engaging surface 713 above. For example, in some embodiments, thinner regions may be formed from silicone material have a thickness of 0.3-0.5 mm. By contrast, thicker regions of the support structure 715 can provide a less compliant, more resistant, and relatively rigid structural support to the face engaging surface 713 above. For example, in some embodiments, thicker regions may be formed from silicone material have a thickness of 1.5-2 mm. By forming a support structure 715 from a plurality of distinct thicker and thinner regions, or a blend of incrementally varying thicknesses, the load resistance of the support structure 715 may be optimised. The overall compliance of the interfacing structure 711 at any given point around the periphery of the user's face in use, may thus be a result of the properties of the chassis 721, support structure 715 and face engaging surface 713.

In some embodiments, it may be advantageous for the interfacing structure 711 to balance compliance against resilience and rigidity, so as to spread the resistance force applied by the interfacing structure 711 when compressed against a user's face in use. In addition, it may be advantageous to provide an interfacing structure 711 where the translation distance of the compression pressure, applied when interacting with a user's face in use, is spread across regions of the users face that are more adept at absorbing the pressure, rather than allowing the load to be focused locally on a minimal number of contact points. Thus, the overall compliance of the disclosed interfacing structure 711, can be formed to allow for the face engaging surface 713 to adaptably mould to the user's face. This may advantageously reduce regions of the face engaging surface 713 that are spaced from the user's face, or that do not sufficiently interact with the user's face so as to contribute to the assist with spreading the pressure. For example, with reference to FIG. 15a, regions of the user's epicranius 601 and sphenoid 603 below the temples may be capable of bearing higher levels of pressure, whilst regions on either side of the user's zygomatic arch 607 may be capable of bearing lower levels of pressure. In addition, it may be preferable for some regions to only receive relatively light or substantially no pressure, such as on the zygomatic arch 607 itself, or on the user's nasal ridge 617. In regions that can only bear light or substantially no pressure, it may be advantageous for the face engaging surface 713 to be highly compliant so as to interact gently thereat whereby the ingress of undesirable light is reduced or prevented.

In some further embodiments, the interfacing structure 811 can comprise a discrete chassis 821, support structure 815 and face engaging surface 813 (e.g., see FIGS. 20a to 20d). For example, the face engaging surface 813' can be formed as a foam cushion 829' that is attached directly to an upper portion 827 of the support structure 815 (e.g., see FIG. 21a). The upper portion 827 of the support structure 815 can be formed to extend inwardly from the periphery of the support structure 815 wall as a spring-like ledge that functions to support the face engaging surface 813' from buckling in use.

In some alternative embodiments, the face engaging surface 813" covers a foam cushion 829" that is attached directly to an upper portion 827 of the support structure 815 (e.g., see FIG. 21b) such that the foam cushion 829" is underneath the face engaging surface 813". For example, a silicone or textile material face engaging surface 813" can be supported loosely, or at least partially bonded, over a foam cushion 829". In another form, the face engaging surface 813" may extend at least partially over the foam cushion 829" or beyond the foam cushion 829". The foam cushion 829" can function as a spring-like, compliant, yet somewhat resilient, cushion support that is concealed beneath the face engaging surface 813". In such embodiments, the material that contacts the user's face can be one that is more easily cleaned than foam, and may thus improve the hygiene of the interfacing structure 811.

The foam cushion (e.g., foam cushion 829', foam cushion 829") may, for example, be made from any suitable material such as one or more of the following example materials: Polyethylene, PU, EVA. In some cases, the foam cushion may be a semi-open closed cell foam, such as one made of polyurethane. The cushion of semi-open cell foam may have a limited permeability, for example, a permeability characteristic in a range of about 0 to 20 litres per minute. A transverse cross-section through the foam cushion may take a substantially triangular or pear-like shape with a sealing face that follows the contours of a user's face. The foam used may define the physical properties of the overall interfacing structure 811. The foam may allow the interfacing structure 811 to accommodate major variations, and to successfully conform to the contours of the user's face. The compliant nature of the foam cushion may also provide micro-adjustment and may thus form a comfortable interfacing layer when interacting with the user's skin.

In another example of the present technology, the foam cushion 829" can be fixed (either removably or permanently) to the support structure 815, or in some further embodiments, directly to the chassis 821. The foam cushion 829" can be configured to have a varied rigidity in different regions therealong in order to increase comfort for the user.

In certain forms of the present technology, the face engaging surface of the interfacing structure can comprise a cushion formed from semi-compressible materials such as a dense foam (e.g., polyurethane foam or viscoelastic foam) or other similar materials such as rubber that may be formed to be generally resiliently compressible, whilst simultaneously being somewhat resistant to the compression. The resulting semi-rigid, yet resiliently compressible, cushion may additionally be formed to maintain a curvature with a relatively small radius, thereby providing a "one-size-fits-most" user interface cushion.

In some forms of the present technology, the interfacing structure can be adjustably sized across a range of widths and/or shapes so as to be customisable to the facial anthropomorphic features of the user. For example, with reference to FIG. 22, the interfacing structure 911 can comprise two adjustable face engaging surfaces 913', each being located at a respective one of the left and right hand sides of the interfacing structure 911. Each of the adjustable face engaging surfaces 913' can be slidably moved relative to each other, and movable relative to a substantially rigid chassis 920. When the adjustable face engaging surfaces 913' are slidably moved away from one another the overall width W of the interfacing structure 911 can be increased. When the adjustable face engaging surfaces 913' are slidably moved towards one another the overall width W of the interfacing structure 911 can be decreased. In some embodiments, the interfacing structure 911 can further comprise two static face engaging surfaces 913", one bridging across the users nose region, and one bridging across the user's forehead region. Each of the two static face engaging surfaces 913" can be formed to have a length that is sufficient, whereby the respective distal ends 914" of the two static face engaging surfaces 913" overlap with the respective distal ends 914' of the adjustable face engaging surfaces 913'. In this way, the adjustable and static face engaging surfaces 913', 913" can together form a functionally continuous interfacing structure 911 around the user's eyes. The resulting interfacing structure 911 may provide an improved fit for the user's individual facial anthropomorphic features which may advantageously improve the ability of the interfacing structure 911 to increase the translation distance of the clamping pressure applied to a user's face when tightening the positioning and stabilising structure. This may also improve the comfort of the interfacing structure 911, and may reduce instances of localised pressure points. In some further embodiments, the static face engaging surfaces 913" can be formed to have a shape and length whereby they can also shield the interior of the display unit housing 922 from the ingress of undesirable light. In some further embodiments, the static face engaging surfaces 913" can be formed to have a shape and length whereby an air gap is formed between the static face engaging surfaces 913" and the adjustable face engaging surfaces 913'. This may advantageously improve the breathability and comfort of the head-mounted display system 910.

In some embodiments, the adjustable face engaging surfaces 913' can be moved relative to the chassis 920 or display unit housing 922 by a corresponding adjustment of the relative position of the ocular lenses 923 within the display unit housing 922. For example, with reference to FIGS. 23a and 23b, the relative position of the axis D-D, E-E through the ocular lenses 923 of the display unit housing 922 may be adjustable. In some embodiments, the adjustment can be made by moving a slidable tab that projects outwardly from the display unit housing 922. As the spacing between a user's eyes may be proportional to the width of the user's head, an adjustment of the relative position of the ocular lenses 923 may thus also provide a suitable adjustment to the width of the interfacing structure 911. For example, the relative position of the axis D-D, E-E through the ocular lenses 923 can be moved from a wider width XX (FIG. 23a) to a narrower width YY (FIG. 23b), thus also reducing the overall width of the face engaging surfaces 913' by a proportionally corresponding distance, from a wider width XX' (FIG. 23a) to a narrower width YY' (FIG. 23b). Likewise, the ocular lenses 923 can be moved from a narrower width YY (FIG. 23b) to a wider width XX (FIG. 23a), thus increasing the overall width of the face engaging surfaces 913' by a proportionally corresponding distance, from a narrower width YY' (FIG. 23b) to a wider width XX' (FIG. 23a). In some embodiments, the face engaging surfaces around the nasal ledge 931 can also be adjustably moved by a movement of the relative position of the axis D-D, E-E through the ocular lenses. For example, the nasal ledge 931 can be adjustably narrowed and positioned into the space between the ocular lenses in the display unit housing 922 when the interfacing structure 911 is moved into a narrower configuration (e.g., FIG. 23b), or adjustably pulled wider and removed from the space between the ocular lenses in the display unit housing 922 when the interfacing structure 911 is moved into a wider configuration (e.g., FIG. 23a).

In some alternative embodiments, the adjustable face engaging surfaces can be moved relative to the chassis by a uniquely configured adjustment mechanism, such as a slidable tab or rack-and-pinion style adjustment mechanism.

The sides of the nose, including above the nasal bones, proximal to the frontal process of the maxilla, and lateral cartilage can be highly variable in profile between users. In addition, the nasal bridge may be particularly sensitive when a force is applied thereupon by an interfacing structure. Furthermore, it may be important to avoid occlusion of a user's air passageway in use. The interfacing structure can thus be formed to avoid application of a compressive pressure against the nasal region. With reference to FIGS. 15a and 15b, the chassis 621 comprises a nasal ledge 631 that effectively leaves a gap in the otherwise substantially continuous face engaging surfaces 613. The nasal ledge 631 can be formed to be substantially wider and deeper than a user's nose so as to avoid one or more of the potential problems identified above. In some further embodiments, the nasal ledge 631 can be generally saddle-shaped. The nasal ledge 631 can be formed as a continuation of the rest of the face engaging surfaces 613, or in some embodiments, the nasal ledge 631 can be formed as a discrete section of the face engaging surfaces 613. In embodiments where the nasal ledge 631 is a discrete section, the nasal ledge 631 can be formed to be removable. This may advantageously improve the ease with which the nasal ledge 631 is cleaned. Exemplary nasal ledges 731, 831 are also shown in FIGS. 16a to 16c and FIGS. 20a to 20d.

For example, in some embodiments, the face engaging surfaces 1013 of the nasal ledge 1031 provided to the chassis 1021 can be formed from a pliable material that is able to easily elastically bend inwards, like a flap 1033, so as to accommodate the user's nose (e.g., see FIG. 24). The flaps 1033 can rest on the sides of the user's nose bridge in use. In some embodiments, the face engaging surfaces 613 of the nasal ledge 631 can be formed as a hood of loose material that allows the user's nose to enter therein without applying any substantial resistance force. Alternatively, in some embodiments, the face engaging surfaces 613 of the nasal ledge 631 can be formed from a section of highly stretchable and depressible material, such as one or more of a textile or a foam.

In general, the interfacing structure in accordance with the present technology can be constructed from one or more materials such as silicone, a textile material or foam. For example, in certain forms of the present technology, the interfacing structure can comprise a layer of visco-elastic polyurethane foam. In a further example, in certain forms of the present technology, the interfacing structure can comprise a layer of liquid silicone rubber (LSR) that is over-moulded onto a polycarbonate or nylon chassis.

In certain forms of the present technology, the interfacing structure may advantageously be constructed from a biocompatible material, e.g., silicone rubber.

In some forms of the present technology, one or more portions of the interfacing structure can be formed to be substantially opaque. In some further forms of the present technology, one or more portions of the interfacing structure can be coloured matt black. This may advantageous in reducing the ingress of undesired light through the interfacing structure itself.

It should be understood that material selection may affect the compressibility, compliance and/or resilience properties of the interfacing structure. For example, different foams with different densities will have correspondingly different compressibility characteristics. Further, different silicone materials with differing thicknesses or flexibility will have different compressibility characteristics.

In certain forms of the present technology, the interfacing structure can be constructed from a biocompatible material, e.g., silicone rubber. In some further forms, the face engaging surface of the interfacing structure can be removable. For example, the face engaging surface can be a removable single-use, or washable cover.

The interfacing structure may have advantages in one or more forms of the present technology. For example, in addition to the advantages described above, the human facial structure may include variations from person to person that provide challenges when designing a face engaging surface that can adapt for use with many facial variations. The variations may include different shapes of the facial structure (e.g., differently shaped noses and/or differently curved cheeks) and/or different tissue content (e.g., more or less fatty tissue). These variations may result in an interfacing structure that works very well for one person but poorly for another. Also, perceived comfort may vary from person to person independent of facial structure.

In some forms of the present technology, the interfacing structure can further comprise one or more forehead interfacing structures. The forehead interfacing structures can be adapted to engage with the user's forehead above the display unit housing. The forehead interfacing structures can also be integrated with the positioning and stabilising structure, or as a standalone region of the interfacing structure.

Medical Applications

The positioning and stabilising structure and/or interfacing structure can be adapted to comprise biocompatible materials, as in-use, multiple components of the positioning and stabilising structure and interfacing structure may contact, e.g., the skin, of the user. Designing the positioning and stabilising structure and interfacing structure to comprise such materials aims to protect users from potential biological risks arising from the use of the structure.

5.1.2.1 Material Biocompatibility

Biocompatible materials are considered to be materials that undergo a full evaluation of their biological responses, relevant to their safety in use, according to ISO 10993-1 standard. The evaluation considers the nature and duration of anticipated contact with human tissues when in-use. In some forms of the present technology, the materials utilised in the positioning and stabilising structure and interfacing structure may undergo at least some of the following biocompatibility tests:

Cytotoxicity—Elution Test (MeM Extract): ANSI/AAMI/ISO 10993-5
Skin Sensitisation: ISO 10993-10
Irritation: ISO 10993-10
Genotoxicity—Bacterial Mutagenicity Test: ISO 10993-3
Implantation: ISO 10993-6

5.1.2.2 Cleaning

In some forms, the positioning and stabilising structure and the interfacing structure are designed to be used by a single user, and cleaned in a home of the user, e.g., washed in soapy water, without requiring specialised equipment for disinfection and sterilisation.

In some other forms, the components of the positioning and stabilising structure and interfacing structure are used in labs, clinics and hospitals wherein a single head-mounted display system may be reused on multiple persons or used during medical procedures. In each of the labs, clinics and hospitals the head-mounted display systems, or relevant components thereof, can be reprocessed and be exposed to, for example, processes of thermal disinfection, chemical disinfection and sterilisation. As such, the design of the positioning and stabilising structure and interfacing structure may need to be validated for disinfection and sterilisation of the structure in accordance with ISO17664.

Materials may be chosen to withstand reprocessing. For example, robust materials may be used in the positioning and stabilising structure to withstand exposure to high level disinfection solutions and agitation with a brush. Further, some components of the positioning and stabilising structure are separable, and in-use may be disconnected to improve the reprocessing efficacy.

In a further example, the contacting portion of the forehead support connector 24 will, in use, be in contact with the user's head and therefor may become dirty. The contacting portion may be designed to be removed from the forehead support connector 24, to provide the ability to remove it for cleaning and/or replacement. It may be desirable to wash the contacting portion while not getting the positioning and stabilising structure wet. This may be facilitated by allowing these components to disconnect for such a purpose. In a further example, the rear support hoop can be in contact with the user's hair or skin when worn. The rear support hoop is therefore preferably made from a material that is easily cleaned and further, designed to be removed from the positioning and stabilising structure for independent cleaning.

5.1.3 Materials

The surface of the interfacing structure or positioning and stabilising structure that engages and interacts with the user's head can be formed so as to have a shape and material properties that assist with the reduction of point loads and pressure induced markings and/or hot spots on the user's head. With reference to FIG. 30, in some forms the resulting interfacing surface 1110 of the engaging structure 1108 can distribute the pressure load P across a larger surface area of the user's head 1120. The shape and material properties of the engaging structure 1108, and in particular the interfacing surface 1110, may thus provide improved comfort for a user.

Similarly, in some forms the geometry of the edges of the interfacing surfaces can be shaped to follow a contour that assists, in conjunction with the overall shape and material properties of the interfacing surface, with matching the contour of the user's head and thus distributing the pressure load more efficiently thereby improving the comfort for the user. For example, the interfacing surfaces 1110 may have a curved contoured edge 1112 that assists with spreading the contact load over a greater surface area, thereby reducing the likelihood of a point load forming pressure induced markings and/or hot spots on the user's head (e.g., FIGS. 30 and 31).

In general, an increase in surface area can be correlated with a decrease in pressure and discomfort experienced by a user, as the force can be distributed across a larger contact area. However, the total surface area of the interfacing surface needs to be optimised in a trade-off against the overall size, bulk and weight of the interfacing structure which may have detrimental impacts on the user comfort when wearing the head-mounted display. For example, if the interfacing surface is too large, a user may experience claustrophobia or experience muscle pain in their neck and shoulders due to the increased weight.

Furthermore, in some forms it may be important that the interfacing surface provides a perception of comfort to the user based on the general appearance and feel of the outer surface when touched, or when worn during use. For example, by reducing sharp edges, even those that do not contact the user, the user's perception of comfort may be advantageously improved. In a further example, it may be advantageous to form the interfacing surface outer surface from materials that are not scratchy, materials that are cool or that are able to wick moisture (e.g., sweat), or materials that do not irritate the user's skin and/or materials that are breathable.

The material properties of the interfacing surface of the interfacing structure or positioning and stabilising structure can thus be influential on the overall comfort for the user.

For example, in some forms, it may be advantageous to have an engaging structure 1108, such as the straps of the positioning and stabilising structure, that is able to flexibly twist T so as to comply with the contours of a user's head (e.g., FIG. 31). The compliance and ability to conform the interfacing surface to the user's head can increase the total contact surface area, thereby assisting with the distribution of the tightening force across a larger contact area and reducing uncomfortable pressure points.

In other forms, the engaging structure can comprise a compliant material such as foam or textile material, where unlike thermoplastic materials, the interfacing surface can more readily adapt and form around the curves and contours of the user's head. For example, such material properties may be advantageous for portions of the positioning and stabilising structure 1114 that cross around an upper portion of the user's head 1122 (e.g., FIG. 32). The portions 1116 of the positioning and stabilising structure 1114 that, when not in use, would not be sufficiently curved so as to engage with the upper portion of the user's head 1122 can thus be resiliently bent without damaging the positioning and stabilising structure 1114 in order to conform and assist with distributing the pressure load across the user's head.

In some forms the engaging structure can be elastically resilient, whereby the force distribution can be more evenly spread across the overall interfacing surface. For example, with reference to FIG. 33, when the strap of the positioning and stabilising structure 1134 are stretched apart under load L, the strain force can be substantially evenly spread across the length of the strap. Consequently, the elasticity of the strap has a relatively flat force (y-axis)-displacement (x-axis) profile, thereby illustrating that the force does not change much when the engaging structure is extended (or displaced).

In some other forms, discrete regions, segments, or portions of the interfacing structure or positioning and stabilising structure can be formed to exhibit increased compliance when compared with the rest of the positioning and stabilising structure. For example, with reference to FIG. 34, regions 1144 of the interfacing structure 1142 that are located adjacent more sensitive regions of the user's face (such as the bridge of the nose), or that are located adjacent facial projections 1140 such as a cheek bone, can comprise a viscoelastic foam, or similar materials that can allow for increased local compliance.

In some forms, foam used in the interfacing structure or positioning and stabilising structure can be formed to have a density in the range of approximately 55 kg/m$^3$. In other forms, the density can be in the range of approximately 50-55 kg/m$^3$. In other forms, the foam density can be in the range of approximately 55-60 kg/m$^3$. In other forms, the foam density can be in the range of approximately 45-65 kg/m$^3$. The density can also be higher or lower depending on exact requirements of the foam. For example, the foam density can vary across the interfacing structure or positioning and stabilising structure, so as to have localised regions of greater compliance, or localised regions of greater stiffness.

5.1.4 Anthropometric Data Models

The geometry of the head-mounted display system can be designed with reference to anthropometric data models. The anthropometric data models can be developed from a collection of three-dimensional head shapes. The anthropometric data models can be used to represent sizing and clustering based on head shape variation as shown in FIGS. 25a to 25b (e.g., target head geometry with top three components of variation being shown in FIG. 25b), sizing based on nominated facial zones as shown in FIGS. 26a to 26b (e.g., shape variation in the eye/nose region with the top four components of variation being shown in the example of FIG. 26b), and sizing based on anthropometrical landmarks as shown in FIGS. 27a to 27b (e.g., correlation between 2D landmarks such as relationship between eye location and face width at the eye socket as shown in FIG. 27b).

For example, anthropometric data models can be used to determine sizing requirements for the interfacing structure. These requirements can consider head shape variations and facial feature variations based on anthropometrical landmarks. Further, relationships between facial landmarks may be derived from the data; for example, a relationship between eye location and face width. Advantageously, the interfacing structure can be configured to accommodate these variations.

In a further example, anthropometric data models can be used in conjunction with software applications, e.g., mobile phone applications, to compare three-dimensional scans of a user's head and identify their head size. In this example, a user may operate the camera of their mobile phone to produce the three-dimensional scan. The software application may be used inform the user of their head size compared to the anthropometric data models and recommend the appropriate size, e.g., size of positioning and stabilising structure to provide the best fit. For example, a medium size may be suggested out of a given plurality of size options, e.g., small, medium or large. Alternatively, a custom sized positioning and stabilising structure can be made according to the three-dimensional scan for a user according to their individual facial landmarks.

The above-described head-mounted display systems provide alternative examples of the present technology structured and arranged to enhance comfort, fit range, usability, system architecture, use in a medical environment, and manufacturability.

The head-mounted display systems according to examples of the present technology provide enhanced comfort with minimised facial markings and pain from prolonged use. For example, comfort may be achieved by providing universal load distribution in which load is optimised on all contact surfaces by avoiding or minimising load on areas prone to discomfort and redistributing this load to areas able to comfortably bare the load, e.g., avoid or minimise load on the nasal bridge and sides of the nose and apply or redistribute this load to the top and/or rear of the head. Also, comfort may be achieved by providing regional load distribution in which load is evenly distributed by design and material selection in regions of the face where contact is unavoidable, e.g., contact points around the eyes may comprise compliant materials that evenly distribute load and avoid pain points/facial marking. In addition, comfort may be achieved by minimising weight as less weight in the overall system leads to less tension to position and maintain the system in the right configuration. In this regard, the head-mounted display systems according to examples of the present technology provide a minimalist design (e.g., low profile) to achieve fit range, comfort, and correct configuration, e.g., componentry optimised to minimize size and number of components to achieve function and use of robust and lightweight materials.

The head-mounted display systems according to examples of the present technology provide enhanced fit range or universal fit without trading off comfort, usability and cost. For example, fit range may be achieved by providing adjustability with geometry and material selection and adjustment mechanism. The components of the positioning and stabilising structure are designed and materials may be selected to provide desired force versus displacement, e.g., straps may stretch to a desired length under a predetermined force. The adjustment mechanism provides simplicity as sizing of the positioning and stabilising structure and associated straps may be manually adjusted and set, and componentry can be minimised while maximising ease of use, e.g., single handed adjustment of straps and alternative use of magnetic clips (e.g., easy removal without losing strap settings) for connection. Also, the adjustment mechanism provides minimal size and weight which reduces the bulk of adjustment mechanisms with optimal materials and minimal components. Further, enhanced fit range may be achieved by anthropometrics in which adjustment range may be designed to fit the optimal anthropometric range of the desired market.

The head-mounted display systems according to examples of the present technology provide enhanced usability with low-touch simple set up solutions and low dexterity threshold solutions. For example, low-touch set up may be achieved with self-adjusting solutions including stretchable materials or simple mechanical actuation where only a few minor adjustments may be necessary for correct fit. Also, the system may include adjust and lock solutions to facilitate usability (i.e., set and forget), e.g., mechanisms to guide adjustment (e.g., magnets) and locking mechanisms to set adjustment (e.g., clips). Further, the system provides ease of use so that it is capable of adjustment when worn by a user with low-dexterity and/or minimal vision.

The head-mounted display systems according to examples of the present technology provide enhanced system architecture which optimises componentry location such that it minimises cost while maximising comfort, fit range and usability. For example, the system may provide enhanced weight distribution in which electrical and/or mechanical components are positioned in ideal locations from a comfort perspective. Also, the system may comprise modularity such that components may be selected or upgraded based on user preference, e.g., electrical component, face contacting cushions, straps, and/or ear buds may be selected based on preference.

The head-mounted display systems according to examples of the present technology enhance use in a medical environment. For example, the system may be biocompatible and/or cleanable with materials selected that are cleanable for re-use in a medical environment and/or pass biocompatibility requirements.

The head-mounted display systems according to examples of the present technology enhance manufacturability by providing mass producible solutions at low cost while maintaining high quality and functionality.

As noted above, the present technology may find particular application in head-mounted display systems in the form of virtual reality (VR) display apparatus and/or augmented reality (AR) display apparatus.

As shown in FIG. 35, an exemplary VR display apparatus 3000 in accordance with one aspect of the present technology comprises the following functional aspects: a display unit 3100, a display housing 3200, and a positioning and stabilizing structure 3500. In some forms, a functional aspect may provide one or more physical components. In some forms, one or more physical components may provide one or more functional aspects. In use, the display unit 3100 is arranged to be positioned proximate and anterior to the user's eyes, so as to allow the user to view the display unit 3100.

In some examples, the display unit 3100 may include a display screen 3104, a display housing 3200, an interfacing structure 3300, and/or an optical lens 3400. These components may be integrally formed in a single display unit 3100, or they may be separable and selectively connected by the user to form the display unit 3100. Additionally, the display screen 3104, the display housing 3200, the interfacing structure 3300, and/or the optical lens 3400 may be included in the display apparatus 3000, but may not be part of the display unit 3100.

In an example, the display screen or display 3104 may be configured to selectively output computer generated images that are visible to the user in an operational position. In some forms, the display screen 3104 is an electronic display. The display screen 3104 may be a liquid crystal display (LCD), or a light emitting diode (LED) screen.

In some forms, the display housing 3200 provides a support structure for the display screen 3104, in order to maintain a position of at least some of the components of the display screen 3104 relative to one another, and may additionally protect the display screen 3104 and/or other components of the display unit 3100. The display housing 3200 may be constructed from a material suitable to provide protection from impact forces to the display screen 3104. The display housing 3200 may also contact the user's face, and may be constructed from a biocompatible material suitable for limiting irritation to the user.

In some forms, the interfacing structure 3300 may extend at least partially around the display housing 3200, and may form a viewing opening. The viewing opening may at least partially receive the user's face in use. Specifically, the user's eyes may be received within the viewing opening formed by the interfacing structure 3300.

In some forms, the display apparatus 3000 may include a light shield that may be constructed from an opaque material and can block ambient light from reaching the user's eyes. The light shield may be part of the interfacing structure 3300, or may be a separate element.

In an example, at least one lens 3400 may be disposed between the user's eyes and the display screen 3104. The user may view an image provided by the display screen 3104 through the lens 3400. The at least one lens 3400 may assist in spacing the display screen 3104 away from the user's face to limit eye strain. The at least one lens 3400 may also assist in better observing the image being displayed by the display screen 3104. In some forms, the at least one lens includes a first lens configured to be aligned with the user's left eye in the operational position and a second lens configured to be aligned with the user's right eye in the operational position. In some forms, the lenses 3400 are Fresnel lenses. In some forms, the display comprises a binocular display partitioned into a first section and a second section, the first section aligned with the first lens and the second section aligned with the second lens.

In an example, the display apparatus 3000 includes a control system 7000 (see FIG. 36) that assists in controlling the output received by the user. Specifically, the control system 7000 can control visual output from the display screen 3104.

In some forms, the control system 7000 may include sensors 7002 that monitor different parameters or values (e.g., in the physical environment), and communicates measured parameters to a processor 7004. The output received by the user may be affected by the measured parameters. For example, the processor 7004 is configured to change the computer generated images output by the display based on the measured value.

In some forms, the sensors 7002 may include an orientation sensor that can sense the orientation of the user's body, at least one camera that can be positioned to view the physical environment of the user (e.g., in order to determine orientation), and/or an eye sensor that can track movement of the user's eyes to determine which direction at least one of the user's eyes are looking.

In some forms, the processor 7004 may comprise a computer or smart phone.

In some forms, the control system 7000 is integrated into the display unit 3100. In other forms, the control system 7000 is housed in a control system support 7060 that is separate from, but connected to (e.g., electrically connected to) the display unit 3100.

In some forms of the display apparatus 3000 include a controller 3600 that can be engagable by the user in order to provide user input to the virtual environment and/or to control the operation of the display apparatus 3000. The controller 3600 can be connected to the display unit 3100, and provide the user the ability to interact with virtual objects output to the user from the display unit 3100. For example, the controller 3600 may have at least one button 3602 (See FIG. 35) selectively engageable by a user's finger, the controller 3600 being in communication with the processor 7004 and configured to send a signal to the processor when the at least one button 3602 is engaged, the processor configured to change the computer generated images output by the display 3104 based on the signal.

FIG. 37 shows an exemplary AR display apparatus 3000 in accordance with one aspect of the present technology comprising the following functional aspects: a display unit 3100, a display housing 3200, and a positioning and stabilizing structure 3500.

In some examples, the display unit 3100 may include a display screen or display 3104 supported by the display housing 3200. The display screen 3104 is configured to selectively output one or more computer generated images observable by a user. The display screen 3104 may include at least one optical lens 3400 constructed from a transparent or translucent material configured to allow a user to observe their physical environment while observing the computer generated image. For example, the display screen 3104 may be glass, so the user can see through the display screen 3104. This may be particularly beneficial in AR applications, so that the user can continue to see the physical environment.

In some forms, the at least one lens 3400 includes a first lens configured to be aligned with the user's left eye in the operational position and a second lens configured to be aligned with the user's right eye in the operational position, e.g., see FIG. 37.

In an example, the AR display apparatus 3000 includes a control system 7000 (see FIG. 36) that assists in controlling the output received by the user. Specifically, the control system 7000 can control visual output from the display screen 3104. In some forms, the control system 7000 may include sensors 7002 that monitor different parameters or values (e.g., in the physical environment), and communicates measured parameters to a processor 7004. The output received by the user may be affected by the measured parameters. For example, the processor 7004 is configured to change the computer generated images output by the display based on the measured value.

5.2 GLOSSARY

For the purposes of the present technology disclosure, in certain forms of the present technology, one or more of the following definitions may apply. In other forms of the present technology, alternative definitions may apply.

5.2.1 General

Leak: The word leak will be taken to be an unintended exposure to light. In one example, leak may occur as the result of an incomplete seal between a display unit and a user's face.

5.2.2 Materials

Closed-cell foam: Foam comprising cells that are completely encapsulated, i.e. closed cells.

Elastane: A polymer made from polyurethane.

Elastomer: A polymer that displays elastic properties. For example, silicone elastomer.

Ethylene-vinyl acetate (EVA): A copolymer of ethylene and vinyl acetate.

Foam: Any material, for example polyurethane foam or viscoelastic foam, having gas bubbles introduced during manufacture to produce a lightweight cellular form.

Neoprene: A synthetic rubber that is produced by polymerization of chloroprene. Neoprene is used in trade products: Breath-O-Prene.

Nylon: A synthetic polyamide that has elastic properties and can be used, for example, to form fibres/filaments for use in textiles.

Open-cell foam: Foam comprising cells, i.e. gas bubbles that aren't completely encapsulated, i.e. open cells.

Polycarbonate: a typically transparent thermoplastic polymer of Bisphenol-A Carbonate.

Polyethylene: A thermoplastic that is resistant to chemicals and moisture.

Polyurethane (PU): A plastic material made by copolymerizing an isocyanate and a polyhydric alcohol and, for example, can take the form of foam (polyurethane foam) and rubber (polyurethane rubber).

Semi-open foam: Foam comprising a combination of closed and open (encapsulated) cells.

Silicone or Silicone Elastomer: A synthetic rubber. In this specification, a reference to silicone is a reference to liquid silicone rubber (LSR) or a compression moulded silicone rubber (CMSR). One form of commercially available LSR is SILASTIC (included in the range of products sold under this trademark), manufactured by Dow Corning. Another manufacturer of LSR is Wacker. Unless otherwise specified to the contrary, an exemplary form of LSR has a Shore A (or Type A) indentation hardness in the range of about 35 to about 45 as measured using ASTM D2240.

Spacer Fabric: A composite construction comprising two outer textile substrates joined together and kept apart by an intermediate layer of monofilaments.

Spandex: An elastic fibre or fabric, primarily comprising polyurethane. Spandex is used in trade products: Lycra.

Thermoplastic Elastomer (TPE): Are generally low modulus, flexible materials that can be stretched at room temperature with an ability to return to their approximate original length when stress is released. Trade products that use TPE include: Hytrel®, Dynaflex™, Medalist® MD-115.

Thermoplastic Polyurethane (TPU): A thermoplastic elastomer with a high durability and flexibility.

5.2.3 Mechanical Properties

Resilience: Ability of a material to absorb energy when deformed elastically and to release the energy upon unloading.

Resilient: Will release substantially all of the energy when unloaded. Includes e.g. certain silicones, and thermoplastic elastomers.

Hardness: The ability of a material per se to resist deformation (e.g. described by a Young's Modulus, or an indentation hardness scale measured on a standardised sample size).

'Soft' materials may include silicone or thermo-plastic elastomer (TPE), and may, e.g. readily deform under finger pressure.

'Hard' materials may include polycarbonate, polypropylene, steel or aluminium, and may not e.g. readily deform under finger pressure.

Stiffness (or rigidity) of a structure or component: The ability of the structure or component to resist deformation in response to an applied load. The load may be a force or a moment, e.g. compression, tension, bending or torsion. The structure or component may offer different resistances in different directions.

Floppy structure or component: A structure or component that will change shape, e.g. bend, when caused to support its own weight, within a relatively short period of time such as 1 second.

Rigid structure or component: A structure or component that will not substantially change shape when subject to the loads typically encountered in use.

As an example, an I-beam may comprise a different bending stiffness (resistance to a bending load) in a first direction in comparison to a second, orthogonal direction. In another example, a structure or component may be floppy in a first direction and rigid in a second direction.

5.2.4 User Interface

Frame: Frame will be taken to mean the display housing unit that bears the load of tension between two or more points of connection with a hoop.

Interpupillary Distance: The distance between the centres of the pupils of the eyes.

Hoop: Hoop will be taken to mean part of a positioning and stabilizing structure designed for use on a head. For example the hoop may comprise a collection of one or more struts, ties and stiffeners configured to locate and retain a user interface in position on a user's face for holding a display unit in an operational position in front of a user's face. The hoop may be formed of a soft, flexible, elastic material such as a laminated composite of foam and fabric/textile.

Membrane: Membrane will be taken to mean a typically thin element that has, preferably, substantially no resistance to bending, but has resistance to being stretched.

Seal: May be a noun form ("a seal") which refers to a structure, or a verb form ("to seal") which refers to the effect. Two elements may be constructed and/or arranged to 'seal' or to effect 'sealing' therebetween without requiring a separate 'seal' element per se.

Shell: A shell will be taken to mean a curved, relatively thin structure having bending, tensile and compressive stiffness. For example, a curved structural wall of a display unit housing may be a shell. In some forms, a shell may be faceted.

Stiffener: A stiffener will be taken to mean a structural component designed to increase the bending resistance of another component in at least one direction.

Strut: A strut will be taken to be a structural component designed to increase the compression resistance of another component in at least one direction.

Swivel (noun): A subassembly of components configured to rotate about a common axis, preferably independently, preferably under low torque. In one form, the swivel may be constructed to rotate through an angle of at least 360 degrees. In another form, the swivel may be constructed to rotate through an angle less than 360 degrees.

Tie (noun): A structure designed to resist tension.

5.2.5 Shape of Structures

Products in accordance with the present technology may comprise one or more three-dimensional mechanical structures, for example the seal forming portion of the display unit. The three-dimensional structures may be bounded by two-dimensional surfaces. These surfaces may be distinguished using a label to describe an associated surface orientation, location, function, or some other characteristic. For example, a structure may comprise one or more of an anterior surface, a posterior surface, an interior surface and an exterior surface. In another example, a seal forming structure may comprise a face-contacting (e.g. outer) surface, and a separate non-face-contacting (e.g. underside or inner) surface. In another example, a structure may comprise a first surface and a second surface.

To facilitate describing the shape of the three-dimensional structures and the surfaces, we first consider a cross-section through a surface of the structure at a point, P. FIG. 2a to FIG. 2e illustrate examples of cross-sections at P on a surface, and the resulting plane curves. The outward normal at P points away from the surface. In some examples we describe the surface from the point of view of an imaginary small person standing upright on the surface.

5.2.5.1 Curvature in One Dimension

The curvature of a plane curve at P may be described as having a sign (e.g. positive, negative) and a magnitude (e.g. 1/radius of a circle that just touches the curve at P).

Positive curvature: If the curve at P turns towards the outward normal, the curvature at that point will be taken to be positive (if the imaginary small person leaves P they must walk uphill). See FIG. 2a (relatively large positive curvature compared to FIG. 2b) and FIG. 2b (relatively small positive curvature compared to FIG. 2a). Such curves are often referred to as concave.

Zero curvature: If the curve at P is a straight line, the curvature will be taken to be zero (if the imaginary small person leaves P, they can walk on a level, neither up nor down). See FIG. 2c.

Negative curvature: If the curve at P turns away from the outward normal, the curvature in that direction at that point will be taken to be negative (if the imaginary small person leaves the point p they must walk downhill). See FIG. 2d (relatively small negative curvature compared to FIG. 2e) and FIG. 2e (relatively large negative curvature compared to FIG. 2d). Such curves are often referred to as convex.

5.2.5.2 Curvature of Two Dimensional Surfaces

A description of the shape at a given point on a two-dimensional surface in accordance with the present technology may include multiple normal cross-sections. The multiple cross-sections may cut the surface in a plane that includes the outward normal (a "normal plane"), and each cross-section may be taken in a different direction. Each cross-section results in a plane curve with a corresponding curvature. The different curvatures at that point may have the same sign, or a different sign. Each of the curvatures at that point has a magnitude, e.g. relatively small. The plane curves in FIGS. 2a to 2e could be examples of such multiple cross-sections at a particular point.

Principal curvatures and directions: The directions of the normal planes where the curvature of the curve takes its maximum and minimum values are called the principal directions. In the examples of FIG. 2a to FIG. 2e, the maximum curvature occurs in FIG. 2a, and the minimum occurs in FIG. 2e, hence FIG. 2a and FIG. 2e are cross sections in the principal directions. The principal curvatures at P are the curvatures in the principal directions.

Region of a surface: A connected set of points on a surface. The set of points in a region may have similar characteristics, e.g. curvatures or signs.

Saddle region: A region where at each point, the principal curvatures have opposite signs, that is, one is positive, and the other is negative (depending on the direction to which the imaginary person turns, they may walk uphill or downhill). A saddle region is shown, for example, in FIG. 2h.

Dome region: A region where at each point the principal curvatures have the same sign, e.g. both positive (a "concave dome") or both negative (a "convex dome"). A dome region is shown, for example, in FIG. 2g.

Edge of a surface: A boundary or limit of a surface or region. An edge on a surface is shown, for example, in FIG. 2g.

Path: In certain forms of the present technology, 'path' will be taken to mean a path in the mathematical-topological sense, e.g. a continuous space curve from f(0) to f(1) on a surface. In certain forms of the present technology, a 'path' may be described as a route or course, including e.g. a set of points on a surface. (The path for the imaginary person is where they walk on the surface, and is analogous to a garden path). A path on surface is shown, for example, in FIG. 2g.

5.2.5.3 Space Curves

Space curves: Unlike a plane curve, a space curve does not necessarily lie in any particular plane. A space curve may be considered to be a one-dimensional piece of three-dimensional space. An imaginary person walking on a strand of the DNA helix walks along a space curve. A typical human left ear comprises a helix, which is a left-hand helix, see FIG. 2i. A typical human right ear comprises a helix, which is a right-hand helix, see FIG. 2k. FIG. 2j shows a right-hand helix. The edge of a structure, e.g. the edge of a membrane, may follow a space curve. In general, a space curve may be described by a curvature and a torsion at each point on the space curve. Torsion is a measure of how the curve turns out of a plane. Torsion has a sign and a magnitude. The torsion at a point on a space curve may be characterised with reference to the tangent, normal and binormal vectors at that point.

Binormal unit vector: The binormal unit vector is perpendicular to both the tangent vector and the principal normal vector. Its direction may be determined by a right-hand rule (see e.g. FIG. 2m), or alternatively by a left-hand rule (FIG. 2l).

Osculating plane: The plane containing the unit tangent vector and the unit principal normal vector. See FIGS. 2l and 2m.

Torsion of a space curve: The torsion at a point of a space curve is the magnitude of the rate of change of the binormal unit vector at that point. It measures how much the curve deviates from the osculating plane. A space curve which lies in a plane has zero torsion. A space curve which deviates a relatively small amount from the osculating plane will have a relatively small magnitude of torsion (e.g. a gently sloping helical path). A space curve which deviates a relatively large amount from the osculating plane will have a relatively large magnitude of torsion (e.g. a steeply sloping helical path). With reference to FIG. 2j, since T2>T1, the magnitude of the torsion near the top coils of the helix of FIG. 2j is greater than the magnitude of the torsion of the bottom coils of the helix of FIG. 2j.

With reference to the right-hand rule of FIG. 2m, a space curve turning towards the direction of the right-hand binormal may be considered as having a right-hand positive torsion (e.g. a right-hand helix as shown in FIG. 2j). A space curve turning away from the direction of the right-hand binormal may be considered as having a right-hand negative torsion (e.g. a left-hand helix).

Equivalently, and with reference to a left-hand rule (see FIG. 2l), a space curve turning towards the direction of the left-hand binormal may be considered as having a left-hand positive torsion (e.g. a left-hand helix). Hence left-hand positive is equivalent to right-hand negative.

5.2.5.4 Holes

A surface may have a one-dimensional hole, e.g. a hole bounded by a plane curve or by a space curve. Thin structures (e.g. a membrane) with a hole, may be described as having a one-dimensional hole. See for example the one-dimensional hole in the surface of structure shown in FIG. 2n, bounded by a plane curve.

A structure may have a two-dimensional hole, e.g. a hole bounded by a surface. For example, an inflatable tyre has a two-dimensional hole bounded by the interior surface of the tyre. See the two-dimensional hole through the structure shown in FIGS. 2o and 2p, bounded by a surface as shown.

5.3 OTHER REMARKS

Unless the context clearly dictates otherwise and where a range of values is provided, it is understood that each intervening value, to the tenth of the unit of the lower limit, between the upper and lower limit of that range, and any other stated or intervening value in that stated range is encompassed within the technology. The upper and lower limits of these intervening ranges, which may be independently included in the intervening ranges, are also encompassed within the technology, subject to any specifically excluded limit in the stated range. Where the stated range includes one or both of the limits, ranges excluding either or both of those included limits are also included in the technology.

Furthermore, where a value or values are stated herein as being implemented as part of the technology, it is understood that such values may be approximated, unless otherwise stated, and such values may be utilized to any suitable significant digit to the extent that a practical technical implementation may permit or require it.

Unless defined otherwise, all technical and scientific terms used herein have the same meaning as commonly understood by one of ordinary skill in the art to which this technology belongs. Although any methods and materials similar or equivalent to those described herein can also be used in the practice or testing of the present technology, a limited number of the exemplary methods and materials are described herein.

When a particular material is identified as being used to construct a component, obvious alternative materials with similar properties may be used as a substitute. Furthermore, unless specified to the contrary, any and all components herein described are understood to be capable of being manufactured and, as such, may be manufactured together or separately.

It must be noted that as used herein and in the appended claims, the singular forms "a", "an", and "the" include their plural equivalents, unless the context clearly dictates otherwise.

All publications mentioned herein are incorporated herein by reference in their entirety to disclose and describe the methods and/or materials which are the subject of those publications. The publications discussed herein are provided solely for their disclosure prior to the filing date of the present application. Nothing herein is to be construed as an admission that the present technology is not entitled to antedate such publication by virtue of prior invention. Further, the dates of publication provided may be different from the actual publication dates, which may need to be independently confirmed.

The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The subject headings used in the detailed description are included only for the ease of reference of the reader and should not be used to limit the subject matter found throughout the disclosure or the claims. The subject headings should not be used in construing the scope of the claims or the claim limitations.

Although the technology herein has been described with reference to particular examples/forms/embodiments, it is to be understood that these examples/forms/embodiments are merely illustrative of the principles and applications of the technology. In some instances, the terminology and symbols may imply specific details that are not required to practice the technology. For example, although the terms "first" and "second" may be used, unless otherwise specified, they are not intended to indicate any order but may be utilised to distinguish between distinct elements. Furthermore, although process steps in the methodologies may be described or illustrated in an order, such an ordering is not required. Those skilled in the art will recognize that such ordering may be modified and/or aspects thereof may be conducted concurrently or even synchronously.

It is therefore to be understood that numerous modifications may be made to the illustrative examples/forms/embodiments and that other arrangements may be devised without departing from the spirit and scope of the technology.

5.4 REFERENCE SIGNS LIST

| Feature Item | Number |
|---|---|
| head-mounted display system | 10 |
| user interfacing structure | 11 |
| display unit | 12 |
| positioning and stabilising structure | 14 |
| outer layer | 15 |
| rear support hoop | 16 |
| internal layer | 17 |
| temporal connector | 18 |
| posterior edge region | 20 |
| superior edge region | 21 |
| display unit housing | 22 |
| forehead support connector | 24 |
| forehead support | 25 |
| temporal arm | 26 |
| forehead contacting portion | 27 |
| anterior end | 28 |
| forehead contacting surface | 29 |
| posterior end | 30 |
| rigidiser | 32 |
| resilient component | 34 |
| face contacting surface | 35 |
| tab | 36 |
| parietal portion | 38 |
| occipital portion | 40 |
| connection strap | 42 |
| eyelet | 44 |
| forehead support strap | 48 |
| adjustment mechanism | 50 |
| forehead support hole | 52 |
| tab portion | 54 |
| head-mounted display unit system | 110 |
| display unit | 112 |
| positioning and stabilising structure | 114 |
| rear support hoop | 116 |
| temporal connector | 118 |
| posterior edge region | 120 |
| superior edge region | 121 |
| display unit housing | 122 |
| forehead support connector | 124 |
| temporal arm | 126 |
| parietal portion | 138 |
| occipital portion | 140 |
| connection straps | 142 |
| forehead support strap | 148 |
| adjustment mechanism | 150 |
| forehead support hole | 152 |
| tab portion | 154 |
| forehead support rigidiser | 156 |
| head-mounted display system | 210 |
| display unit | 212 |
| positioning and stabilising structure | 214 |
| rear support hoop | 216 |
| temporal connector | 218 |
| posterior edge region | 220 |
| display unit housing | 222 |
| parietal portion | 238 |
| occipital portion | 240 |
| connection straps | 242 |
| head-mounted display system | 310 |
| display unit | 312 |
| positioning and stabilising structure | 314 |
| rear support hoop | 316 |
| temporal connector | 318 |
| display unit housing | 322 |
| forehead support connector | 324 |
| temporal arm | 326 |
| rigidiser | 332 |
| parietal portion | 338 |
| occipital portion | 340 |
| forehead support strap | 348 |
| extended rigidiser | 358 |

-continued

| Feature Item | Number |
|---|---|
| biased extended rigidiser | 360 |
| medial adjustment mechanism | 362 |
| holes | 363 |
| temporal adjustment mechanism | 364 |
| posterior end | 368 |
| head-mounted display system | 410 |
| interfacing structure | 411 |
| facial interface | 413 |
| positioning and stabilising structure | 414 |
| display unit housing | 422 |
| head-mounted display system | 510 |
| display unit | 512 |
| positioning and stabilising structure | 514 |
| support hoop | 516 |
| connectors | 518 |
| posterior edge regions | 520 |
| display unit housing | 522 |
| forehead support connector | 524 |
| arms | 526 |
| anterior end | 528 |
| posterior end | 530 |
| frontal portion | 538 |
| plane | 539 |
| occipital portion | 540 |
| pivot point | 541 |
| connection strap | 542 |
| slots | 543 |
| displacement | 545 |
| plane | 549 |
| forehead support rigidiser | 556 |
| adjustment mechanism | 562 |
| holes | 563 |
| coupling | 564 |
| guide | 566 |
| posterior ends | 568 |
| sphenoid | 603 |
| zygomatic arch | 607 |
| head-mounted display system | 610 |
| interfacing structure | 611 |
| display unit | 612 |
| face engaging surfaces | 613 |
| positioning and stabilising structure | 614 |
| interface support structure | 615 |
| ridge | 617 |
| chassis | 621 |
| display unit housing | 622 |
| engagement elements | 623 |
| nasal ledge | 631 |
| frontal portion | 638 |
| occipital portion | 640 |
| central support structure | 662 |
| interfacing structure | 711 |
| face engaging surface | 713 |
| support structure | 715 |
| chassis | 721 |
| display unit housing | 722 |
| engagement elements | 723 |
| supporting flange | 725 |
| nasal ledge | 731 |
| interfacing structure | 811 |
| face engaging surface | 813 |
| support structure | 815 |
| chassis | 821 |
| upper portion | 827 |
| nasal ledge | 831 |
| head-mounted display system | 910 |
| interfacing structure | 911 |
| chassis | 920 |
| display unit housing | 922 |
| ocular lenses | 923 |
| nasal ledge | 931 |
| face engaging surfaces | 1013 |
| chassis | 1021 |
| nasal ledge | 1031 |
| flap | 1033 |
| interfacing structure | 711' |
| face engaging surface | 713' |
| support structure | 715' |
| face engaging surface | 813' |
| foam cushion | 829' |
| face engaging surfaces | 913' |
| interfacing structure | 711" |
| face engaging surface | 713" |
| support structure | 715" |
| face engaging surface | 813" |
| foam cushion | 829" |
| face engaging surfaces | 913" |
| engaging structure | 1108 |
| interfacing structure | 1110 |
| curved contoured edge | 1112 |
| positioning and stabilising structure | 1114 |
| portion | 1116 |
| user's head | 1120 |
| user's head | 1122 |
| positioning and stabilising structure | 1134 |
| facial projection | 1140 |
| interfacing structure | 1142 |
| region | 1144 |
| display apparatus | 3000 |
| display unit | 3100 |
| display screen | 3104 |
| display housing | 3200 |
| optical lens | 3400 |
| positioning and stabilizing structure | 3500 |
| controller | 3600 |
| button | 3602 |
| control system | 7000 |
| sensor | 7002 |
| processor | 7004 |

The invention claimed is:

1. A head-mounted display system, comprising:
an interfacing structure for a display unit constructed and arranged to be in opposing relation with a user's face,
wherein the interfacing structure comprises a substantially continuous face engaging surface adapted to contact the user's face around a periphery of the user's eyes,
wherein the interfacing structure comprises an elastomeric material, and
wherein one or more regions of the interfacing structure comprises varying thicknesses to provide varying compliance around a periphery of the interfacing structure when compressed against the user's face in use; and
a nasal ledge comprising a support structure and a pair of elastic flaps, each of the pair of elastic flaps configured to project inwardly from the support structure towards one another so that the pair of elastic flaps form a gap therebetween adapted to receive the user's nose,
wherein each of the pair of elastic flaps includes a face engaging surface adapted to contact a respective side of the user's nose,
wherein each of the pair of elastic flaps is configured and arranged to contact the respective side of the user's nose and elastically bend towards the display unit so as to rest on the respective side of the user's nose without applying substantial compressive pressure on the respective side of the user's nose.

2. The head-mounted display system according to claim 1, wherein the nasal ledge forms a hood configured and arranged to allow the user's nose to enter therein.

3. The head-mounted display system according to claim 1, wherein at least a portion of the face engaging surface of the nasal ledge is generally saddle-shaped.

4. The head-mounted display system according to claim 1, wherein the nasal ledge is configured and arranged to lessen the compressive pressure on sides of the user's nose compared to other regions around the periphery of the interfacing structure.

5. The head-mounted display system according to claim 1, wherein the elastomeric material comprises silicone.

6. The head-mounted display system according to claim 1, wherein the interfacing structure further comprises a textile material and/or foam.

7. The head-mounted display system according to claim 1, wherein the interfacing structure comprises a support structure and a flange that projects inwardly from the support structure.

8. The head-mounted display system according to claim 7, wherein one or more regions of the flange comprises said varying thicknesses.

9. The head-mounted display system according to claim 7, wherein one or more regions of the support structure comprises said varying thicknesses and/or stiffening ribs.

10. The head-mounted display system according to claim 9, wherein the support structure comprises a plurality of distinct thicker and thinner regions of the elastomeric material.

11. The head-mounted display system according to claim 9, wherein the support structure comprises a blend of incrementally varying thicknesses of the elastomeric material.

12. The head-mounted display system according to claim 9, wherein the stiffening ribs comprises regions of thicker elastomeric material.

13. The head-mounted display system according to claim 1, wherein the interfacing structure comprises a support structure and a flange that projects inwardly from the support structure,
    wherein the flange comprises the substantially continuous face engaging surface adapted to contact the user's face,
    wherein the flange comprises the elastomeric material, and
    wherein the elastomeric material of the flange and the substantially continuous face engaging surface thereof is configured and arranged to contact the user's face.

14. The head-mounted display system according to claim 7, wherein an edge of the flange along its inner perimeter at least partially forms a viewing opening configured to at least partially receive the user's eyes.

15. The head-mounted display system according to claim 7, wherein the flange is in the form of a flap or a membrane and/or the flange is thinner than the support structure.

16. The head-mounted display system according to claim 7, wherein the support structure and the flange comprise an integral, one-piece construction from the elastomeric material.

17. The head-mounted display system according to claim 1, wherein the interfacing structure further comprises a chassis, and the chassis comprises said varying thicknesses.

18. The head-mounted display system according to claim 17, further comprising the display unit and wherein the display unit further comprises a housing, and the chassis is removably mountable to the housing of the display unit.

19. The head-mounted display system according to claim 18, wherein the chassis includes one or more engagement elements around the periphery thereof that are configured to detachably mate with a corresponding element on the housing.

20. The head-mounted display system according to claim 1, wherein the face engaging surface is adapted to contact the user's face on regions of the epicranius, the sphenoid, across the outer cheek region between the sphenoid to the left or right zygomatic arch, over the zygomatic arch, across the inner cheek region from the zygomatic arches towards the alar crests, and on the nasal ridge inferior to the sellion to enclose a portion of the user's face therebetween, and wherein the interfacing structure is configured to bear higher levels of force in the regions of the epicranius and the sphenoid, and the interfacing structure is configured to bear lower levels of force in the regions of zygomatic arch, cheek regions, and nasal ridge.

21. The head-mounted display system according to claim 1, wherein the interfacing structure further comprises a foam cushion, and wherein the face engaging surface covers the foam cushion such that the foam cushion is underneath the face engaging surface.

22. The head-mounted display system according to claim 1, wherein the substantially continuous face engaging surface comprises a negative or convex curvature configured and arranged to contact the user's face.

23. The head-mounted display system according to claim 1, wherein the interfacing structure is customized to facial anthropomorphic features of the user.

24. A virtual reality display apparatus comprising:
    the head-mounted display system according to claim 1 and further comprising the display unit, wherein,
    the display unit comprises:
        a display configured to selectively output computer generated images that are visible to the user in an operational position,
        a housing that supports the display,
        the interfacing structure at least partially forms a viewing opening configured to at least partially receive the user's face in the operational position, and the interfacing structure being constructed at least partially from an opaque material configured to at least partially block ambient light from reaching the viewing opening in the operational position, and
        at least one lens coupled to the housing and disposed within the viewing opening and aligned with the display so that in the operational position, the user can view the display through the at least one lens; and
    the head-mounted display system further comprising:
    a control system having at least one sensor in communication with a processor, wherein the at least one sensor is configured to measure a parameter and communicate a measured value to the processor, and wherein the processor is configured to change the computer generated images output by the display based on the measured value.

25. The virtual reality display apparatus according to claim 24, wherein:
    the at least one lens includes a first lens configured to be aligned with the user's left eye in the operational position and a second lens configured to be aligned with the user's right eye in the operational position, the first lens and the second lens being Fresnel lenses; and
    the display comprises a binocular display partitioned into a first section and a second section, the first section aligned with the first lens and the second section aligned with the second lens.

26. The virtual reality display apparatus according to claim 24, further comprising a controller having at least one button selectively engageable by a user's finger, the controller being in communication with the processor and configured to send a signal to the processor when the at least one button is engaged, the processor configured to change the computer generated images output by the display based on the signal.

27. An augmented reality display apparatus comprising:
the head-mounted display system according to claim 1 and further comprising the display unit and a positioning and stabilizing structure structured and arranged to hold the display unit in an operational position over a user's face in use, wherein,
the display unit comprises:
a display constructed from a transparent or translucent material and configured to selectively output computer generated images,
a housing that supports the display, and
wherein in an operational position, the positioning and stabilizing structure configured to support the display unit, the display configured to be aligned with the user's eyes in the operational position such that the user may at least partially view a physical environment through the display regardless of the computer generated images output by the display; and
the head-mounted display system further comprising:
a control system having at least one sensor in communication with a processor, wherein the at least one sensor is configured to measure a parameter and communicate a measured value to the processor, and wherein the processor is configured to change the computer generated images output by the display based on the measured value.

28. The augmented reality display apparatus according to claim 27, wherein the display includes a first lens configured to be aligned with the user's left eye in the operational position and a second lens configured to be aligned with the user's right eye in the operational position.

29. The head-mounted display system according to claim 1, wherein the face engaging surface of each of the pair of elastic flaps forms a continuation with the face engaging surface of the interfacing structure.

30. The head-mounted display system according to claim 1, wherein the pair of elastic flaps are configured and arranged to elastically bend independent from one another.

31. The head-mounted display system according to claim 1, wherein the pair of elastic flaps form a gap therebetween adapted to receive the user's nose, each of the pair of elastic flaps includes an inner edge configured to form the gap, and the inner edge of each of the pair of elastic flaps is configured to travel towards the display unit when each of the pair of elastic flaps contact the respective side of the user's nose.

32. The head-mounted display system according to claim 1, wherein each of the pair of elastic flaps is configured to elastically bend towards the display unit when the interfacing structure is compressed against the user's face in use.

33. The head-mounted display system according to claim 1, wherein each of the pair of elastic flaps is configured to project inwardly from the support structure towards one another in a cantilever manner.

34. The head-mounted display system according to claim 1, further comprising a positioning and stabilising structure structured and arranged to support a weight of the display unit.

35. A head-mounted display system, comprising:
an interfacing structure for a display unit constructed and arranged to be in opposing relation with a user's face,
wherein the interfacing structure comprises a substantially continuous face engaging surface adapted to contact the user's face around a periphery of the user's eyes,
wherein the interfacing structure comprises an elastomeric material, and
wherein the interfacing structure comprises a membrane including the substantially continuous face engaging surface, and wherein the membrane comprises the elastomeric material; and
a nasal ledge comprising a support structure and a pair of elastic flaps, each of the pair of elastic flaps configured to project inwardly from the support structure towards one another so that the pair of elastic flaps form a gap therebetween adapted to receive the user's nose,
wherein each of the pair of elastic flaps includes a face engaging surface adapted to contact a respective side of the user's nose,
wherein each of the pair of elastic flaps is configured and arranged to contact the respective side of the user's nose and elastically bend towards the display unit so as to rest on the respective side of the user's nose without applying substantial compressive pressure on the respective side of the user's nose, and
wherein the face engaging surface of each of the pair of elastic flaps forms a continuation with the substantially continuous face engaging surface of the membrane.

36. The head-mounted display system according to claim 35, wherein the face engaging surface of each of the pair of elastic flaps and the substantially continuous face engaging surface of the interfacing structure together form a functionally continuous interfacing structure around the periphery of the user's eyes.

37. The head-mounted display system according to claim 35, wherein the nasal ledge at least partially overlaps with the interfacing structure.

38. A head-mounted display system, comprising:
an interfacing structure for a display unit constructed and arranged to be in opposing relation with a user's face,
wherein the interfacing structure comprises a face contacting portion and a non-face contacting portion,
wherein the interfacing structure comprises an elastomeric material,
wherein the face contacting portion comprises a membrane including a face engaging surface adapted to contact the user's face around a periphery of the user's eyes,
wherein the non-face contacting portion comprises a support structure and a ledge configured to project inwardly from the support structure,
wherein the interfacing structure further comprises a foam cushion,
wherein the membrane and the face engaging surface thereof covers the foam cushion such that the foam cushion is underneath the face engaging surface, and
wherein the non-face contacting portion is configured and arranged to resiliently support the foam cushion and the membrane; and
a nasal ledge comprising a support structure and a pair of elastic flaps, each of the pair of elastic flaps configured to project inwardly from the support structure towards one another so that the pair of elastic flaps form a gap therebetween adapted to receive the user's nose, wherein each of the pair of elastic flaps includes a face engaging surface adapted to contact a respective side of the user's nose, and wherein each of the pair of elastic flaps is configured and arranged to contact the respective side of the user's nose and elastically bend towards the display unit so as to rest on the respective side of the user's nose without applying substantial compressive pressure on the respective side of the user's nose.

39. The head-mounted display system according to claim 38, wherein the membrane is thinner than the non-face contacting portion.

40. The head-mounted display system according to claim 38, wherein the membrane, the support structure of the interfacing structure, and the ledge comprise silicone.

41. The head-mounted display system according to claim 38, wherein the ledge is configured and arranged to provide resilient, spring-like support to the foam cushion and the membrane.

\* \* \* \* \*